(12) United States Patent
Dimsdale

(10) Patent No.: US 6,420,698 B1
(45) Date of Patent: Jul. 16, 2002

(54) INTEGRATED SYSTEM FOR QUICKLY AND ACCURATELY IMAGING AND MODELING THREE-DIMENSIONAL OBJECTS

(75) Inventor: Jerry Dimsdale, Berkeley, CA (US)

(73) Assignee: Cyra Technologies, Inc., Oakland, CA (US)

( * ) Notice: Subject to any disclaimer, the term of this patent is extended or adjusted under 35 U.S.C. 154(b) by 0 days.

(21) Appl. No.: 09/178,101

(22) Filed: Oct. 23, 1998

Related U.S. Application Data

(62) Division of application No. PCT/US97/06793, filed on Apr. 24, 1997.

(51) Int. Cl.$^7$ .................................................. H01J 3/14
(52) U.S. Cl. ......................................... 250/234; 250/205
(58) Field of Search ................................. 250/234, 235, 250/205, 559.06, 559.22, 216, 227.12, 559.1, 208.1; 356/4.02, 5.01, 4.09; 702/159, 167; 372/9, 10, 17, 24, 700

(56) References Cited

U.S. PATENT DOCUMENTS

| | | | | |
|---|---|---|---|---|
| 4,658,218 A | * | 4/1987 | Kenney-Wallace et al. | 330/4.3 |
| 4,860,304 A | * | 8/1989 | Mooradian | 372/92 |
| 4,907,586 A | * | 3/1990 | Bille et al. | 606/5 |
| 4,928,152 A | * | 5/1990 | Gerardin | 356/5 |
| 5,006,721 A | * | 4/1991 | Cameron et al. | 250/561 |
| 5,110,203 A | * | 5/1992 | MacCabee | 356/5 |
| 5,114,226 A | | 5/1992 | Goodwin et al. | 356/5 |
| 5,132,977 A | * | 7/1992 | Zayhowski et al. | 372/10 |
| 5,243,541 A | * | 9/1993 | Ulich | 364/516 |
| 5,337,149 A | * | 8/1994 | Kozah et al. | 356/376 |
| 5,381,431 A | * | 1/1995 | Zayhowski et al. | 372/25 |
| 5,386,427 A | * | 1/1995 | Zayhowski | 372/34 |
| 5,394,413 A | * | 2/1995 | Zayhowski | 372/10 |
| 5,531,520 A | * | 7/1996 | Grimson et al. | 382/131 |
| 5,606,409 A | * | 2/1997 | Schneiter | 356/4.02 |
| 5,623,335 A | * | 4/1997 | Bamberger | 356/5.01 |
| 5,638,163 A | * | 6/1997 | Nourrcier, Jr. | 356/5.01 |
| 5,638,164 A | * | 6/1997 | Landau | 356/5.01 |
| 5,719,664 A | * | 2/1998 | Besesty et al. | 356/5.01 |

FOREIGN PATENT DOCUMENTS

| | | | |
|---|---|---|---|
| DE | 41 09 844 C1 | * | 3/1991 |
| FR | 2 662 244 | * | 11/1991 |
| GB | 2 292 605 A | * | 2/1996 |
| JP | 57004564 | * | 1/1982 |
| JP | 62108172 | * | 5/1987 |
| JP | 06188501 | * | 7/1994 |

OTHER PUBLICATIONS

Colin Bradley et al., "Free–form Surface Reconstruction for Machine Vision Rapid Prototyping", Optical Engineering, Sep. 1993, vol. 32, No. 9, pp. 2191–2200.*

Chia–Wei Liao et al., "Surface Approximation of a Cloud of 3D Points", Graphical Models and Image Processing, Jan. 1995, vol. 57, No. 1, pp. 67–74.*

A.B. Dobrzeniecki et al., "Interactive and Intuitive Segmentation of Volumetric Data: The Segmentview System and the Kooshball Algorithm", Institute of Electrical and Electronics Engineers, Proceedings of the International Conference on Image Processing (ICIP), Oct. 23, 1995, vol. 3, pp. 540–543.*

(List continued on next page.)

*Primary Examiner*—Que T. Le
(74) *Attorney, Agent, or Firm*—Stallman & Pollock LLP

(57) ABSTRACT

An integrated system generates a model of a three-dimensional object. A scanning laser device scans the three-dimensional object and generates a point cloud. The points of the point cloud each indicate a location of a corresponding point on a surface of the object. A first model is generated, responsive to the point cloud, that generates a first model representing constituent geometric shapes of the object. A data file is generated, responsive to the first model, that can be inputted to a computer-aided design system.

6 Claims, 44 Drawing Sheets

OTHER PUBLICATIONS

Jong Hoon Park et al., "Three–Dimensional Object Representation and Recognition Based on Surface Normal Images", Pattern Recognition, Jun. 1993, vol. 26, No. 6, pp. 913–921.*

Paul F. Hemler et al., "Active Model Matching in Range Images", IEEE International Conference on Robotics and Automation, Mar. 31, 1987, vol. 1, pp. 228–233.*

Narayan Sriranga Raja et al., "Obtaining Generic Parts from Range Images Using a Multi–view Representation", Image Understanding, Jul. 1994, vol. 60, No. 1, pp. 44–64.

Shinichi Tamura et al., "Error Correction in Laser Scanner Three–Dimensional Measurement by Two–Axis Model and Coarse–Fine Parameter Search", Pattern Recognition, Mar. 1994, Vo.. 27, No. 3, pp. 331–338.

Takeo Kanade et al., "A Very Fast VLSI Rangefinder", Proceedings of the 1991 IEEE International Conference on Robotics and Automation, Sacramento, California, Apr. 1991, pp. 1322–1329.

James D. Spinhirne, "Micro Pulse Lidar", IEEE Transactions on Geoscience and Remote Sensing, Jan. 1993, vol. 31, No. 1, pp. 48–55.

Sateesha G. Nadabar et al., "Fusion of Range and Intensity Images on a Connection Machine (CM–2)", Pattern Recognition, Jan. 1995, vol. 28, No. 1, pp. 11–26.

Kazuo Nakazawa et al., "Development of 3–D Robot Vision Sensor with Fiber Grating", IECON '91, 1991 International Conference on Industrial Electronics, Control and Instrumentation, Oct. 28, 1991, vol. 3, pp. 2368–2372.

E.S. Cameron & R. Doshi, "The Design and Manufacture of a High–Resolution Laser Radar Scanner,"*SPIE Laser Radar IV*, vol. 1103, 1989, pp. 190–197, Month Unknown.*

T.C. Strand, "Optical three–dimensional sensing for machine vision," *Optical Engineering*, vol. 24, No. 1, Jan./Feb. 1995, pp. 33–40.*

S–Y. Lu & R.K. Johnson, "a New True 3–D Motion Camera System from Lawrence Livermore," *Advanced Imaging*, Jul. 1995, pp. 51&54.*

N. Woodbury, M. Brubacher & J.R. Woodbury, "Noninvasive Tank Gauging With Frequency–Modulated Laser Ranging," Sensors, Sep. 1993, pp. 27–31.

R.R. Clark, "A Laser Distance Measurement Sensor for Industry and Robotics," *Sensors, Jun. 1994*, pp. 43–45 & 47.

Brochure by Azimuth "Laser Ranging Systems," including Product Description "LRY–750 E," 3/96, 10 pages in length.

Brochure by Automated Precision, Inc., "Precision Measurement and Sensing Instruments for Manufacturing," 1996, pp. front coverr, 1–15 & back cover, 1–15 & (Month Unknown).

D.S. Schwartz, "Vision Metrology System: An Automated Noncontact Three–Dimensional Measurement System," General Dynamics Corporation, Copyright 1989, 7 pages in length, (Month Unknown).

Brochure by John E. Chance & Associates, Inc., "Truck-Map," May 1994 2 pages in length.

D. Knopp, "Megamodels from MicroStation –Photography goes 3D,"MicroStation Manager, Aug. 1994, pp. 60–63.

M. Laasonen, "Surveying and Data Processing in Building Renovation," *Surveying Science in Finland*, vol. 11, No. 1–2, 1993, p. 3–14, reformated pp. 1–7, (Month Unknown).

A.J. Mäkynen, J.T. Kostamovaara & R. Myllylä, "Tracking Laser Radar for 3–D Shape Measurements of Large Industrial Objects Based on Time–of–Flight Laser Rangefinding and Position–Sensitive Detection Techniques," *IEEE Transactions on Instrumentation and Measurement*, vol. 43, No. 1, Feb. 1994, pp. 40–49.

T.T. Wohlers, "3D Digitizers," Computer Graphics World, Jul. 1992, pp. 73–77.

T. Wohlers, The Challenge of 3D Digitizing, *Computer Graphics World*, Nov. 1995, pp. 21–22.

* cited by examiner

INTEGRATED SYSTEM FOR QUICKLY AND ACCURATELY IMAGING AND MODELING THREE-DIMENSIONAL OBJECTS

This application is a division of international application number PCT/US97/06793, filed Apr. 24, 1997, pending.

TECHNICAL FIELD

The present invention relates generally to systems that document the geometry and other attributes of objects in three dimensions and, specifically, to a system that employs a scanning lidar (range finding laser) to quickly and accurately sense the position in three-dimensional space of selected points on the surface of an object to generate a point cloud which represents the sensed positions of the selected points; that recognizes geometric shapes represented by groups of points in the point cloud, and that generates a model that represents these geometric shapes. The model may be transformed into a further model usable by computer-aided design (CAD) tools, including conventional CAD tools.

BACKGROUND

Mapping the geometry (shape, dimensions and location) and other attributes (e.g., color, texture and reflectance intensity) of complex real objects (whether small components such as small mechanical parts or large objects such as buildings and sites) has conventionally been a tedious and time consuming process. That is, such measurement have traditionally been performed manually. In addition, transforming these measurements into drawings or computer models required manual drafting or input into a CAD system for the production of the drawing or computer models.

Recently innovations have endeavored to simplify this process, but all have fallen short of achieving full integration, automation, precision, speed and range. For example, in the building industry, mapping a structure conventionally requires three basic steps:

1. Field data gathering
2. Data reduction and preparation
3. Drafting and CAD The field data gathering step is performed by a team of surveyors who manually measure and record dimensions of pertinent components of the structure such as walls, ceilings, beams, columns, doors, windows, fixtures, pipes, conduits and equipment. The surveyors attempt to determine the geometry of the components as well as the relative location of the components in the structure. The surveyors recorded the data in a field notebook. The field-collected data is then organized and reduced to tables and organized sketches, and a CAD operator or drafter utilizes these tables to generate final drawings or models.

This process is labor intensive, time consuming, and error prone. In addition, using traditional surveying methods, the number of points which can actually be measured is very limited, due to the high cost of acquiring each point in terms of time and effort. Furthermore, if it is desired to acquire color, texture and other attribute information, additional field notes must be taken (e.g., still photographs and video).

Recently, the field step has been somewhat automated by using a laser ranging device built into or mounted on an electronic theodolite. Precision reflection targets (retro reflectors) are placed at the locations of the object for which measurements are desired. Then, the laser ranging device obtains a precise measurement of the distance between the instrument and the target, which the theodolite provides an accurate indication of the horizontal and vertical angle offsets to the point relative to a given coordinate system. The distance and angle data are either recorded automatically on a magnetic device connected to the instrument or are reduced within the instrument to Cartesian coordinates relative to the instrument axes. This procedure is then repeated as many times as necessary to map a desired number of points of the object. The collected coordinates data can then be plotted directly on a CAD system.

Unfortunately, the plot is of little practical use since it does not indicate the object geometry. Moreover, because of the requirement for retro reflectors which must be manually placed, and because of the relatively long time per reading required by the laser range finder, the gathering of sufficient points to describe most objects is very labor intensive, time consuming and error prone.

Another known field gathering data process employs stereo photography and aerial photogrammetry. That is, stereoscopic images are taken of the objects and the resulting stereo photographs are registered either manually or using computerized techniques to reproduce the relative location of the camera picture plane location at the time each photograph was taken. The data reduction and preparation step is performed manually by a specially trained operator. Specifically, with the aid of specially mounted stereoscopic viewing lenses, the operator digitizes the coordinates of a sufficient number of points to allow the definition of the objects using the stereo photographs. Again, the digitized data is input into a CAD system or is manually drawn on paper.

SUMMARY

The present invention is an integrated system for generating a model of a three-dimensional object. A scanning laser device-scans the three-dimensional object and generates a point cloud. The points of the point cloud each indicate a location of a corresponding point on a surface of the object. A first model is generated, responsive to the point cloud, representing constituent geometric shapes of the object. A data file is generated, responsive to the first model, that can be inputted to a computer-aided design system.

The subject invention further includes a method of controlling the timing of output pulses from a laser for use in a device which requires scanning of the laser output, wherein each output pulse is generated in response to a pump pulse comprising the steps of: monitoring the time delay between the initiation of the pump pulses and the subsequent generation of the associated output pulses; predicting the time delay between the initiation of next pump pulse and the associated output pulse based on the monitored time delays and; initiating the next pump pulse at a time selected to insure the output pulse is generated at a time to permit proper positioning of the laser output during the scan of the beam.

The present invention further includes a method of manually separating from a plurality of clouds of points, representing three-dimensional features in a scene, a subset of the points that represents a desired feature in the scene, the method comprising: selecting all the point clouds that include at least some data points representing the desired feature; and changing a view of the clouds and drawing a polygonal lasso to refine a selected subset of points to be included in a point sub-cloud and repeating the refining as many times as required to obtain the desired sub-cloud.

The present invention further includes a method for automatically segmenting a scan field of a scene into subsets of points that represent different surfaces in the scene, comprising the steps of: separating the scan field into a depth grid that includes depth information for scanned points of surfaces in the scene and a normal grid that includes an estimate of a normal to scanned points of the surfaces; convolving the depth information of the depth grid to generate a depth rating image whose values represent a gradient of depth change from one scanned point to another scanned point in the scene; convolving the components of the normal grid to generate a scalar value for each component for each point of the normal grid; for each point of the normal grid, determining from the scalar values for the components of that particular point a gradient of the normal at that point, wherein the gradients determined for the points of the normal grid collectively constitute a normal rating image; converting the depth rating image to a binary depth image using a recursive thresholding technique; converting the normal rating image to a binary normal image using a recursive thresholding technique; combining the binary depth image and the binary normal image to determine a single edge image; and grouping subsets of non-edge points as belonging to corresponding surfaces of the scene.

The method can further include the steps of determining the type of geometric primitive that would best first each group of points; fitting the geometric primitive to the data points; and intersecting adjacent planar regions in the scene.

The subject matter further includes a method for fitting a point cloud representing a corner, comprising: determining a fit of three planes to the points of the point cloud and creating the planes for a model; determining the three lines at the intersection of pairs of planes and creating the lines for the model; and determining the vertex point at the intersection of the three planes and creating a vertex point for the model.

The subject invention further includes a method for modeling a three-dimensional scene, comprising: generating a plurality of points that each represent a point on a surface of the scene; determining a best fit of a cylinder for a group of the points using surface normal estimates and global error minimization.

The subject invention further includes a method for modeling a three-dimensional scene, comprising: generating a plurality of points that each represent a point on a surface of the scene; determining a best fit of a cylinder for a group of the points using a quadratic surface fit and global error minimization.

The subject invention further includes a method for modeling a three-dimensional scene, comprising: generating a plurality of points that each represent a point on a surface of the scene; determining a best fit of a sphere for a group of the points using a quadric surface fit and global error minimization.

The subject invention further includes a method for modeling a three-dimensional scene, comprising: generating a plurality of points that each represent a point on a surface of the scene; determining a best fit quadric surface for a group of points; and determining which geometric primitive of a plurality of the family described by the quadric surface best fits the group of points.

The subject invention further includes a method for merging two geometric primitives of the same type to form a single geometric primitive of the type, comprising: creating a new group of points by combining the points used to originally fit each of the two primitives; and fitting the new geometric primitive using any appropriate fitting technique and the newly generated point group with points from each of the original primitives.

The subject invention further includes a method of registering a first model, consisting of a plurality of points and geometric primitives and having a first coordinate system, with a second model, consisting of a plurality of points and geometric primitives and having a second coordinate system, comprising: identifying by a user common features of the first and second scenes; identifying a transformation between coordinate systems that is responsive to the identification; and transforming the objects of the second model so that they use the first coordinate system.

The subject invention further includes a method of warping, comprising: selecting one or more models represented by a plurality of point clouds and geometric primitives; specifying constraints on the locations of any number of points or geometric primitives; creating an artificial volume that surrounds the points and geometric primitives in each view and assigning mechanical material characteristics to the surrounding volume; computing a minimum energy configuration for the material in the surrounding volume in which the points or geometric primitives are embedded such that the configuration satisfies all applied constraints; and displacing the points and primitives in accordance with the computed minimum energy configuration of the surrounding volume of material. In the latter method, the constraints can be specified to eliminate closure errors.

The subject invention further includes an integrated system for generating a model of a three-dimensional scene, comprising: a scanning laser device that scans the three dimensional scene with pulsed laser beam wherein the pulses of light last less than 1 nanosecond with up to 0.2 $\mu J$ in each pulse and measures the time delay, with a resolution of 30 psec or less, between each emitted pulse and a corresponding pulse that is returned from a surface of the scene and wherein said scanning laser device further tracks and measures the angular orientation of the beam during the scan; and means for generating a point cloud based upon the measured time delays and angle measurements, the point cloud comprising a plurality of data points that each represents a location of a corresponding point on the surface.

The subject invention further includes a system for calibrating the measuring electronics in a device which requires monitoring the time of flight of the output pulses from a laser comprising: a single mode optical fiber with one end thereof positioned to receive the output pulses of the laser, said single mode optical fiber having a known length; a detector positioned at one of the ends of the fiber for monitoring when the pulses exit the fiber and generating a signal in response thereto, said signal being passed through the measuring electronics; and a processor for calculating a theoretical length of the fiber based on the detection of the pulse exiting the fiber and comparing that calculated length with known length of the fiber to calibrate the measuring electronics.

The optical fiber can include partial reflectors located at each end thereof so that for each laser pulse entering the fiber a train of pulses will exit the fiber and wherein said train of pulses are used to further calibrate the measuring electronics.

The system can further include delay measurement electronics and wherein the train of pulses have a fixed delay therebetween whereby the monitoring of the train of pulses can be used to calibrate the delay electronics.

The system can further include a means for varying the power of the pulses monitored by the detector and wherein said detector functions to generate a signal when the power of the detected light exceeds a predetermined threshold and wherein said processor functions to track the variation in the delay of the generation of the output signal by the detector as a function of the power of the output pulses, said processor further functioning to calibrate the measurement of the delay based on the measured power of successive pulses used for monitoring the time of flight.

The subject invention further includes an apparatus for obtaining position information about surface points of a three dimensional object comprising: a laser for generating an output beam; scanning system for moving the laser beam over the object; monitoring system for automatically measuring the range to the object based on the measurement of the reflection of the laser beam, said monitor system also tracking and measuring the angular position of the laser beam, said monitoring system having a positional accuracy for each point in three dimensional space equal to or better than six millimeters at one standard deviation over a range of up to 100 meters.

Each range measurement can be made in under 0.005 seconds. The laser can generate a pulsed output and the energy per pulse can be less than 0.2 micro joules and the average output power of the laser can be less than 1.0 milliwatts.

The subject invention further includes an apparatus for measuring the distance to an object comprising: a laser for generating a beam of output pulses; a monitoring system for measuring the distance to the object based on the reflection of the laser beam, said monitoring system having an accuracy equal to or better than 6 millimeters at one standard deviation over its entire range of up to 100 meters and wherein each measurement can be made in less than 0.005 seconds and wherein the laser has an energy per pulse of no more than 0.2 micro joules and an average power of no more than 1 milliwatt. If the object is provided with retro reflectors and where the range of operation is up to one mile.

The subject invention further includes an apparatus for acquiring three dimensional information from a remote object comprising: a scanning laser module for measuring position information of the object; a video module for capturing image information from the object; and a processor for rendering a model of the object which includes the position information and the image information.

The video image information can be collected in a spatially coincident manner with the measurement of position information. The video image information can be collected from points adjacent to the points where position information is obtained.

The subject invention further includes an apparatus for obtaining positional information about surface points of a three dimensional object comprising: a scanning module for measuring three dimensional position information about an object; a video module for capturing and displaying image information from the object; and a processor operating with the scanning and video modules and permitting the use of the image information captured by said video module to aid in targeting the scanning module. The processor can function to specify a portion of the object to be targeted by the scanning module by dragging the image of an outline over the video image of the area to be targeted.

The subject invention further includes an apparatus for obtaining positional information about surface points of a three dimensional object comprising: a scanning module for measuring three dimensional position information about an object; a video module for displaying image information obtained from the scanning module; a processor operating with the scanning and video modules and permitting the use of the image information displayed by said video module to further refine the targeting of the scanning module.

The subject invention further includes an apparatus for obtaining positional information about surface points of a three dimensional object comprising: a scanning module for measuring three dimensional position information about an object, said scanning module including a laser for emitting a beam of visible radiation; and a processor for controlling the scanning module and wherein said laser can be manually positioned so that the visible beam will target the portion of the object to be scanned in response to a control signal from the processor.

The subject invention further includes a system for calibrating the measuring electronics in a device which requires monitoring frequency changes in a light beam generated by a laser used to measure distance to an object, wherein said beam has frequency chirp imposed thereon comprising a single mode optical fiber with one end thereof positioned to receive light from the laser; a detector positioned to receive light which has traveled through and exited the fiber in combination which light from the laser which has not traveled through the fiber, said detector for monitoring the changes in the frequency of the combined beam; and processor for determining the linearity of the chirp on the beam based on uniformity of the frequency changes measured by the detector and using the result to calibrate the measuring electronics.

The fiber can have a known length and includes a partial reflector on said one end and at least a partial reflector on the other end, and wherein light reflected from said one end of the fiber which has not traveled in the fiber is measured by the detector and wherein the processor further functions to calculate a theoretical length of the fiber based on the frequency changes measured by the detector and compares that calculated length with the known length of the fiber to calibrate the measuring electronics.

DETAILED DESCRIPTION

A. Overview

1. Overall System

Figure 1:
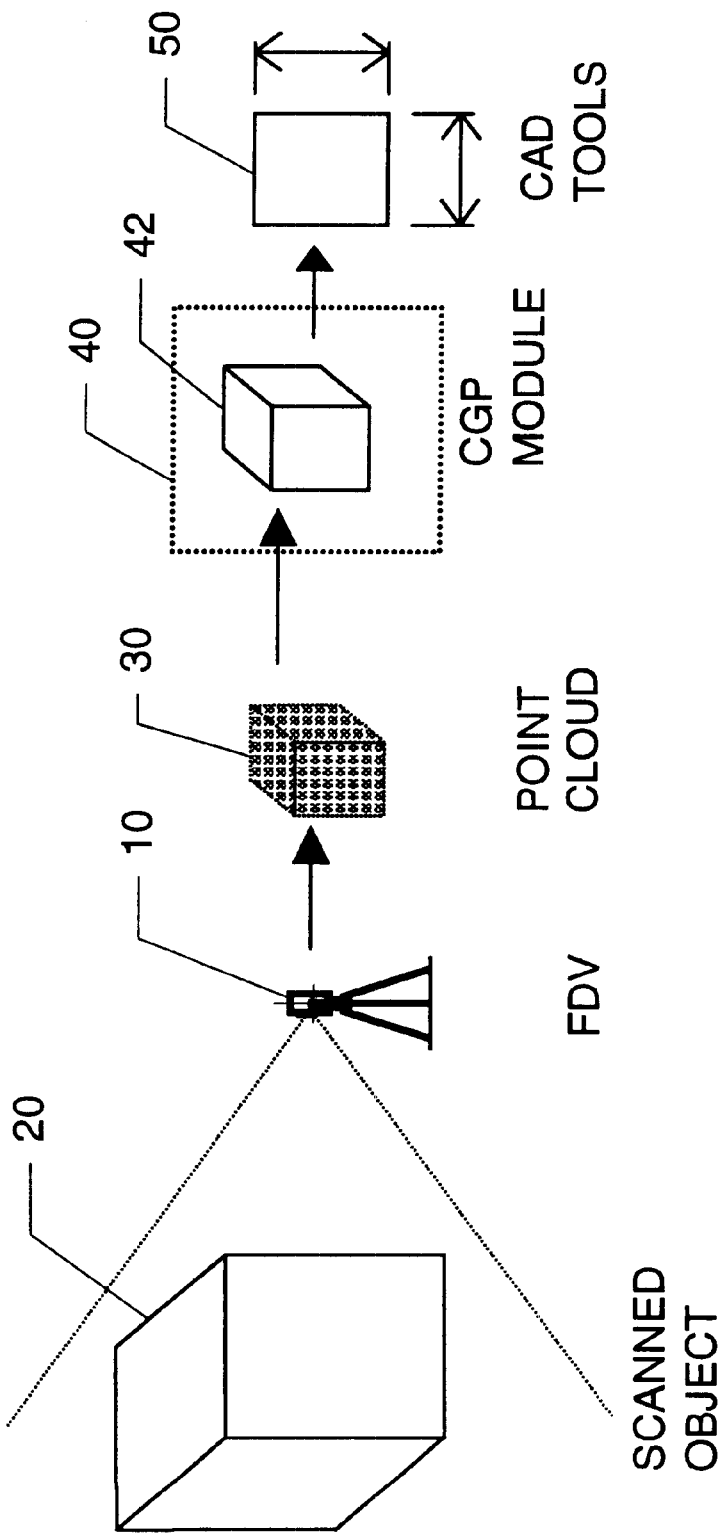
FIG. 1 is a block diagram of a system in accordance with an embodiment of the invention.

FIG. 1 is a block diagram that illustrates the invention in its broadest aspect. Referring to FIG. 1, a Field Digital Vision (FDV) module 10 includes a scanning sensor for scanning an object 20 and for sensing the position in three-dimensional space of selected points on the surface of the object 20. The FDV module 10 generates a point cloud 30 which represents the sensed positions of the selected points. The point cloud 30 also represents other attributes of the sensed positions, such as reflectivity, surface color and texture.

A Computer Graphics Perception (CGP) module 40 interacts with the FDV to provide control and targeting functions for the FDV module 10 sensor. In addition, using the point cloud, the CGP module 40 recognizes geometric shapes represented by groups of points in the point cloud 30, and the CGP module generates a CGP model 42 that represents these geometric shapes. From the CGP model 42, the CGP module 40 generates a further model usable by computer-aided design (CAD) tools 50. The CAD tools may be conventional.

Figure 1A:
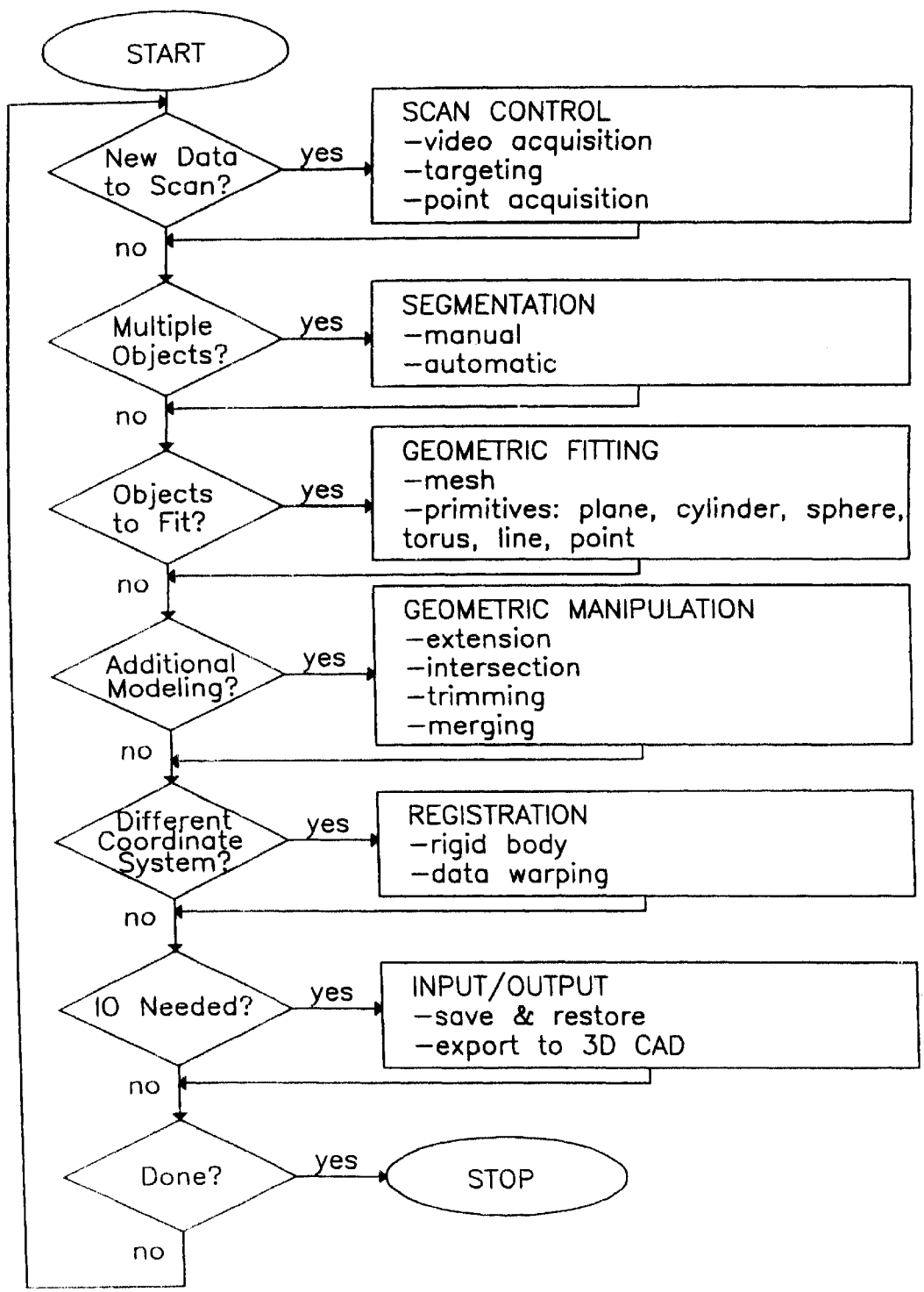
FIG. 1A shows the overall flow of how one may use an embodiment of the invention to scan an object, organize acquired points, fit geometric shapes to the organized point, manipulate the fitted geometric shapes, and display the resulting manipulated geometric shapes.

FIG. 1A shows the overall flow of how one may use an embodiment of the invention to scan an object, organize acquired points, fit geometric shapes to the organized point, manipulate the fitted geometric shapes, and display the resulting manipulated geometric shapes.

2. FDV Module Overview

Figure 2:
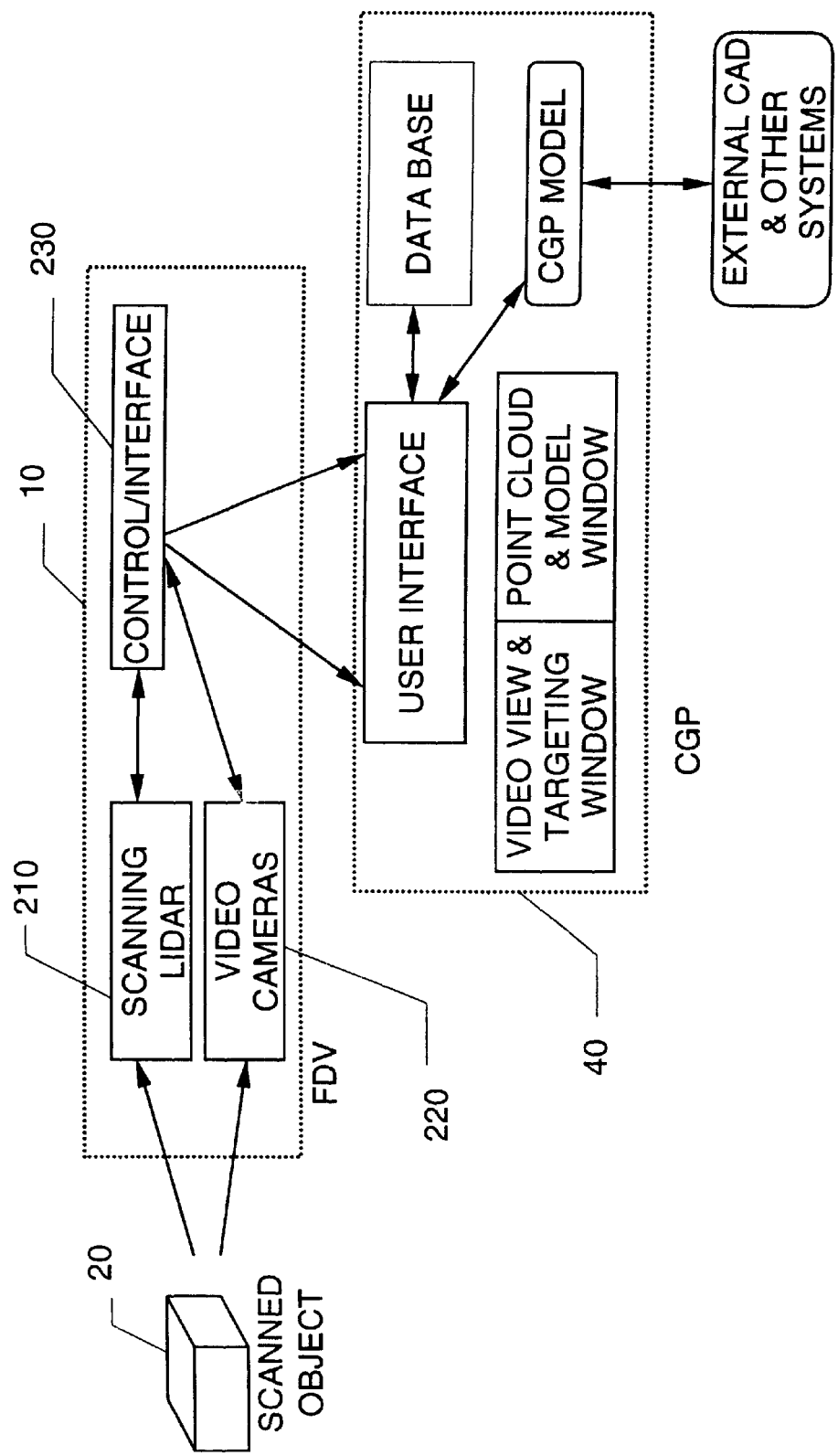
FIG. 2 is a more detailed block diagram of the system of FIG. 1.

Referring to FIG. 2, the FDV 10 includes a scanning laser system (lidar) 210 that scans points of the object 20 and that generates a lidar data signal that precisely represents the position in three-dimensional space of each scanned point. The lidar data signal for groups of scanned points collectively constitute the point cloud 30. In addition, a video system 220, preferably including both wide angle and narrow angle CCD cameras, is provided. The wide angle CCD camera of the video system 220 acquires a video image of the object 20 and provides, to the CGP 40 via a control/interface module 230 of the FDV 10, a signal that represents the acquired video image.

In response to user input relative to the signal that represents the acquired video image, the CGP 40 provides a scanning control signal to the lidar 210, via the control/interface module 230, for controlling which points on the surface of the object 20 the lidar 210 scans. More particularly, the scanning control signal provided from the CGP 40 controls an accurate and repeatable beam steering mechanism to steer a laser beam of the lidar 210.

In addition, the narrow angle CCD camera of the video system 220 captures the texture and color information, and provides this captured information to the CGP 40.

3. CGP Module Overview

Referring still to FIG. 2, the CGP 40 is constituted of a data processing system (e.g., a notebook computer or a graphics workstation) and special purpose software that when executed conFIG.s the CGP 40 data processing system to perform the FDV 10 control and targeting functions, and also to perform the CGP model 42 generation functions.

i. FDV Control

The CGP 40 controls the scanning lidar 210 of the FDV 10 by providing a lidar control signal to the FDV 10 that controls which points of the object 20 the FDV 10 scans. User input is provided to the CGP 40, which defines what portions of the object 20 to scan, and at what resolution.

ii. Model Generation

Each data point in the point cloud 30 generated by the FDV 10 represents both distance to a corresponding laser impingement point from an FDV 10 "origin point" and the angle from the origin point to the laser impingement point. The CGP software conFig.s the CGP 40 computer to process the data points of the point cloud 30, generated by the lidar 210 as a result of scanning the object 20, to display and visualize the scanned portions of the object 20. More specifically, the CGP software conFig.s the CGP 40 computer to recognize geometric shapes in the object 20 ("graphic perception") and, using these recognized geometric shapes, to perform geometry construction, 3D model construction, 3D visualization, and database functions for automated acquisition or manual input of object attributes, generation of plans, sections, and dimensions, data query, and CAD interfaces, and networking options.

B. Details

1. FDV Module Detail

Figure 5:
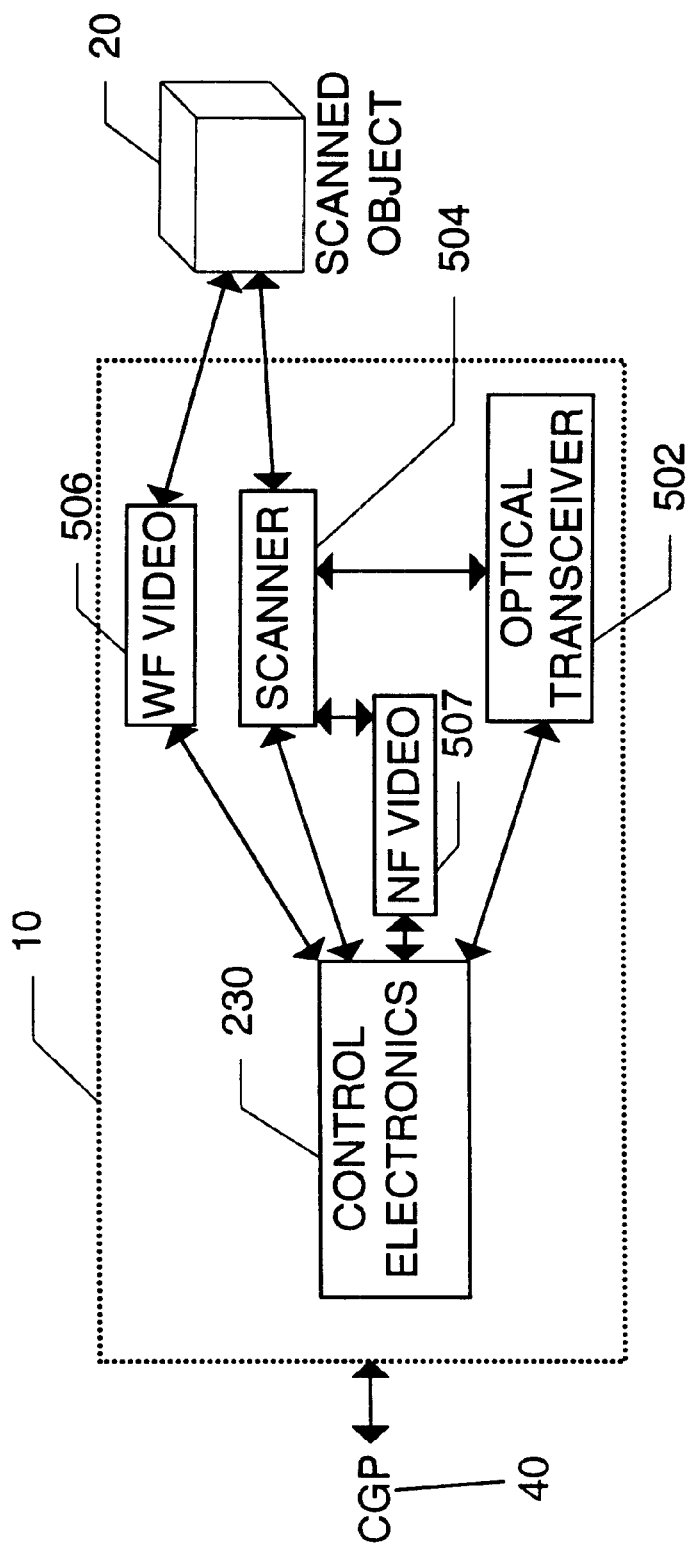
FIG. 5 is a block diagram of one embodiment of an FDV in accordance with the invention.

FIG. 5 is a block diagram of one embodiment of an FDV 10 in accordance with the invention. A lidar transceiver 502 includes a laser, transmit optics, receive optics and detector for generating ranging and intensity data. A scanning system 504 includes dual orthogonal scanning mirrors, galvo motors, and encoders for steering the laser beam and determining the azimuth and altitude angles of the laser beam from the positions of the mirrors. A wide angle video system 506 generates targeting video information and a narrow angle video system 507 generates color and texture information. Control/interface circuitry 230 handles the exchange of data between the FDV 10 and the CGP 40.

If the laser beam is quasi-CW, always on with either intensity modulation (AM) or wavelength modulation (FM), the distance to the object 20 can be inferred by any of a number of techniques involving demodulation at the transceiver 502. If the laser is pulsed, the distance to the object 20 is usually measured by the time of flight from the transceiver 502 to the object 20 and back. Other laser modulation schemes may be used.

In the time-of-flight embodiment, the laser is preferably of the type disclosed in U.S. Patent Nos. 5,132,977; 5,386,427; and 5,381,431, assigned to Massachusetts Institute of Technology. In particular, the beam generated by such a laser has special properties such as being capable of producing pulse widths less than 1 nsec.

A particular embodiment of the laser which has been used is particularly suitable for precision lidar since:

1. The short pulsewidth provides high accuracy, since radar theory shows that the accuracy is proportional to the inverse of the pulse time.
2. The laser itself is physically quite small, especially useful for portable applications.
3. It has a diffraction limited beam, which implies that the spot size at a distance is not limited by the properties of the light, but only by the quality of the optics used to collimate or focus it.
4. Since the wavelength is quite short (532 nm), and Rayleigh range is inversely proportional to wavelength, the beam can be kept small over a large distance interval. In fact with a 1 cm exit aperture, the beam will remain less than 6 mm over 50 m.

In one preferred embodiment, the laser beam is directed by the orthogonal scanner mirrors to a laser impingement point on the surface of the object 20. The range can be determined by any of a number of conventional lidar techniques. For example, the "time of flight" of a laser pulse to travel from the laser to the surface of the object 20, and then back to the detector, is determined. The range is determined based on the constant speed of light, with appropriate adjustments being made for atmospheric factors.

A system in accordance with the present invention can provide high ranging accuracy at high acquisition rates. For example, at 100 m ranges, a 1 mm accuracy can be achieved on a single shot basis, with anywhere from 1000 to 5000 data points being acquired per second.

Figure 35:
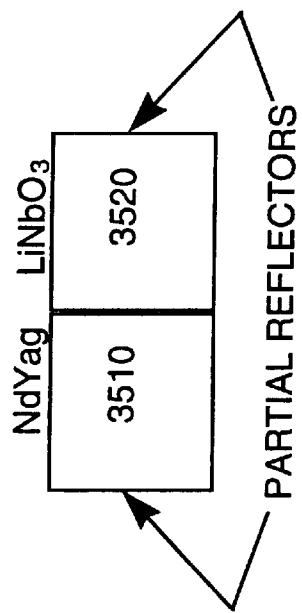
FIG. 35 shows configuration of a frequency adjustable laser.

In other embodiments, a chirp lidar may be employed. The essential component of a chirp lidar can be modulated with a linear change of wavelength over time. Thus, the wavelength of the light emitting from the laser will be given by $\lambda(t)=k(t-t_0)+\lambda_0$. In practice, such a laser is commonly manufactured by making a composite of two materials, a typical laser gain media such as NdYAG (3510), and substance which can have its index of refraction altered electrically such as Lithium Niobate (3520). (See FIG. 35) This effectively changes the length of the laser cavity, and hence alters the emitted wavelength. Commercially available lasers can be modulated up to about 100 GHz with a voltage modulation of about 1 kV, so the frequency of the light will be approximately $f(t)=k(t-t_0)+f_0$.

Figure 36:
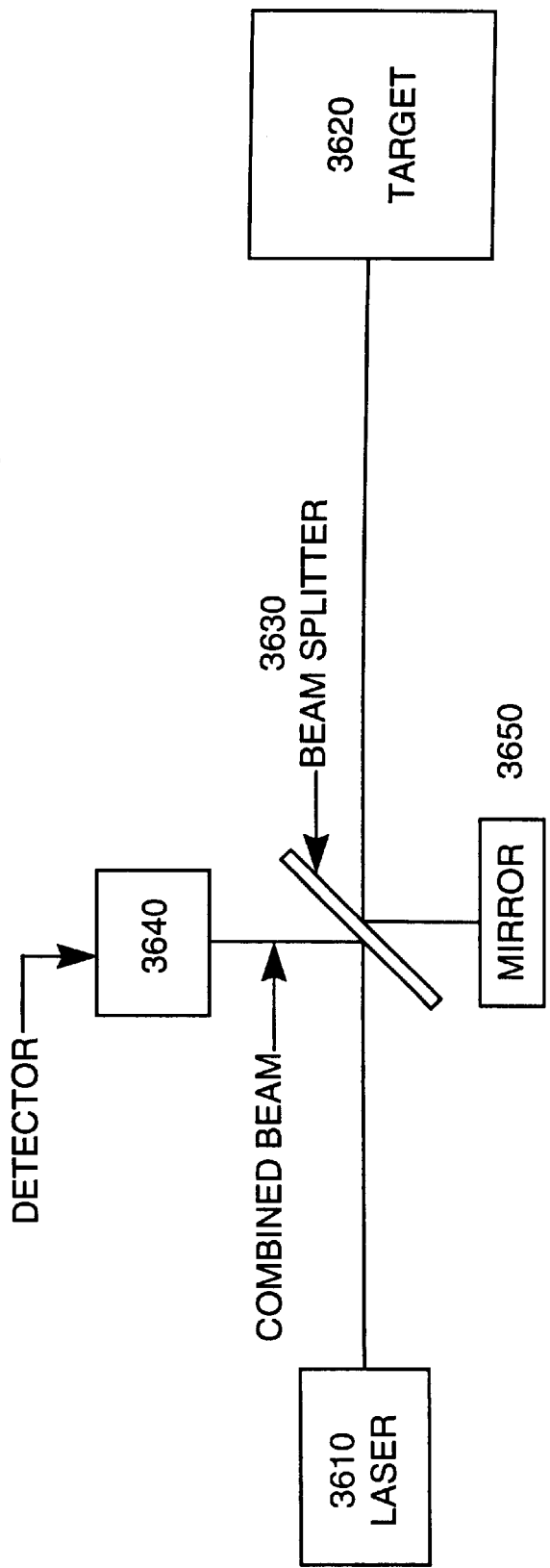
FIG. 36 shows block diagram of conventional FM chirp lidar.

Referring to FIG. 36, in a typical FM chirp system, a portion of the light emitted by the laser 3610 is sampled and recombined at the beam splitter 3630 with the light returning from the target 3620. Since the light is delayed by the amount of time to contact the target and return, the light returning from the target will have a lower frequency than the light which is sampled from the laser. This difference will be apparent in the output of detector 3610 which measures the intensity of the combined beams. If the frequency ramp of light is exactly linear and the laser has a coherence length much greater than the distance to the target, combining the beams will produce a constant measured frequency from the detector which is proportional to the range: $f=k_1*d+d_0$. Chirped Yag lasers as described above have a coherence length of about 20 km, but the chirp is not linear, and this has severely limited the accuracy of existing FM chirp lidars.

Figure 37:
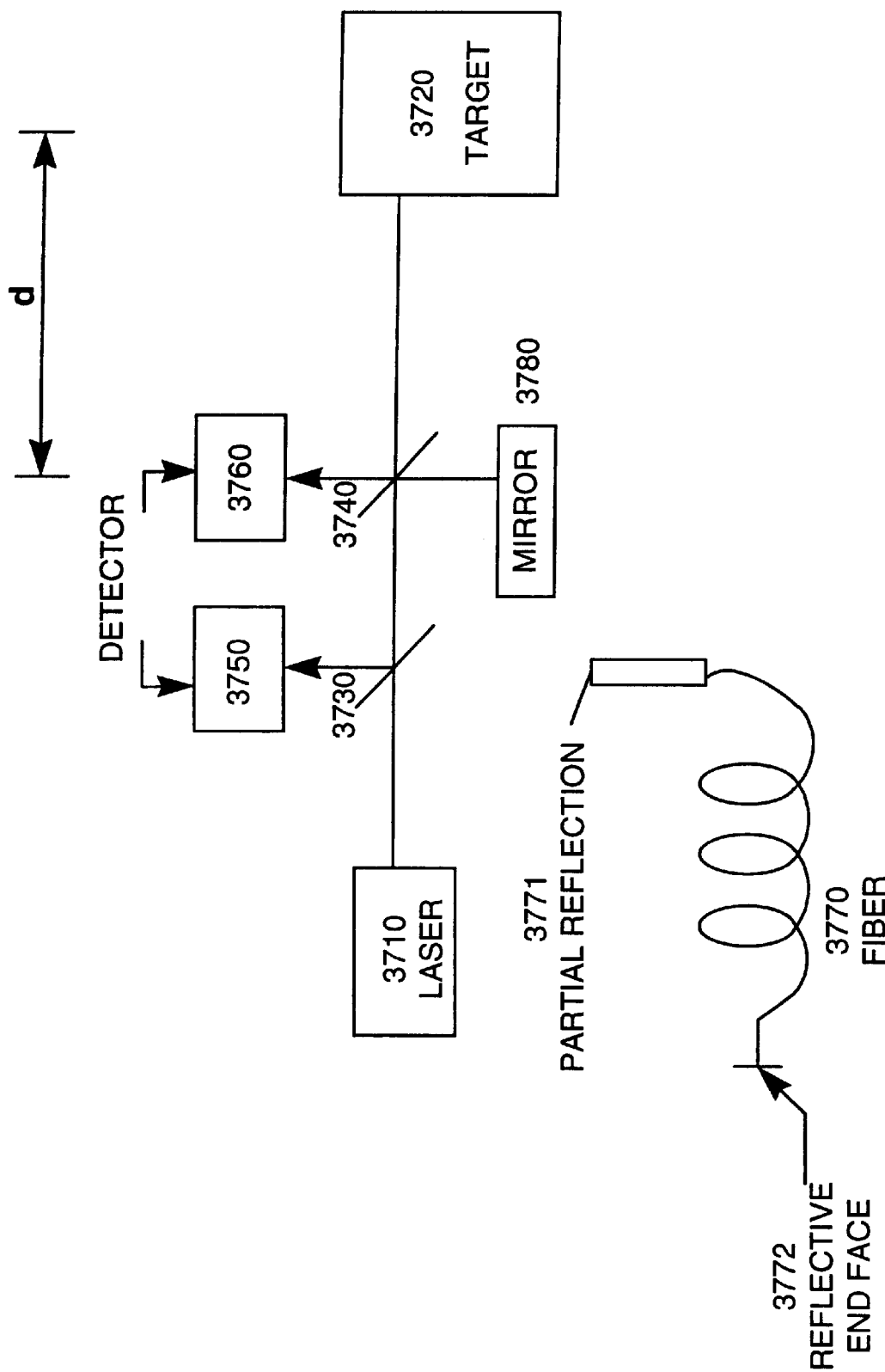
FIG. 37 shows block diagram of self-calibrating FM chirp lidar.
Figure 38:
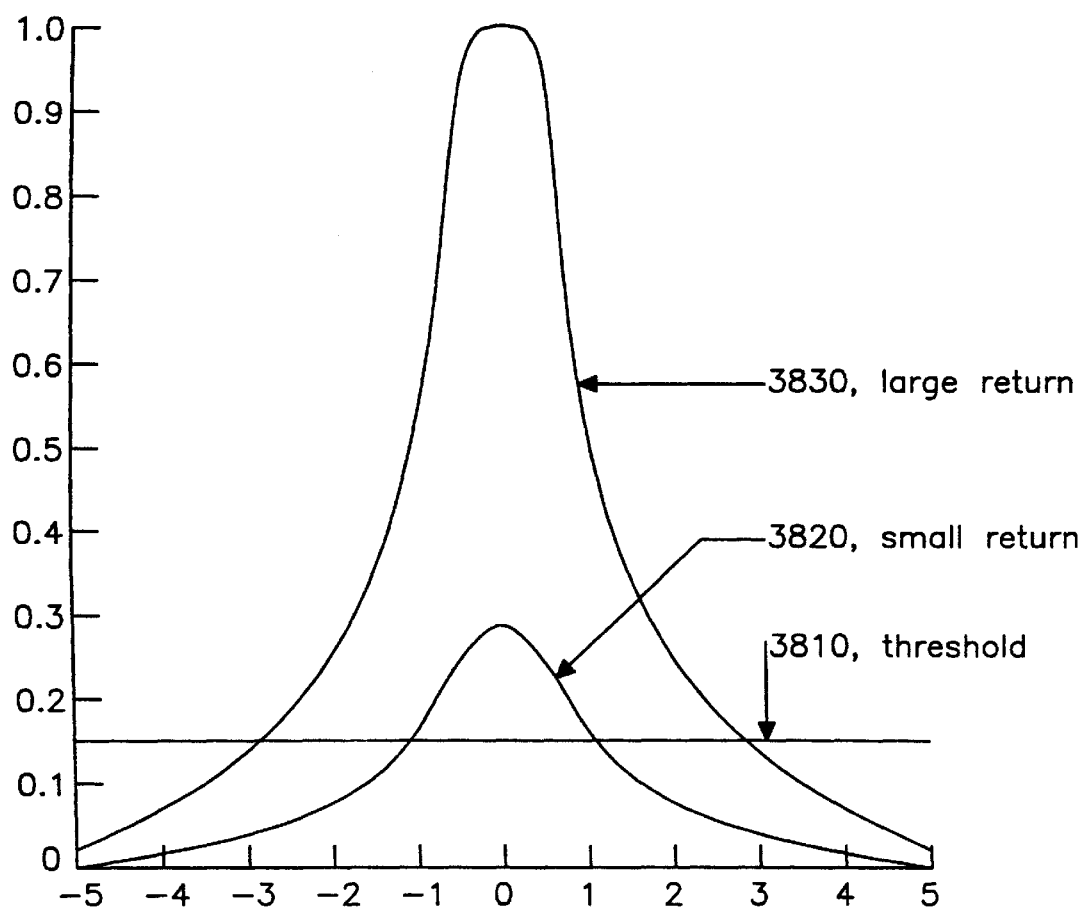
FIG. 38 illustrates the relative timing at which a large and a small pulse cross a predetermined threshold.
Figure 39:
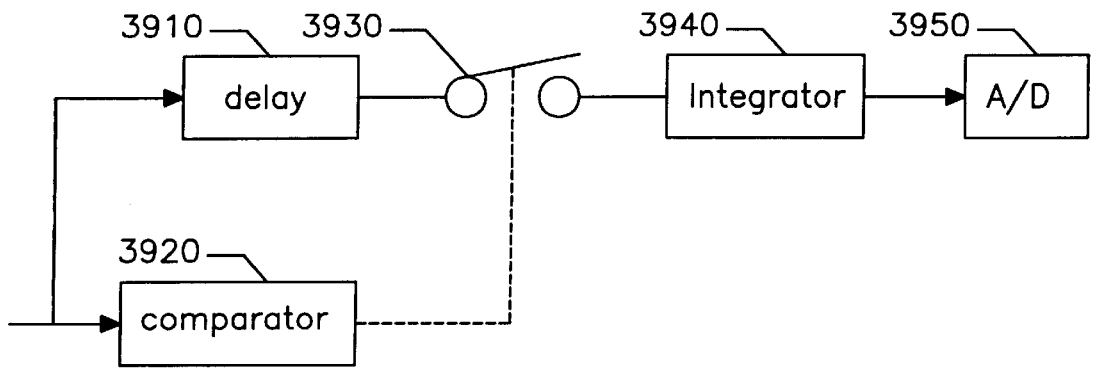
FIG. 39 illustrates one circuit for measuring pulse energy.
Figure 40:
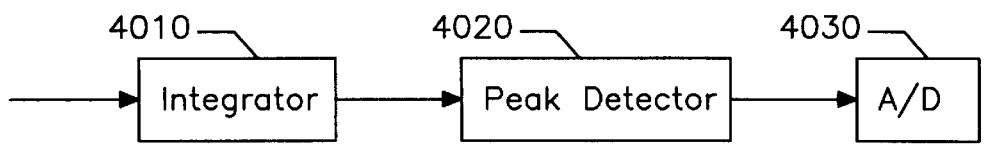
FIG. 40 illustrates another circuit for measuring pulse energy.

Referring to FIG. 37, a huge improvement in accuracy can be realized by adding a system to calibrate every range measurement. A fiber is prepared which has a partial reflector 3771 on one end, and a nearly total reflector 3772 on the other. Now a portion of the light emitted by the laser 3710 is sampled and recombined at beam splitter 3740 with the light returning from the target 3720, and the intensity is measured by a detector 3760. An additional sample of the beam emitted from the laser is sampled by beam splitter 3730 and introduced into the fiber at the partially reflected end 3771. The beam propagates a fixed distance down the fiber and reflects off the end face and is recombined with the beam which is reflecting off the partially reflecting face 3771, and is measured with a second detector 3750. The linearity of the chirp is then measured by determining the deviation from a constant frequency of the output of detector 3750, and this information is used to correct for the effects of the nonlinear chirp in the output of detector 3760, which corresponds to the target range measurement.

Figure 3A:
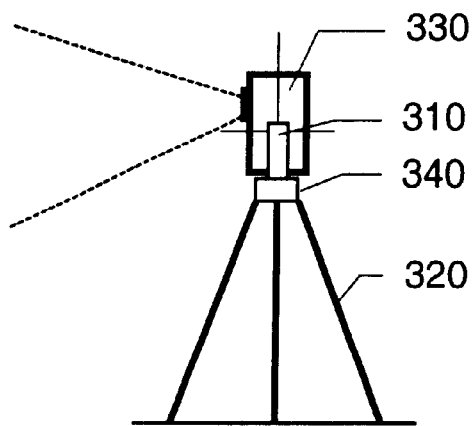
FIGS. 3A and 3B show the physical arrangement of the FDV of the FIG. 1 system, and also shows how the FDV is coupled to the tripod by a fork mount.
Figure 3B:
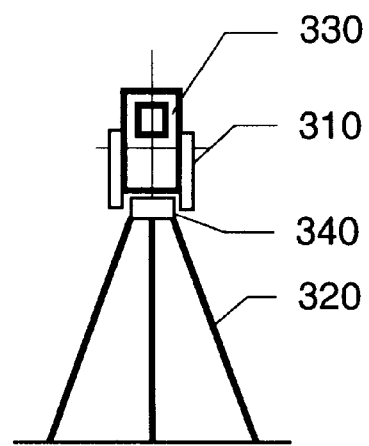

Referring to FIGS. 3A and 3B, in the embodiment, the FDV 10 is physically housed in a box 330 made of metal or other suitable housing material. The box 330 is suspended from its side panels by a fork mount mechanism 310. The fork mount system is supported on a turntable 340, and the turntable 340 is mountable on a tripod 320. Using the fork mechanism 310, the FDV 10 can be rotated horizontally ("azimuth rotation") and vertically ("elevation tilt", or "altitude"). Generally, a position of the tripod 320 is referred to as a "setting" or "positioning"; the rotation and tilt of the FDV 10 in the fork mount 310 is referred to as "pointing" or "orientation". A "view" is generally associated with a given setting and orientation.

The fork mount system 310 preferably includes high accuracy azimuth and altitude rotation measuring devices (e.g., conventional theodolite-type optical or electronic encoders) to provide precise rotation and tilt data of the FDV 10. This feature can allow the automatic integration of scans taken from the same tripod 320 setting, but with a different orientation of the FDV 10. In the event these devices are not used, and for scans taken from different settings and orientations, these scans can be integrated using techniques described later in this disclosure.

Figure 4A:
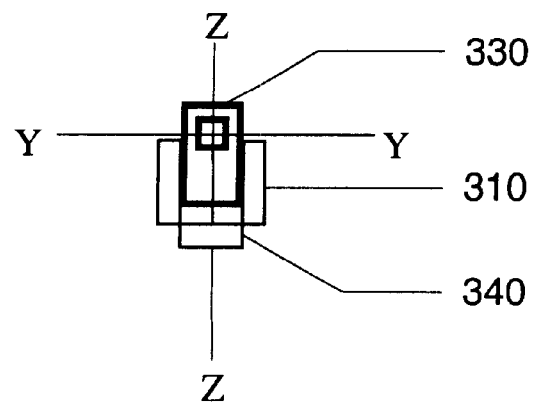
FIGS. 4A and 4B show an example coordinate system relative to the FDV of the FIG. 1 system.
Figure 4B:
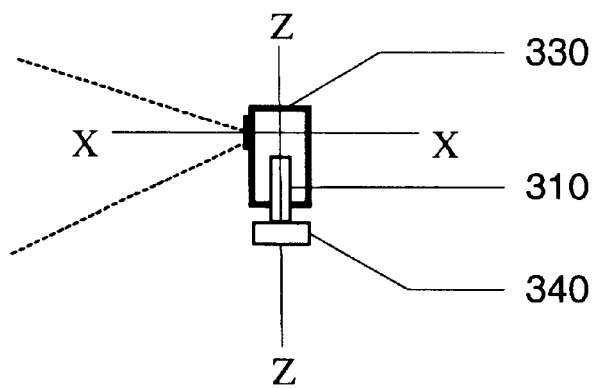

It should be noted at this point that, while conventional surveying instruments should be leveled prior to operation in order to operate properly, this is not a requirement of the FDV 10. This is due to the novel methods of this invention as embodied since its own internal coordinate system and the procedures utilized in its software that take advantage of its method of acquiring position data. The system, however, does have the ability to be leveled and to be used in a manner similar to a traditional theodolite. The Cartesian coordinates of the FDV 10 in the example embodiment are shown in FIGS. 4A and 4B.

Referring still to FIGS. 3A and 3B, in one embodiment, two orthogonal mirrors of the FDV 10 provide a field of view of approximately 40° by 40° ("Field of View", or "View" is defined as the maximum size of the area projected by the laser maximum deflections of the beam in degrees). The field of view can be increased or decreased by resizing the mirrors and certain parts of the optical train. The fork mount described above is utilized to allow pointing of the FDV's 40°×40° field of view anywhere over a projected sphere thus affording a wide range of flexibility in imaging large objects or groups of objects from the same setting. Other mounting methods may be used to accomplish the same purpose.

High accuracy and repeatability electronic encoders read the rotational angles of the orthogonal mirrors, and the readings of the mirror rotation angles are precisely timed to coincide with the range reading. Preferably, the system is Class II FDA eye safe. A first embodiment has $_\pm 6$ mm spatial accuracy over a range of $_\pm 50$ m. In another embodiment, autofocus capability and 5–6 picosecond electronics are included, which extends the system's range accuracy to $_\pm 1$ mm and $_\pm 1$ mm spatial accuracy over $_\pm 50$ m. The range (and accuracy) of the system can be significantly influenced by the choice of eye safety classification selected, but these limitations are not inherent limitations of the invention itself.

Figure 6:
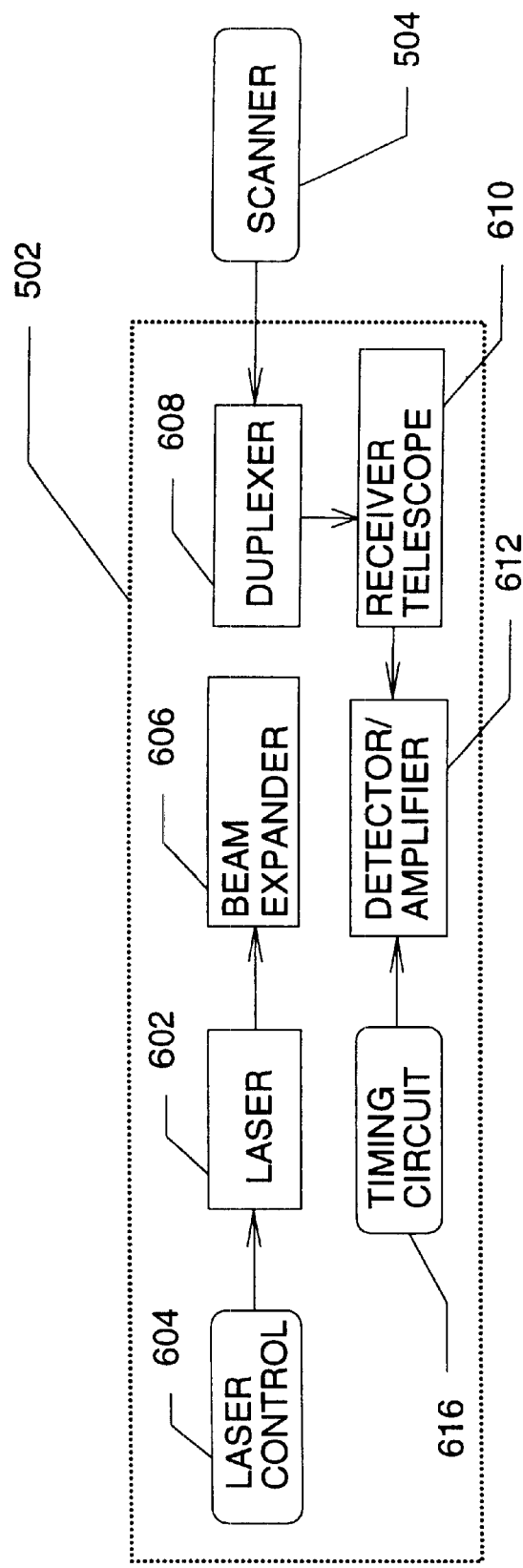
FIG. 6 is a block diagram of the optical transceiver of the FIG. 5 FDV.

The following is a description of the key components of preferred embodiment of the FDV 10. A block diagram of the optical transceiver 502 of the FDV 10 is shown in FIG. 6. The optical transceiver 502 transmits an optical pulse to a spot on object 20, and receives a reflected optical pulse from the object 20. Given the constant speed of light, the optical transceiver calibrates the distance to the spot on the target.

Referring to FIG. 6, the laser 602 fires an optical pulse which lasts less than 250 psec, in response to an external command provided from a laser controller 604. The laser 602 produces a pulse, preferably at a wavelength of 532 nm, within 100–300 μsec after an external signal emanating from a digital signal processor which provides central control of real time events. The time delay is a complicated function of recent laser history and environmental conditions. This function is not completely known at present. However, a software algorithm, which is described elsewhere, is employed to estimate the time delay with adequate accuracy for the required measurements.

The laser beam output of the laser 602 is transmitted through a beam expander 606 that is focused to adjust the size of a light spot that will eventually impinge upon a point on the object 20. The focussed optical pulse is then transmitted through a duplexer 608, which is an optical system for aligning the outgoing optical path with the incoming optical path. The duplexer 608 directs a significant first portion of the light energy of the outgoing optical pulse to a spot on the object 20 via a scanner 614, but a second, much smaller portion, of the light energy of the outgoing optical pulse is directed to a receiver telescope 610. The portion of the outgoing optical pulse that propagates to the object 20 impinges on the spot on the object 20, and some of the energy of the optical pulse is reflected off the object 20 in a direction back to the duplexer 608. The returning optical pulse is directed by the duplexer 608 to a receiver telescope 610, which focuses the received energy onto a detector 612. The detector 612 converts the received optical pulse energy into electrical energy, and the output of the detector 612 is a series of electrical pulses, the first (which is generated by the detector 612 in response to the second, small portion, of the transmitted pulse not directed toward the object 20) occurs at a short fixed time (i.e., fixed by the length of the optical path through the beam expander 606, the duplexer 608 and the receiver telescope 610) and the second of which occurs as light energy returns from the object 20. Both the second, small portion of the transmitted pulse not directed toward the object 20, and the return optical pulse reflected from the spot on the object 20, are provided to the timing circuit 616 which calculates the time of flight to the spot on the object 20. The range to the spot on the object 20 can then be readily calculated from the calculated time of flight.

Figure 7:
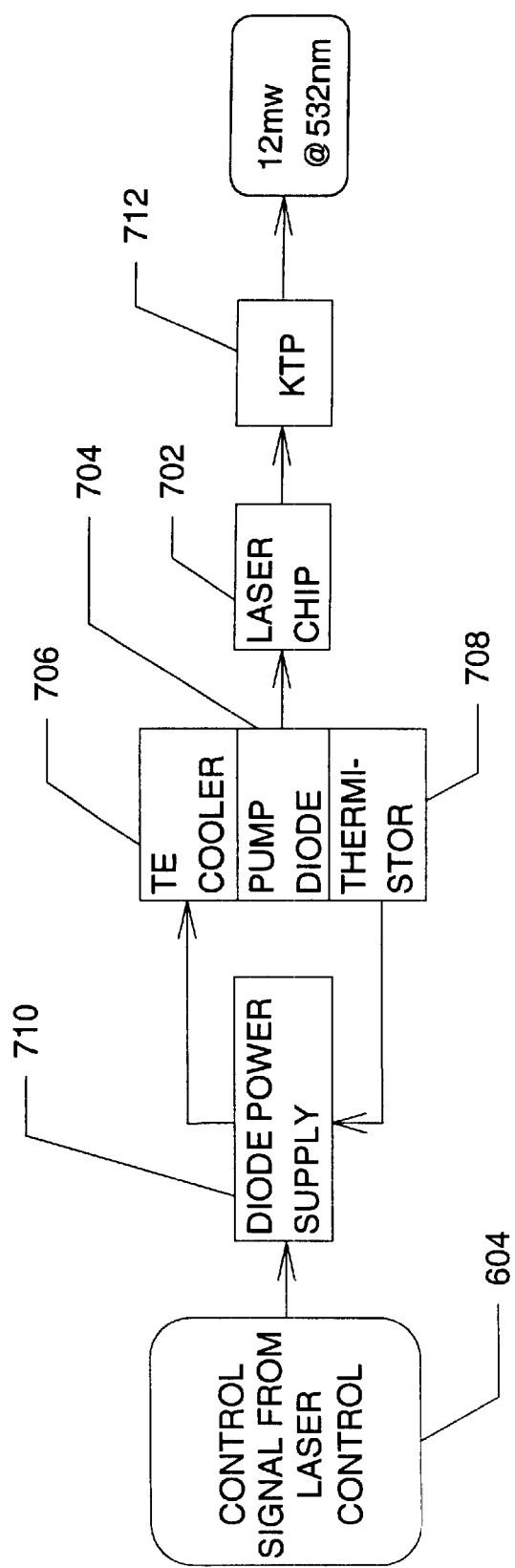
FIG. 7 is a block diagram which shows an embodiment of the laser.

FIG. 7 is a block diagram which shows an embodiment of the laser 602. The heart of the laser system 702 is a conventional laser chip 702 that include two bonded crystals coated with antireflective dielectric coatings on their faces. The laser chip 602 is pumped with a solid state diode 704 operating at 808.5 nm $_\pm 3$ nm. The output frequency of the diode pump 704 is adjusted by changing its temperature with a thermoelectric cooler 706. The temperature of the diode pump 704 is measured with a thermistor 708, and the measured temperature is fed back into the diode power supply 710. The required temperature varies with each individual diode, but it typically ranges from 20° to 30° C.

The output power of the diode pump 704 is typically 1 watt, launched into a 100 μm core glass fiber. When continuously pumped, the output of the crystal laser 602 is approximately 35 mW average power at 1.064 μm, which corresponds to 2.4 μJ pulses lasting about 280 psec at a repetition rate of 15 kHz. The multimode fiber is preferably terminated by an SMA905 solid brass connector, with the crystal of the laser chip 702 glued to one end of the connector with an optical resin. Thus ensures adequate thermal dissipation from the crystal of the laser chip 702, keeping the crystal 702 within the temperature range required for most efficient operation.

A piece of KTP frequency doubling crystal 712 is held within a few millimeters of the face of the laser chip crystal 702. This provides an ultimate output from the laser 602 having a 12 mW average power at 532 nm, which corresponds to 0.8 μJ pulses lasting approximately 218 psec. This ultimate output from the laser 602 is nearly diffraction limited (i.e., one which has theoretically minimum divergence, given a specific wavelength and waist diameter), with an apparent waist diameter of 56 µm.

Embodiments of the invention which meet FDA Class II eye safe system design specifications are potentially more commercially viable. In order to meet this specification, the maximum energy per pulse that can be transmitted at 532 nm is 0.2 µJ. With this restriction, the average power transmitted is largely dependent on the pulse repetition rate, and is given by the following table

| CLASS | ENERGY PER PULSE | AVERAGE POWER | REPETITION RATE |
|---|---|---|---|
| I | .2 µJ | .39 µW | 1.95 Hz |
| IIA | .2 µJ | 3.9 µW | 19.5 Hz |
| II | .2 µJ | 1.0 mW | 5 kHz |
| IIIA | .2 µJ | 5.0 mW | 25 kHz |

In one embodiment of the invention, the beam expander 606 is entirely conventional (e.g., Melles Griot model number 09LBM013, 10×beam expander). The transceiver 502 has cross axis accuracy which is proportional to the size of the laser beam impinging on the intended target. The base design of 6 mm accuracy has a simple beam expander. The laser 602 can be collimated with a fixed 10×beam expander 606 which has an aperture of <1 cm to produce a beam whose $1/e^{2*power}$ beam width is less than 6 mm over a range of 50 m.

Figure 7A:
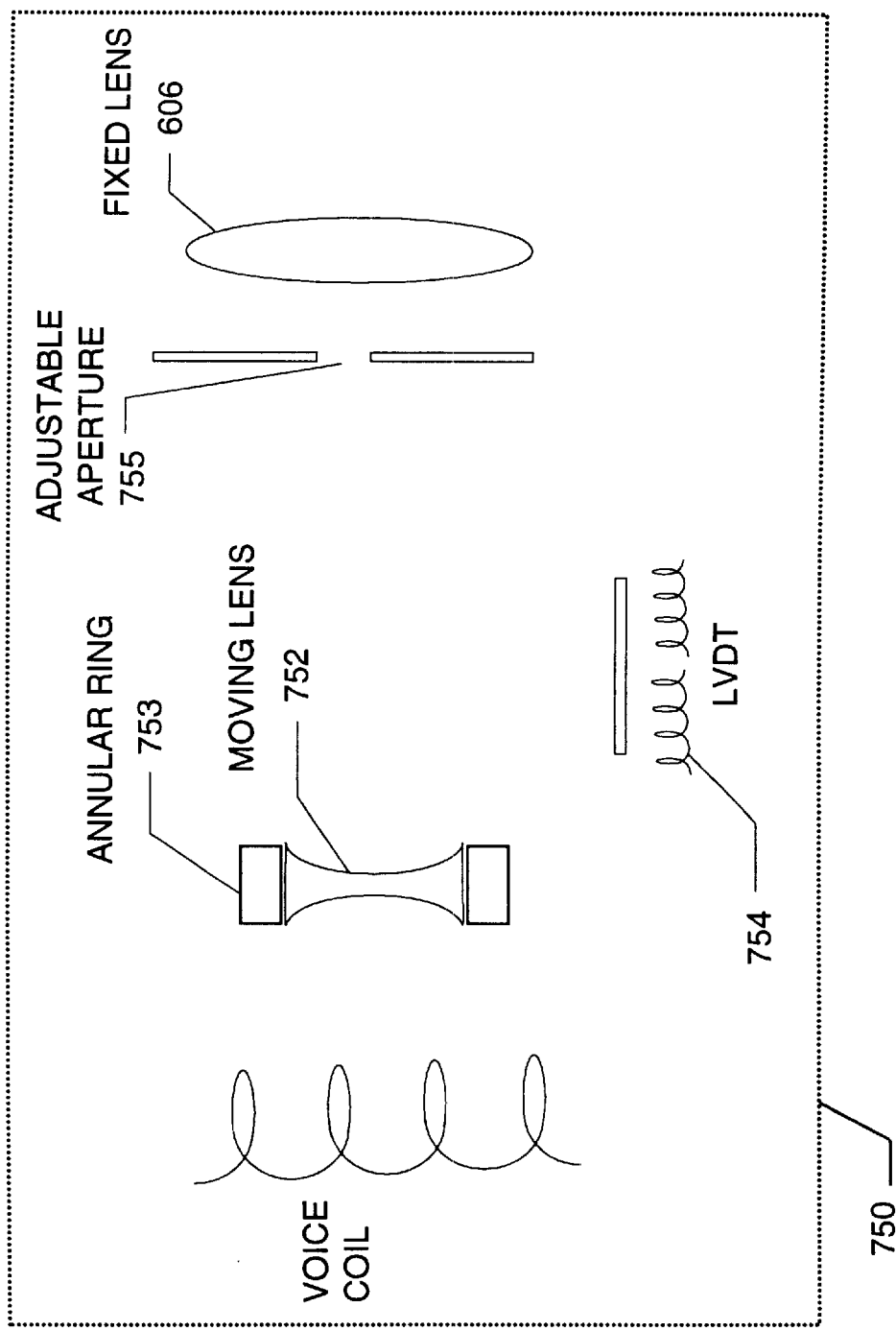
FIG. 7A is a block diagram of an embodiment of the beam expander shown in FIG. 6.

FIG. 7A shows a further embodiment 750 of the beam expander 606 that includes features which allow the system of the invention to measure ranges at an accuracy of approximately 1 mm at 50 m. This is because the impingement spot on the object 20 of the laser beam expanded by a conventional beam expander is collimated, and produces a spot of no more than 6 mm over a 50 m range. However, a beam can be focused through a 50 mm aperture to a spot of size no more than 1 mm over a 50 m range—but the spot will be much larger at other ranges. Thus the beam expander 750 of a system having 1 mm accuracy at 50 m includes a movable optical element 752 which can change the size of the focused spot. Additionally, the beam expander 750 includes an adjustable aperture 755, and means for controlling the adjustment, so that the distance, from the laser, over which the beam stays at 1 mm in diameter remains approximately constant. The minimum diameter spot produced with a diffraction limited lens of focal length f and diameter D is $d_0 = 2f\lambda/D$. The Rayleigh range of the focused spot, which is the depth of focus of the beam, is given by $b = 2\pi\omega_0^2/\lambda = 2\pi f^2 \lambda / D^2$. Thus, if f/D is held constant, the depth of focus will not be a function of the range of the focused spot, f.

As the beam focus is changed, the elements should stay sufficiently aligned so as to prevent the beam from changing direction by more than a fraction of 1 mm at 50 m, or this will appear as an error in the placement of the point in space. In order to minimize this beam wander, a linear servo motor 754 (see FIG. 7A) is employed for controlling the position of the focusing mechanism, and a transducer provides position feedback. The lens 752 is mounted in an annular ring 753, which prevents it from rotating or misaligning while it is being translated.

Duplexer

Figure 8:
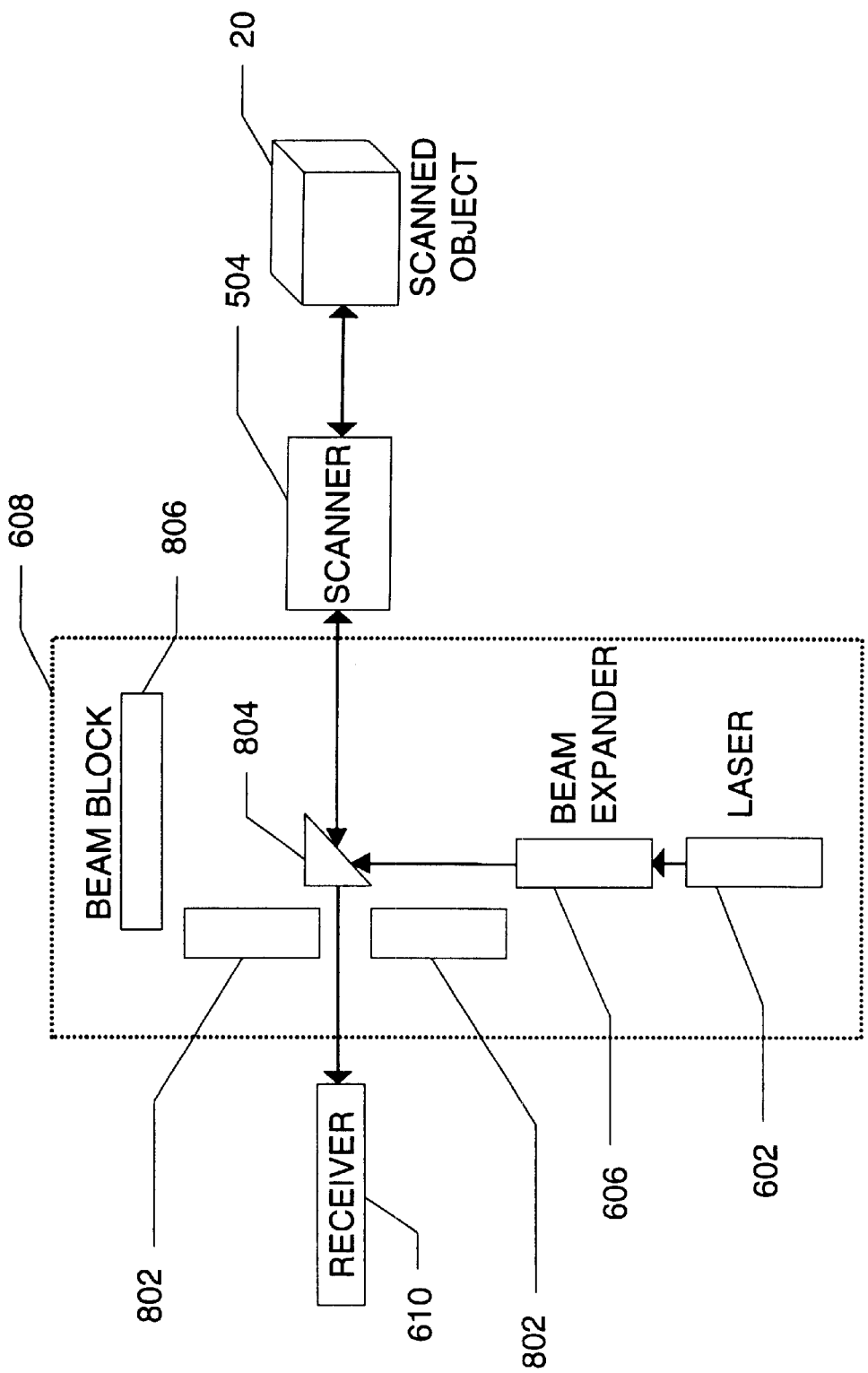
FIG. 8 shows an embodiment of the duplexer.

An embodiment of the duplexer 608 is shown in FIG. 8. The optical system of the duplexer 608 is conFig.d such that the outgoing beam from the beam expander 606 to the scanner 504 is coaxial with the return beam reflected from the object 20. Thus, only one scanner 504 need be provided. In the embodiment of the duplexer shown in FIG. 8, a window 802 is provided, with a 50% beamsplitter 804 attached over the window 802. When an optical pulse is transmitted from the laser 602 and through the beam expander 606, the pulse impinges upon the beam splitter 804. Most of the light energy of the pulse is reflected off the beam splitter 804 and is passed to the scanner 504, but some of the optical pulse proceeds through the beam splitter 804 and impinges upon a low reflectance beam block 806. Due to the low (but non-zero) reflectance of the beam block 806, a small fraction of the optical pulse hitting the beam block 806 returns to the beam splitter 804 and is reflected into the receiver 610.

Moreover, as an optical pulse returns from the object 20, since only the central portion of the return pulse is obscured by the prism 804, most of the light impinging on the window 802 makes its way to the receiver 610.

Partially Reflecting Duplexer

Figure 8A:
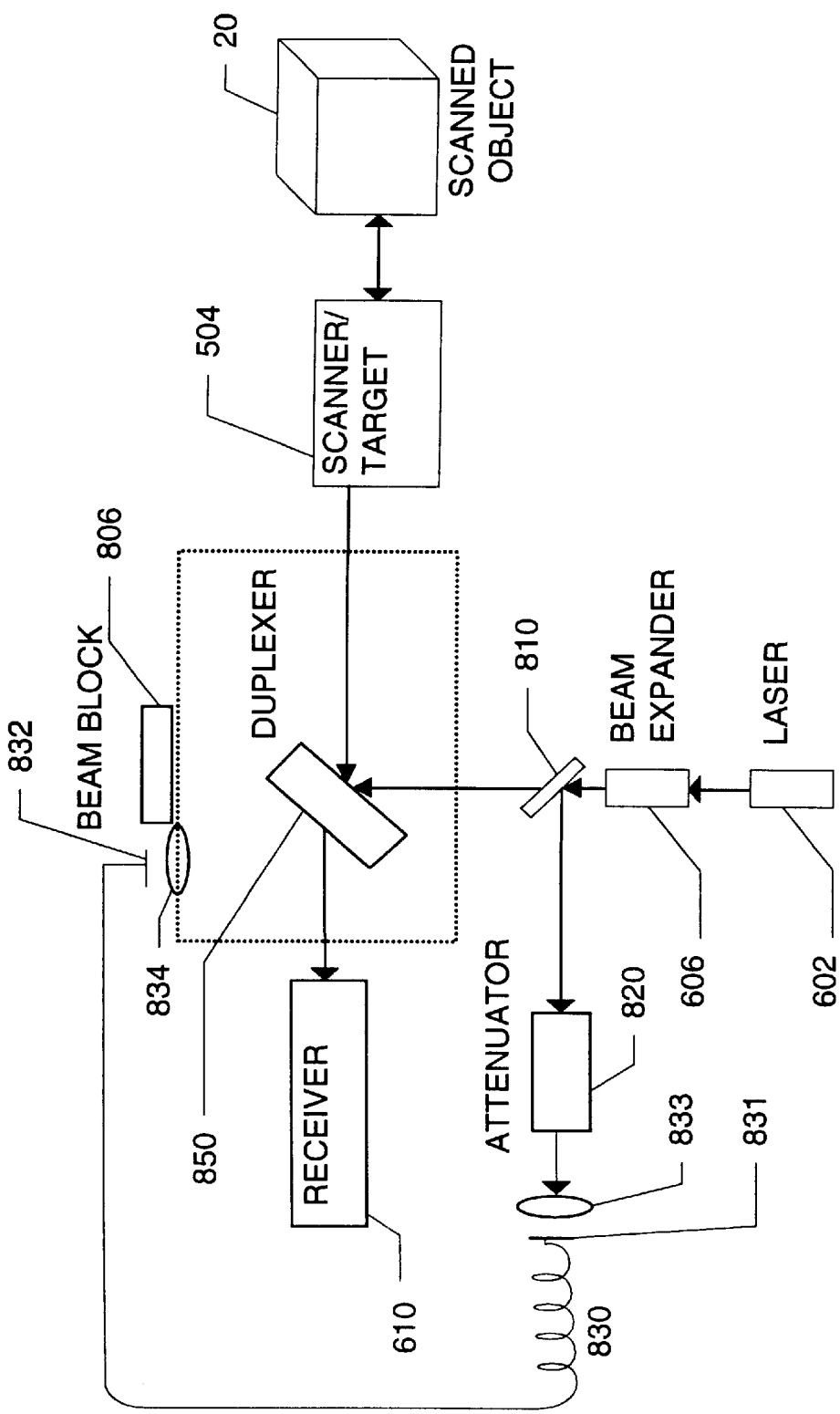
FIG. 8A shows a partially-reflecting duplexer.

Referring now to FIG. 8A, for the 1 mm accuracy embodiment, a partially-reflecting duplexer 850 is employed. With this duplexer, a fraction of the light pulse provided from the beam expander into a beam stop 652 and reflects off the duplexer window 850 to the receiver telescope 610. The remainder of the light pulse proceeds to the object 20. Most of the return light pulse from the object 20 continues on through the window 850 and is collected by the receiver telescope 610. The window 850 is AR coated on the receiver side, and partially mirrored on the laser side. The entire window 850 is used to steer the outgoing beam, since a 50 mm aperture is required to focus the spot to 1 mm at 50 m. The partial reflectance is chosen in view of the laser transmission power and the applicable eye-safe classification level. For example, if the laser transmission power is four times the allowable level of the applicable eye-safe level, then the partial mirroring is chosen to reflect 25% and absorb 75%.

Figure 9:
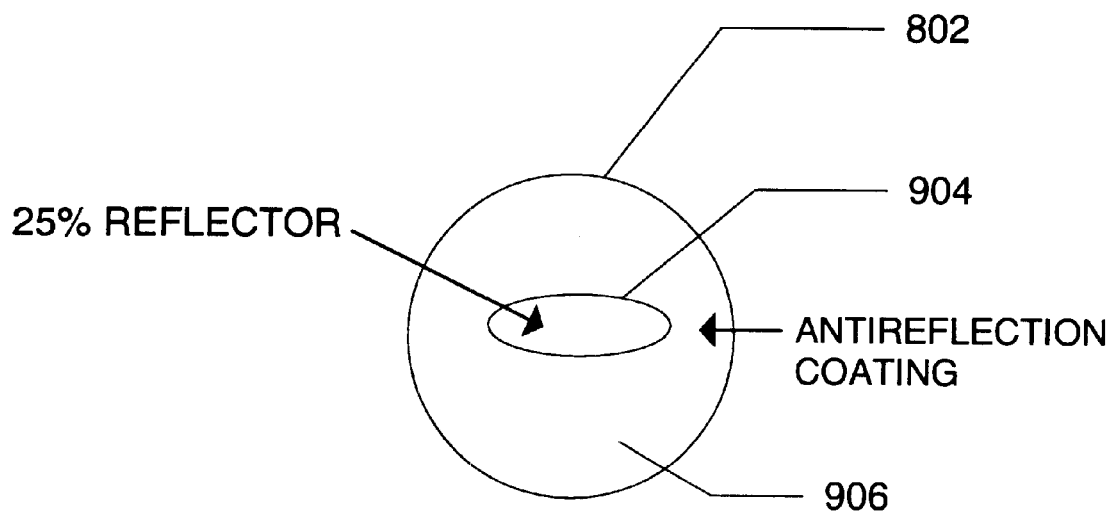
FIG. 9 shows an embodiment of the window of the FIG. 8 duplexer.

Referring now to FIG. 9, in the 6 mm embodiment, improved efficiency can be achieved in collecting the return optical pulse if only the center of the window 802 is coated 904 to reflect the outgoing pulse, and the remainder of the window 802 is anti-reflective coated 906. In this way, the return optical pulse is not reflected out of the receiver by the part of the window 802 that is antireflection coated 906.

Preferably, the laser 602 emits a strongly polarized beam so that the reflective coating 904 can be optimized to have slightly different reflection coefficients for the two planar polarizations (20%-S and 30%-P). In such an embodiment, the power of the beam impinged onto the object 20 can be fine tuned merely by physically rotating the laser body.

Receiver Telescope

Referring again to FIG. 6, after the returning pulse has passed through the duplexer 608, it is collected by the receiver telescope 610, which optimizes the amount of signal provided to the detector 612. The receiver telescope 610 may be a simple 50 mm aperture lens. The lens is preferably selected so that the variation in pulse energy entering the detector 612 does not change as a function of the distance to the object 20 over the range of distances for which the instrument is designed. A multiple element lens can be designed to minimize the variation in received pulse energy as a function of range somewhat more effectively than a single element lens. That is, at the greatest expected distance, the focal length of the lens is such that all the incoming light, which is effectively collimated since it is generated by a point source in the far field, is focused to completely fill the detector 612. As the object 20 becomes closer to the telescope 610, the spot of return light becomes larger than the detector 612. The power incident on the detector 612 increases as the square of the distance from the telescope 610 to the object 20, up to the maximum expected distance. Moreover, the power returning from the object 20 decreases as the square of the distance from the telescope 610 to the object 20. Thus, in practice, these two effects approximately cancel each other. This minimizes the variation in optical power incident on the detector 612 over the range of anticipated use. In the 1 mm option, the receiver optics can be improved in some cases by using a two element, adjustable focus, Newtonian telescope (e.g., similar to the 1 mm beam expander).

Detector

The detector 612 converts optical pulses to electrical pulses which can be processed by the elapsed time measurement electronics (timing circuit 616). In one embodiment, the detector 612 is an avalanche photodiode (APD) with greater than 1 GHz electrical bandwidth. In addition to the time between the start and any stop pulses, the intensities of all the pulses are recorded. The intensity information is used to make a correction to the range measurement derived from the timing information.

Scanner

Figure 6A:
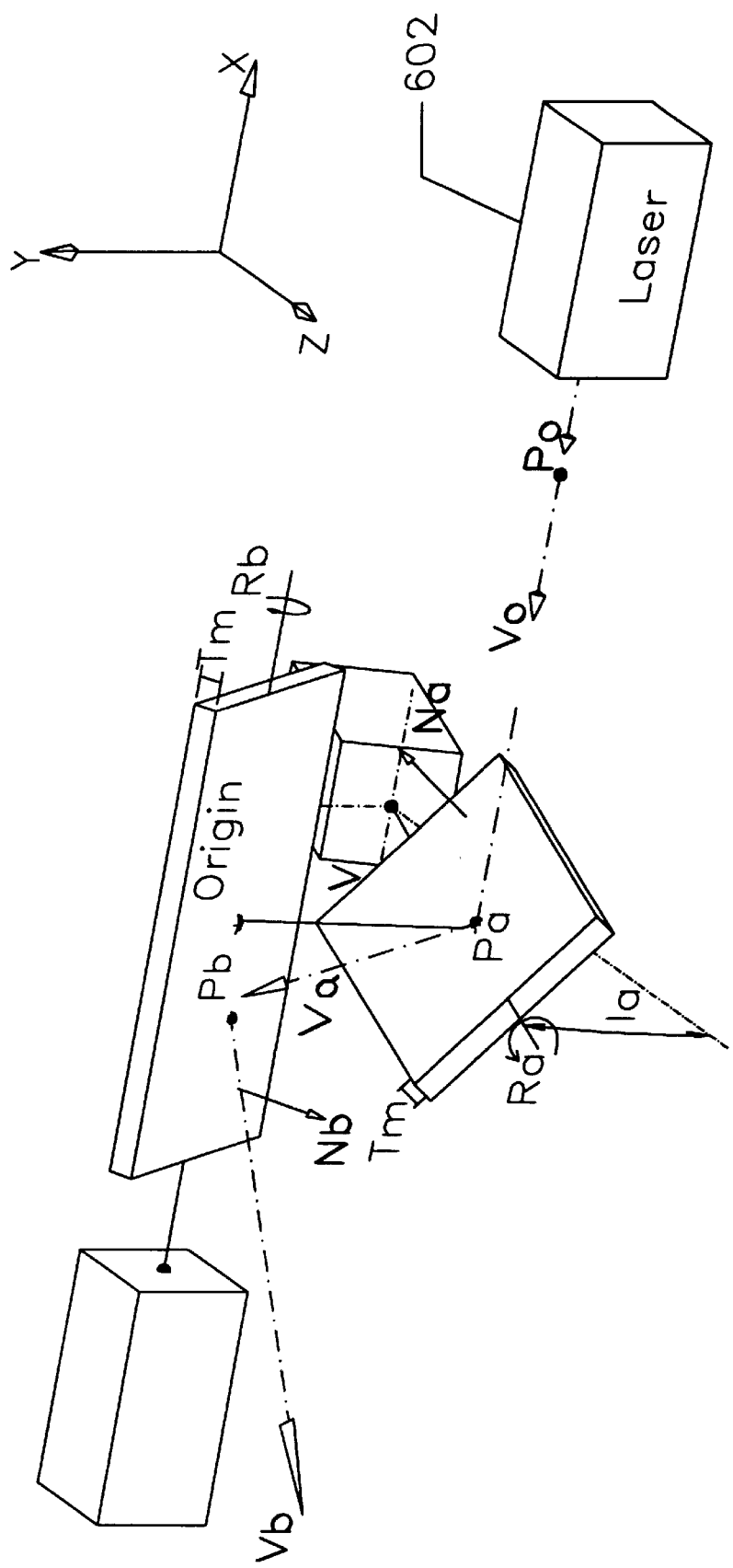
FIG. 6A shows a dual mirror arrangement of the scanner shown in FIG. 6.

The scanner 504 may be conventional. The scanner 504 directs the outgoing pulses from the duplexer 608 to a desired position on the object 20 and directs the incoming return pulse into the receiver telescope 610. The scanner 504 directs light to the narrow field ccd camera 507 to collect color and texture in the immediate vicinity of the scanned laser points, which provides for precise registration of color and texture obtained with the lidar acquired point geometry. In one embodiment, the scanner 504 includes a dual mirror arrangement (see FIG. 6A) for beam steering, although any conventional high accuracy and repeatability beam steering mechanism may be employed. The dual mirror arrangement includes two mirrors which are rotated on orthogonal axes by moving coil motors. These motors have an integral position decoder which has angular repeatability of less than 1 microradian. The mount for the scanners is integrally formed with the supports for the laser and other optics. This system provides 40 degrees of optical motion in both altitude (elevation) and azimuth at several Hertz.

Electronics

A. Timing Circuit

Another embodiment of the scanner 504 mechanism consists of a single mirror rotating about a central axis, mounted on a rotating turret. In this configuration, the physical coordinate system would be spherical, with the faster (due to the less inertia) mirror providing the elevational angle and the more slowly rotating turret providing azimuthal motion. A system such as this could provide a field of view of more than 90 degrees in a vertical plane and a full 360 degrees in a horizontal plane (both planes being relative to some chosen scanner coordinate system.

Electronics

Ranging Electronics

The function of the ranging electronics is to compute the range from the FDV 10 to the object 20 based upon the electrical output of the detector 612. Several possible methods may be used, including a demodulator in the case of a quasi-CW modulated laser system. For the preferred time of flight embodiment, an interval timer (timing circuit) measures the relative time interval between an initial (start) pulse reflected directly into the receiver 610 by the duplexor 608, and the pulse reflected off of the object 20 back into the receiver 610.

Reflectivity Electronics

In many cases, it is useful to know not only the position in space of a point on the object 20, but also know the reflectivity (at some particular wavelength) of that point. The reflectivity electronics measure the amount of light reflected from the object 20 into the receiver 610 and detector 612. This data can be used to provide corrections to the range information as well as the information on the material and/or finish of the surface of the object 20.

Digital Signal Processor

A digital signal processor integrated circuit controls all the time critical functions of the FDV—scanner control, laser fiing. It also provides fast floating point computation capability for making geometry corrections, calibration corrections, and video lens corrections, and video compression. The digital signal processor is interrupted at regular time intervals, typically about 10 usec. At each of these time intervals, a check is made to see what real time calculations are outstanding.

Scanner Control

The electronics for the scanner are a simple precision PID controller which are driven by a digital signal from the DSP. When driving this system quickly, there is noticeable lag in the ability of the scanner to follow the driving signal. However, the controller circuit does not have an error signal output. An external precision analog differential amplifier provides an error signal (the difference between the command signal and the actual displacement), which is sampled by the DSP at low resolution. The DSP then computes the exact scan position by computing the sum of the command signal and the error signal. The advantage of this method is that it requires only a low resolution A/D converter and a precision D/A converter, rather than a far more expensive precision A/D.

Figure 10:
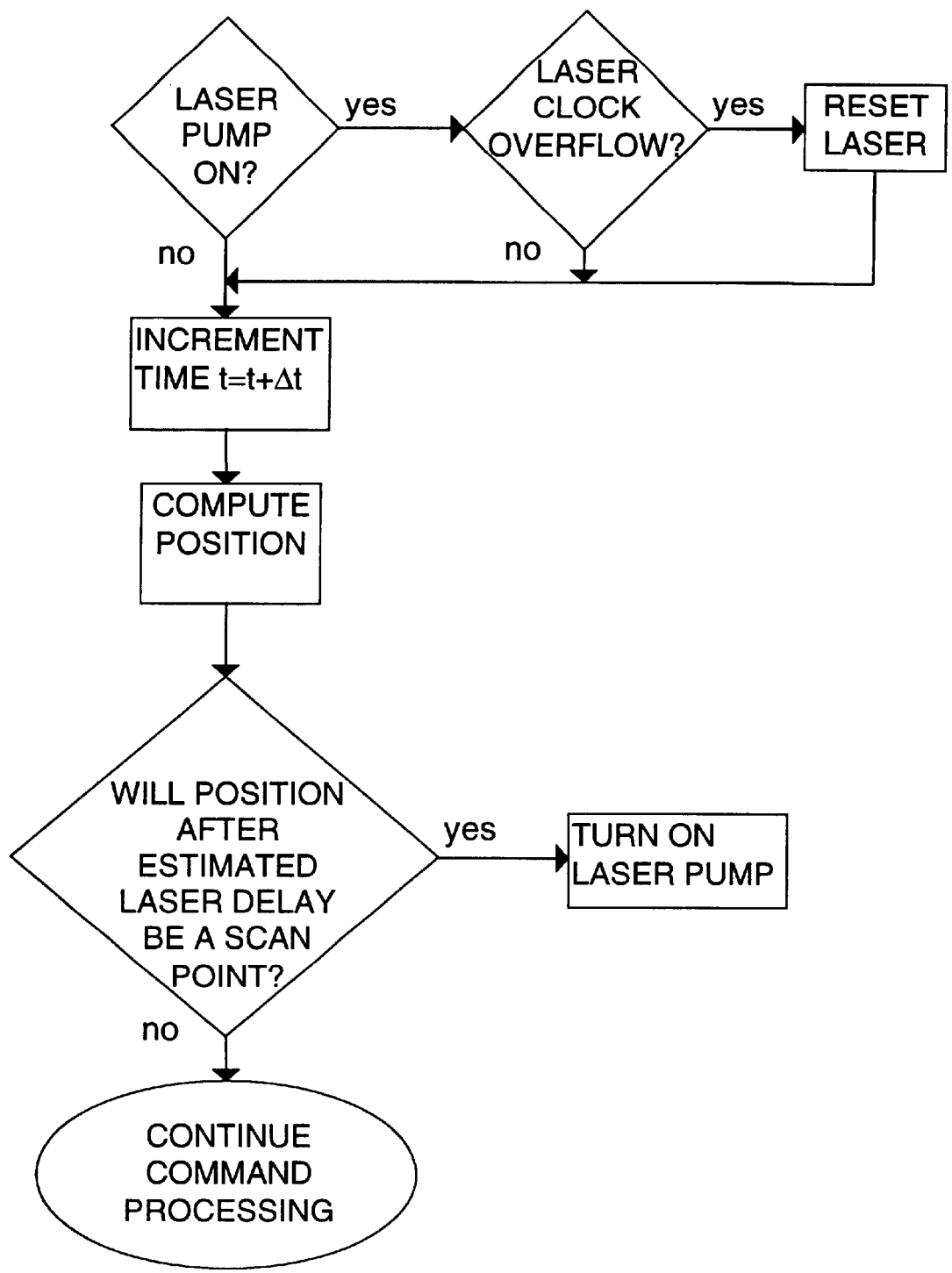
FIG. 10 is a flowchart that shows calculations performed by the FDV DSP.

The digital signal processor generates the trajectories for the analog scanner controller, and makes measurements of the difference between the desired trajectory and the actual position. It predicts the time at which the laser pump is turned on so that the laser will fire at the desired angle. These predictions are made at regular time intervals. FIG. 10 is a flow chart that shows the calculations performed at each time interval.

Trajectory Computation

The user defines areas within the view of the scanner that are to be scanned, and indicates the density of points to sample within the scanned region. There are several scan patterns which can be used, and these require a specific pattern of mirror movement, known as the trajectory. The objective of picking a good trajectory are the conflicting needs of doing the move quickly and accurately. Accurate movement requires minimum torque, which would otherwise deform the apparatus. This limits the speed with which motions can be made. At equal time increments, a calculation is performed to determine the current position of each mirror. The particular calculation used depends upon the type of scanning employed.

Raster Scanning

Figure 11A:
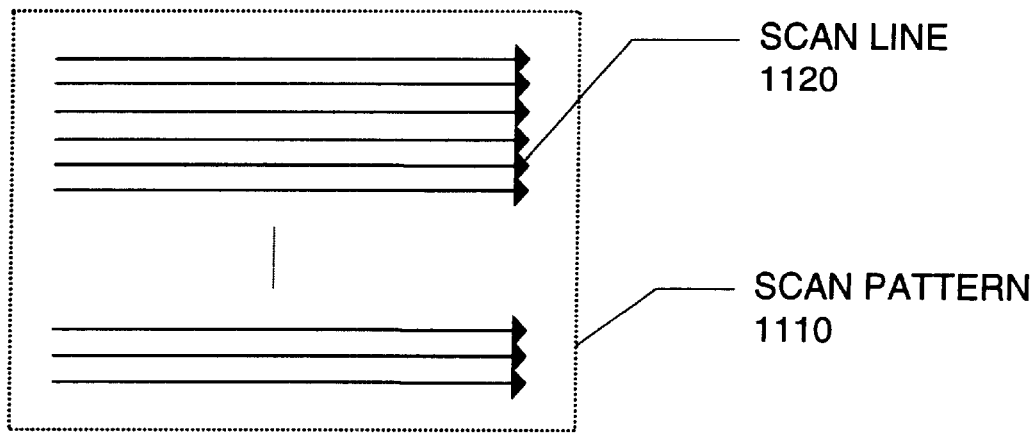
FIGS. 11A and 11B show a unidirectional scan pattern and a bi-directional scan pattern, respectively.

When the desired scan field is a polygon, one of two raster scanning patterns is used. In the first, scanning is unidirectional (i.e., always proceeds from left to right, or right to left, on parallel lines). FIG. 11A shows such a unidirectional scan pattern. In between scan lines, the scan mirror retraces to the beginning of the next line without making any range measurements. The retrace can proceed quite quickly since no measurements are being made during the retrace.

Figure 11B:
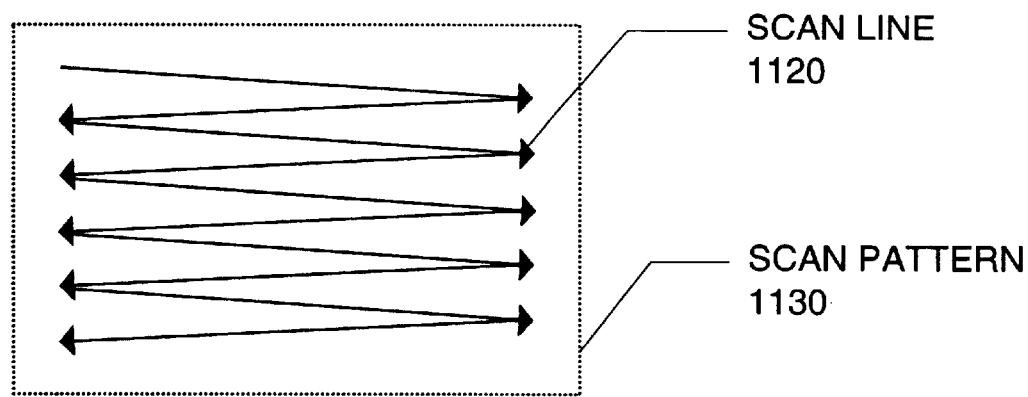

A slightly more efficient means of raster scanning is bidirectional, in which scanning is also performed on the retrace. FIG. 11B shows such a bidirectional scan pattern. This is not as efficient as it might seem because the retrace time is used for other calculations, and because the resulting scan pattern is not as regular.

Both raster scanning methods require traversing a straight line in the minimum time, starting at zero velocity and ending at zero velocity. The torque applied to the mirror is proportional to the angular acceleration, which must zero at the beginning and end of the scan since the mirror is at rest. It can be shown that the trajectory that makes such a minimum energy move between two points is given by the sum of a straight line and a full cycle of a sin. However, this is closely approximated with much less computation by the minimum degree polynomial, with boundary conditions $p(t0)=p0$, $p'(t0)=0$, $p''(t0)=0$, $p(t1)=p1$, $p'(t1)=0$, and $p''(t1)=0$ which is the fifth order polynomial: $p(t)=(p_1-p_0) t'^3(6t'^2-15t'+10)+p_0$, where $t'=(t-t_0)/(t_1-t_0)$.

Spiral Scanning

A disadvantage of raster scanning is that since the speed of the trajectory is varying, the scanning efficiency is not optimal. A spiral pattern can achieve a constant speed trajectory which permits a uniform point distribution.

Seeking

In addition to scanning a range image, the system is capable of performing a number of functions which are common in surveying. The scanner can be made to search for important features, or locations of high reflectivities. This allows the system to perform normal surveying functions by finding a target whose location is approximated identified, and reporting its exact angles and position.

Angle Calibration

The capacitive encoders in the moving coil motors have tremendous repeatability, but relatively poor accuracy. A number of calibration activities need to be continuously performed to ensure system accuracy.

Before use, each scanner is calibrated over its complete range of angles. At a number of discrete temperatures, a map is created and stored of the measurements of apparent angles for thousands of accurately measured points using an external resolver that is traceable to NBS standards. The DSP linearly interpolates between these measured points on every angle measurement.

Preferably, the accuracy of angle measurement is improved by determining scale or offset errors in the encoder during operation. Commercially available scanners can drift significantly with environment changes. This results in a shift in the effective zero and full scale range of the angle measurement, while maintaining the overall shape of the calibration curve obtained by making careful laboratory measurements before the scanner is installed in the system. The environmental effect is reduced by providing a means for determining when the scanner is at a known and repeatable angle. In one preferred embodiment of such a system, two optical references which are fixed with regard to the case of the instrument are aimed at the back of each scanning mirror. There are a variety of mechanisms for providing the optical reference, but in one preferred embodiment, a pair of autocollimators are aimed at a reflective surface on the back of the scanning mirrors and will provide a highly repeatable measurement of when the mirror is normal to the axis of each autocollimator. Each autocollimator gives a reference angle to within approximately 10 $\mu$rad. Periodically, the scanner is moved under computer control to the position at which the mirror is closes to being normal to the autocollimator axis, and the apparent angle is measured. The measurements are compared with the measurements taken when the scanners were calibrated, and a linear correction is calculated and applied to every subsequent measurement.

In an alternative embodiment, a pair of mechanical stops is provided just past the normal range of motion of the scanning mirror. Periodically, the mirror is driven until it touches a mechanical stop. Then, the scanning mirror is driven with a known current, which corresponds to a known force. The mirror arrives at equilibrium at a very repeatable position, and this is used to calculate a linear correction to the mirror calibration curves.

Range Calibration Fibers

The timing circuits have a certain amount of offset and scale drift with time and temperature, and a provision has been included to compensate for these variations. When an optical pulse is emitted from the laser 602 a small amount of the energy is sampled by a beam splitter 810 and introduced into a single mode optical fiber 830 by focusing the beam using a lens 833 on the fiber face 831. The other face of the fiber 832 is arranged so that the beam which comes out of it is collimated into a beam which enters the lidar receiver 610. The fiber can either be produced so that its length does not vary with temperature, or its variation in length with temperature can be accurately characterized. When a single mode fiber is used, the variation in propagation delay will be less than a few picoseconds and the pulse shape emitted by the fiber will be nearly identical to the pulse shape going into the fiber. Periodically, the timing circuits are used to measure the propagation delay through the fiber, and corresponding adjustments are made to the range measurements taken from external surfaces.

The fibers can be manufactured so that the end at which the pulse is launched 833 and from which the pulse is emitted 834 are partially reflecting. When this is done, the pulse enters 833 and is propagated to the opposite end 834, at which point only some of the energy is released and the rest returns to the first end 833. Again, a fraction of the light is emitted, and the rest reflected, which eventually is emitted into the receiver. This process repeats until the remaining energy in the fiber falls to negligible levels. The result is a sequence of pulses, commonly 3–10, being applied to the receiver, which have delays all repeatable to within a few picoseconds. Periodically, the timing circuits are used to measure these pulse trains from the fiber, and corresponding adjustments are made to the range measurements taken from external surfaces.

Range Walk Calibration

The lidar system measures the range of surfaces by timing the delay between the laser pulse being emitted and returning from the surface. This delay is measured electronically by imposing a sample of the outgoing pulse, and the return pulse on an optically sensitive electronic detector 612 embedded in the receiver 610. In one, embodiment, the electronic timing circuit measures the time between when the outgoing pulse exceeds a set threshold voltage, and when the return pulse exceeds the same voltage. The outgoing pulse will be the same intensity within a few percent. However, many surfaces vary greatly in the amount of light that will be reflected. The result is that the apparent relative time for two pulses which occur at the same range but have different intensities may appear to be at different ranges. The measured time for a small pulse 3810 to first exceed the threshold level will be later than the measured time for a large pulse 3830 to exceed the same threshold, even when the pulses return from objects at the same range. Thus highly reflective objects or objects at distances of maximum transceiver sensitivity will appear slightly closer. This creates an apparent "range walk" as a function of intensity. The range walk can be corrected if the shape of the optical return is always the same and the energy of the return is known. The extremely repeatable shape of the pulses generated by the passively Q-switched microchip laser makes this possible.

Part of the timing circuit estimates the energy in each detected pulse. A table of corrections is maintained to improve the range estimates. Two different circuits have been employed to make a measurement of the pulse energy for this purpose. The first is a gated integrator, the gate being open at the beginning of the pulse, and closed at the end. The signal is applied to a comparator 3920 which closes the switch 3930 when the signal exceeds a selected level, and closes it when the signal falls below the same level. The signal is also applied to a delay 3910, and the output of the delay goes through the switch 3930 when it is closed, and is applied to the integrator 3940 over the period of time the switch is closed. The delay is chosen to compensate for the time lag in the comparator and switch. When the pulse is complete, the value of the integrator is sampled by an analog to digital converter 3950. The second consists of a integrator with a time constant scaled to the width of the pulse 4010, followed by a peak detector 4020 which has a time constant much longer than the pulse width. The output of the peak detector is sampled shortly after the pulse is detected.

Periodically, the timing circuit is used to measure a sequence of pulses which have been delayed by the single mode fibers 830 used to calibrate the offset and scale factors associated with the time circuits. Additionally, the intensity of these pulses are varied over a broad range by a variable attenuator 820. By altering the amount of light coupled into the fiber, the energy of the detected pulses can be varied over the dynamic range of the receiver, at one particular time delay. The intensity and the measured time delay values produce a map of the range walk correction required for each intensity, and this correction is applied to subsequent measurements. This correction can provide accuracy of 1 mm over the dynamic range of the instrument, particularly as a result of the great repeatability of the laser pulse waveform. This function is then used to correct the measured range of external surfaces as a function of light intensity returned from those surfaces.

Geometry Calculation

The output of the FDV after a range scan consists of points in spherical coordinates with respect to a coordinate system in the scanner. However, the raw data consists of mirror angles and time intervals. The DSP computes the spherical coordinates of the scanned points by taking into account scanner geometry (mirror thickness, optic axes, mirror offsets, etc.) and all the appropriate calibration adjustments.

Laser Control

Delay Prediction

The digital signal processor is responsible for controlling the firing of the pulsed laser, but it can only do so indirectly. The processor has control of the timing for starting the pump diode, which causes the passive q-switch to fire after saturation has occurred. However there is a variable delay between turning on the pump and having the laser fire. The delay is a function of junction temperature, which in turn is a complex function of ambient temperature and recent history of laser firing. The delay generally ranges between 100–300 usecs.

Fortunately, it is primarily necessary to know the scanning mirror angle at the precise moment the laser fires. After the laser has been fired just a few times, the pump delay does not change quickly if the firing rate does not change quickly. As a result, accuracy of a few microseconds can be achieved by estimating the next pump delay to be the same as that in the previous firing cycle. The digital signal processor measures the pump delay by reading an internal counter when the pump is started and when the laser actually fires, causing an interrupt. Since the interrupt latency is less than a microsecond, this becomes the timing accuracy to which the pump delay can be measured.

A more sophisticated dynamic model of the thermal properties of the laser could lead to slightly enhanced scanning pattern regularity, but is probably equally limited by the time resolution of the processor interrupts.

Firing Control

Given a time vs. angle trajectory for a scanning axis, w(t), a desired angle to fire the laser, and an interrupt interval Dt, the decision to fire the laser amounts to computing the time at which point the pump diode is started.

Computer Control

Figure 12:
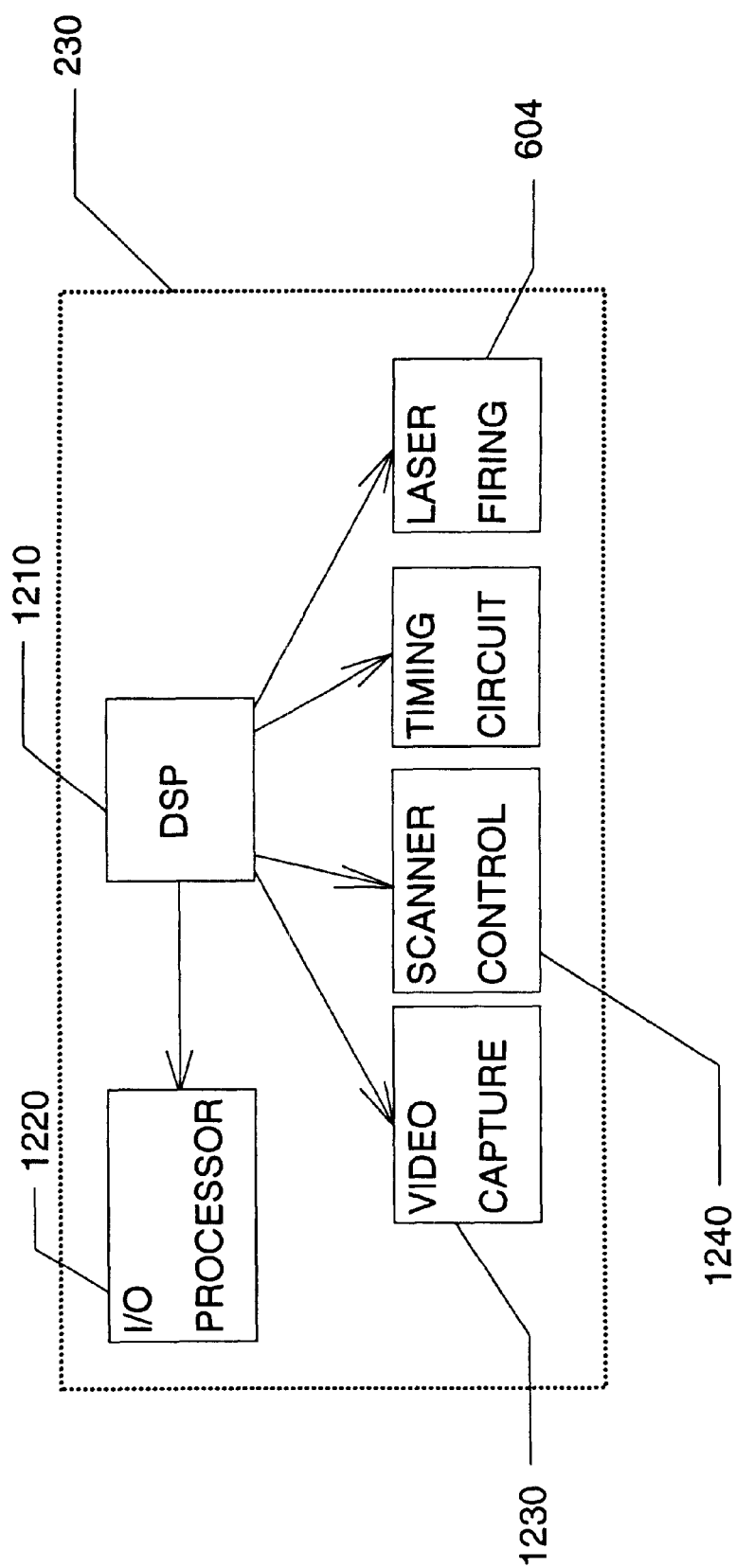
FIG. 12 is a block diagram of an embodiment of the FDV processor.

The FDV is designed to perform under the control of a remote host computer which contains graphical controls for a user to specify areas to be scanned. The remote machine controls the FDV through a bidirectional serial byte stream, which is effected in any of a number of media: Ethernet, EPP parallel port, serial port. A processor in the FDV is assigned the task of decoding messages, and scheduling the required activity. FIG. 12 is a block diagram of the FDV processor.

Host Communications Interface

Figure 13:
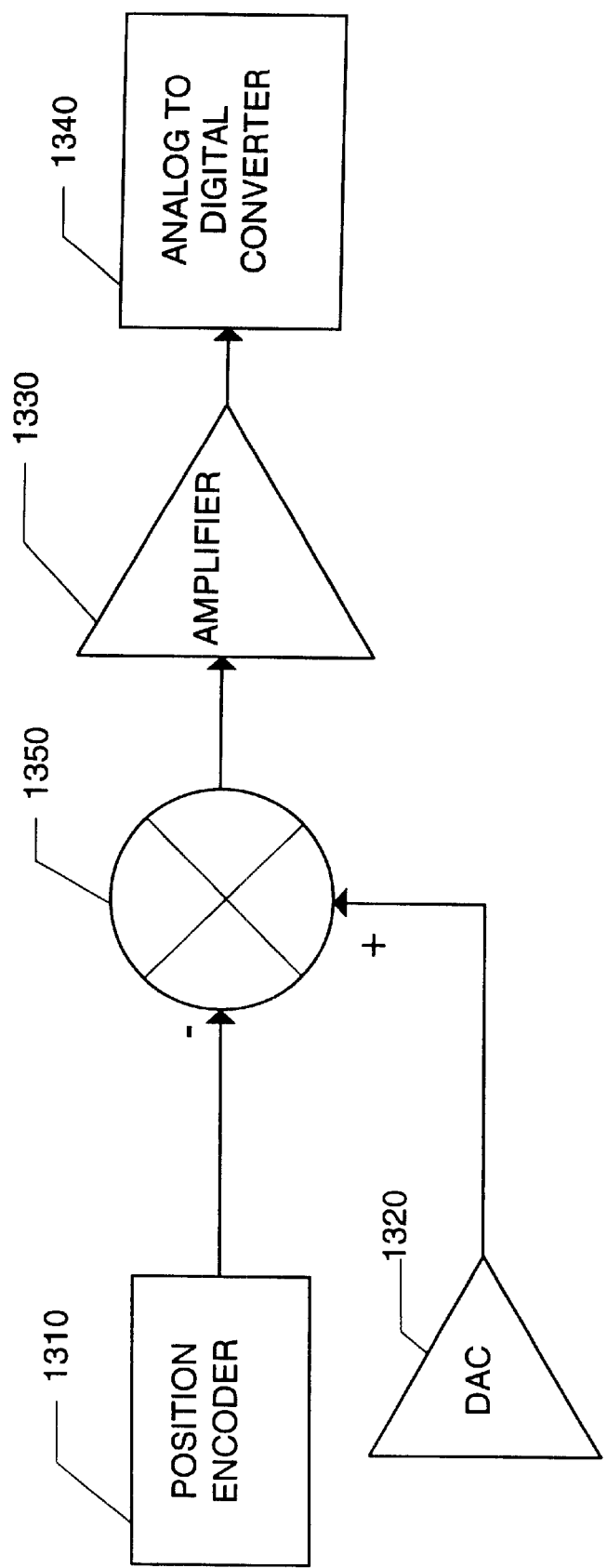
FIG. 13 is a block diagram of example circuitry for determining a desired position of an FDV mirror.

The host machine acts as a master, sending a well defined message protocol to command the FDV. When actions are completed, the FDV responds with data and status information. Among the actions which can be requested are:

Point the scanner measure a distance range scan a box fire the laser n times take a video image Scanner Control Referring to FIG. 13, in normal operation, each scanner in the dual mirror system requires a 16 to 18 bit digital word to set the desired position, which is applied to a precision digital to analog converter to create a voltage proportional to the desired position. However, there will be some error between the position commanded by the output of this converter and the actual position of the scanner, which is reflected by the output of the position encoder. A precision difference signal is generated, and the difference is measured to 12 bit accuracy. This provides an economic method of making 18 bit position measurements while only using an inexpensive 12 bit converter.

Commercially available galvo scanners have microradian repeatability, but have relatively poor scale and offset performance, particularly over temperature. A calibration mode has been incorporated into the system to permit making measurements at two precise angles, and using the two measured data points the offset and scale drift of the scanner can be calculated.

Two methods have been developed for this purpose: an optical and a mechanical means. In the mechanical method, the scanner shaft is gently placed against one of two mechanical stops, and the current in the scanner controller is adjusted to a specific value, which provides a known force. The position signal is adjusted until there is no position error, and this gives the calibrated position measurement. In the optical method, two autocollimators are aimed at the back of the scanner mirrors, which have also been polished and mirror coated. When the scanner mirrors are exactly aligned with one of the collimators, the output from the split photodetector in the autocollimator is balanced. By placing the scanner in each of these precise angles in turn, an offset and scale correction for the scanner encoder can be calculated.

Timing Circuit

Figure 14:
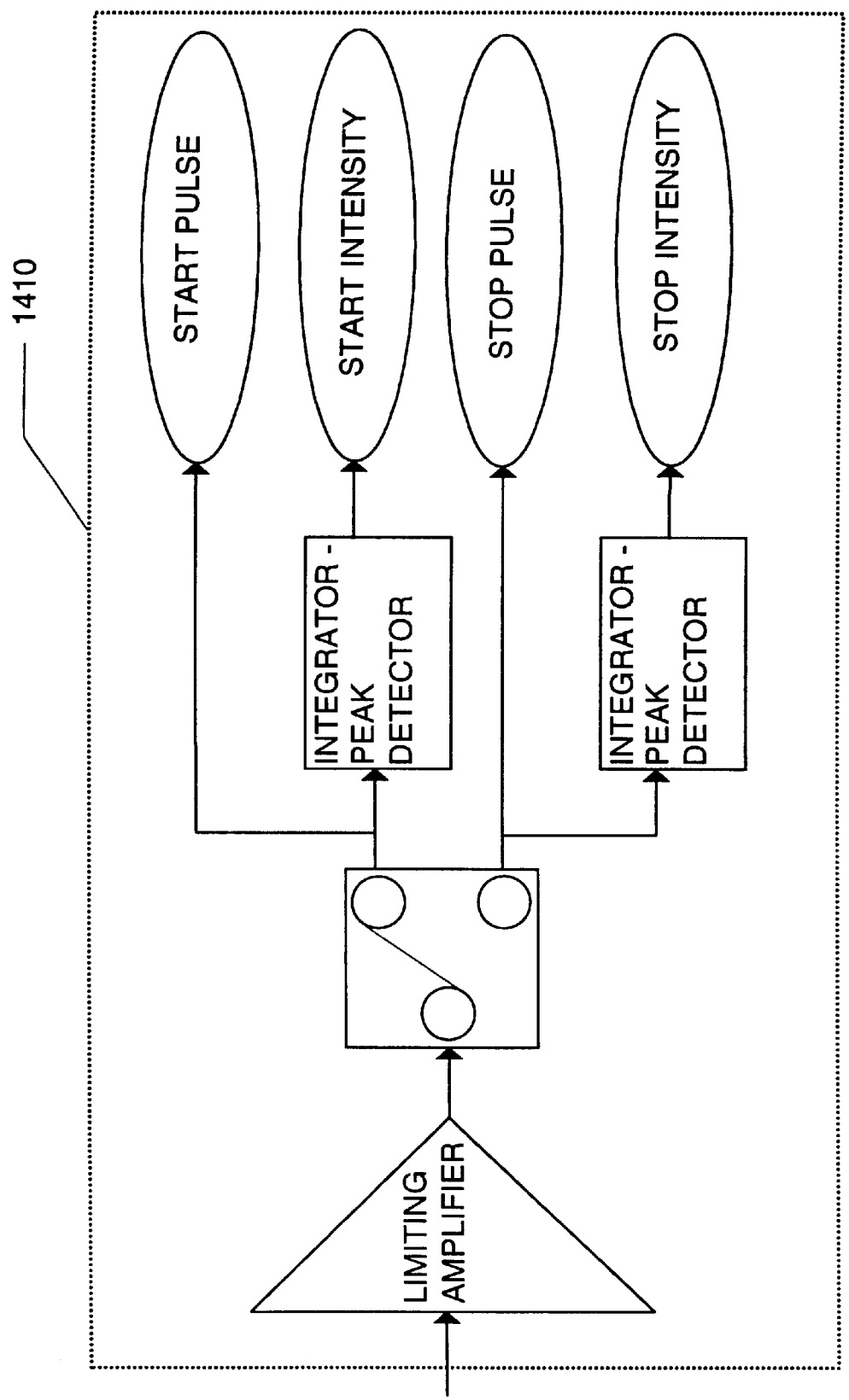
FIG. 14 is a block diagram of an example signal conditioning and energy integration circuit of the timing circuit shown in FIG. 12.

The purpose of the timing circuit is to provide the relative time between the start pulse and the stop pulse, in picoseconds. There are two subsystems in the timing circuit: a signal conditioning and energy integration circuit (an embodiment of which is shown in FIG. 14), and a time interval analyzer. Both communicate directly with the DSP. Initially, systems have been produced with a commercial timing instrument, the Stanford Research Systems SR620 time interval analyzer. The interface to this instrument is through an IEEE488 interface. In a preferred embodiment, the communications interface to the Stanford Research Systems SR620 time interval analyzer is IEEE488.

A custom time interval measurement circuit has been developed which utilizes a separately patented interpolation technology. The circuit employs a clock, typically operating at>100 mhz, which is used to make a coarse count of 10 nsec intervals between stop and start pulses. Additionally, there is an interpolator which divides each 10 nsec coarse count into 1000 smaller increments, providing 10 psec resolution. This system has approximately 5 psec jitter. Differential time measurements can be made with less than 20 psec RMS error, which corresponds to about 3 mm. This circuit communicates with the DSP using a dedicated serial bus, and employs a packet protocol: the DSP arms the circuit by sending a single byte. When the timing circuit completes its task, it sends a sequence of bytes which represent both the time delay between start and stop pulses, and the intensity of each pulse.

Laser Firing

The DSP has three lines for laser control: one starts the laser pump, the second indicates that the laser has fired, and the third indicates that the return pulse from a target has been detected. When the laser fires, the DSP samples the analog pulse amplitude signal. This happens typically within 1 $\mu$sec.

Video

For targeting, the user is provided on the host a video representation of the scene from which he can choose a portion to be range scanned. In most cases this will correspond to the scene rendered in ambient illumination.

Capture

One way the video is captured is by using the scanner to aim single sensitive detector across the scene with the laser turned off. This permits acquiring an image which has very accurate spatial alignment with subsequent range scans. However, image capture can be quite slow in comparison to commercially available cameras.

A second approach is to utilize standard commercial CCD video cameras to acquire an image. One CCD camera with a wide angle lens is aligned with the range scanner with as small an offset as possible. A second camera with a 5 degree field of view is placed so that its optic axis is coaxial with the transceiver. Thus, a much smaller field of view is accessible through the scanner, and can be scanned with the same resolution as the transceiver. This allows targeting small or distant objects.

Alignment

The wide angle lens introduces a fish-bowl effect in the image captured by the CCD sitting behind the lens. Straight lines in the world are not straight in the image. This distortion increases with the distance from the center of the lens. This distortion is removed by comparing the image the camera produces when aimed at a carefully designed and printed calibration target image. The difference in the anticipated image and the recorded image provides the information needed to warp subsequently acquired images to eliminate the distortion.

Compression

Each video image is compressed prior to transfer. Currently we are using JPEG standard image compression. It is relatively fast, and creates reasonably small compressed images for communication. Another desirable feature is that the algorithm operates on blocks, which permits us to do interleave image capture, alignment, compression, and transmission in parallel—significantly enhancing throughput.

Point Video

A second camera, with a narrow field of view (e.g., approximately 5°) is placed such that it is coaxial with the scanning laser beam. The field of view is adjusted so that the pixel resolution is approximately the same as the voxel resolution of the lidar system. The camera can be operated while the laser is activated. When this is done, a small group of pixels will be illuminated by the laser, and the centroid of these pixels will correspond to the point which would be measured by the lidar. When a video image is captured, it can be mapped onto a surface which is estimated by a lidar scan.

Computer Graphics Perception (CGP) Software

Figure 15:
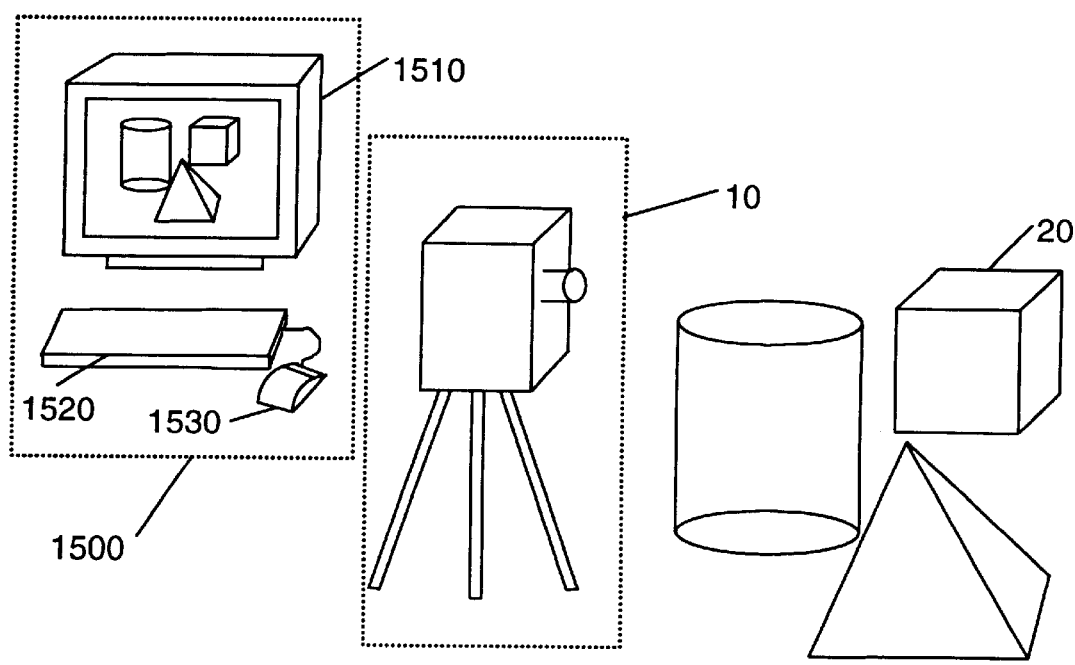
FIG. 15 is a detailed block diagram of the system of FIG. 1.

Referring to FIG. 15, the CGP 40 is a software system that runs on a CGP Computer 1500 and communicates with the FDV 10. The CGP 40 runs on many different types of computers, including laptops and workstations. The CGP 40 operates on a computer 1500 with a suitable display device 1510, such as a color graphic display terminal, a suitable character input device 1520, such as a keyboard, and a suitable pointing device 1530, such as a mouse. The software can use any number of standard 3-D graphics rendering libraries to interactively present the acquired 3-D data in a window on the display device. The portion of the CGP 40 user interface that involves 3-D view manipulation and data projection into a window is handled by the 3-D library.

The CGP 40 performs real time 3-D data acquisition and modeling in the field. The CGP's 40 functionality includes high level FDV 10 control, targeting and data acquisition; display and visualization of scanned points; surface segmentation and fitting; manual 3-D model construction; 3-D visualization; interaction with part and model databases; and the ability to export data in standard data exchange formats to other CAD systems for further processing. The integration of hardware and software, as described here, enables major improvements in productivity and quality in the overall process of three dimensional modeling of reality.

With reference to FIG. 1A, the data acquisition and modeling process divides into the following steps: FDV 10 control, point acquisition, segmentation, geometry fitting, modeling by manipulating the geometry, scene registration with or without warping, model annotation, and geometry display and query.

Figure 16A:
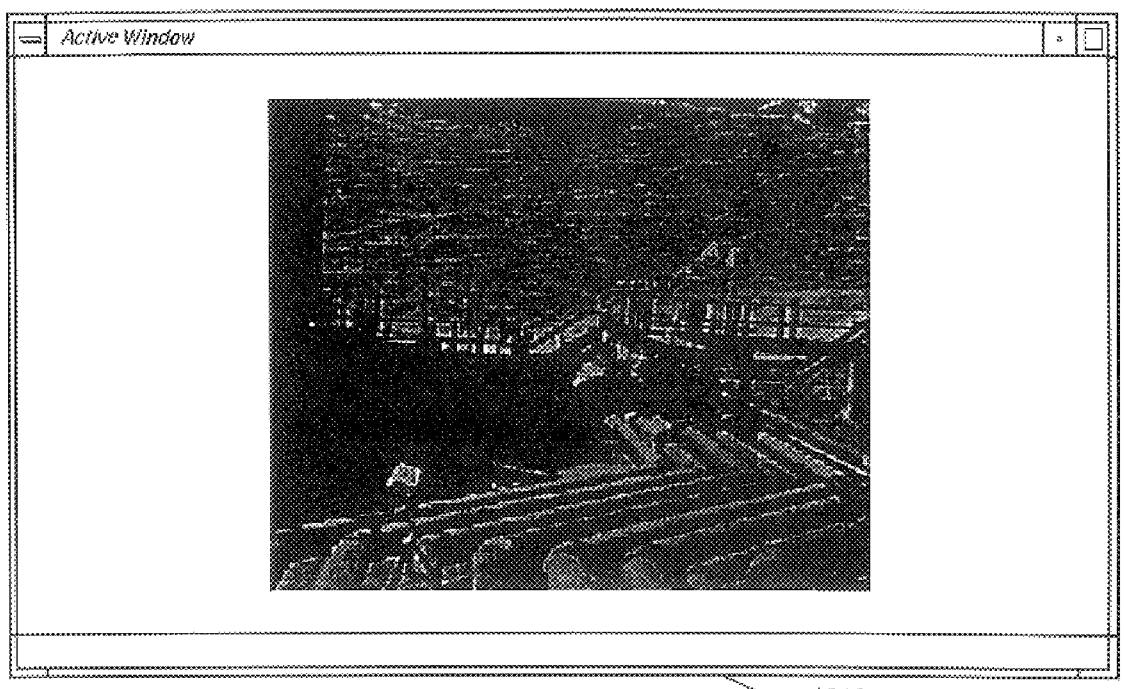
FIGS. 16A and 16B show two windows used to operate the CGP.
Figure 16B:
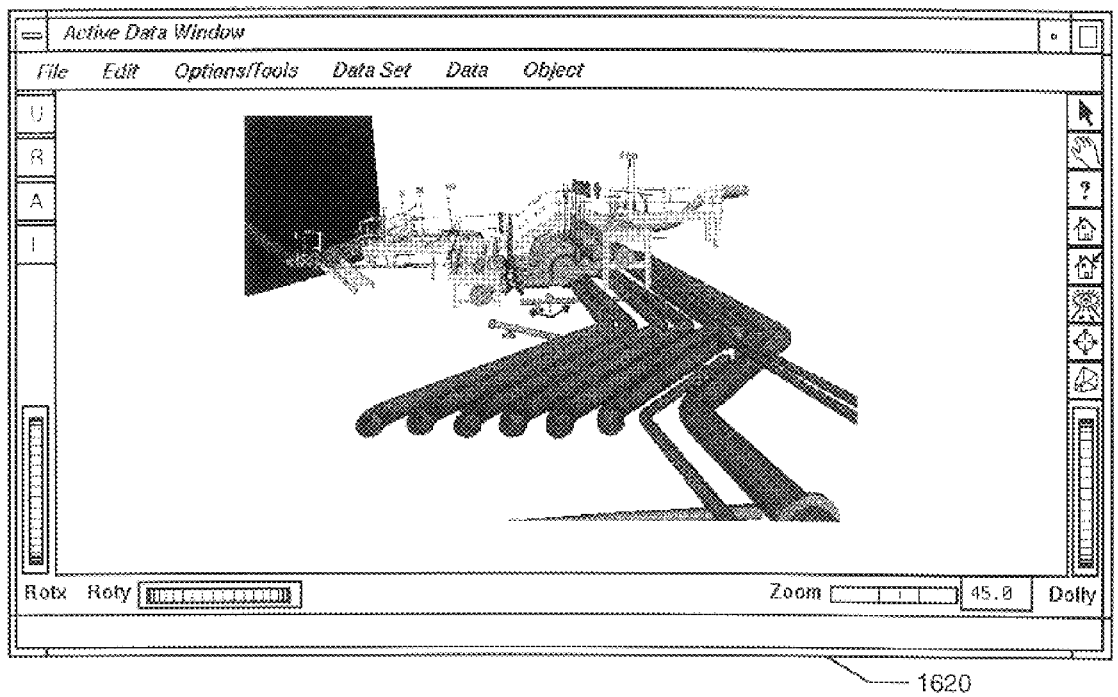

With reference to FIGS. 16A and 16B, the foregoing operations may be performed in at least two graphic display windows. One window 1610 (FIG. 16A) displays a video image of the target scene used to define regions to be scanned by the FDV 10 while the other window 1620 (FIG. 16B) displays an interactive 2D projection of the 3-D model consisting of the scanned points and constructed surface geometry as well as other information about the scene. Additional windows may be used to provide multiple views of the data. In addition, the CGP 40 provides additional windows for controlling the FDV 10 hardware and for setting and displaying the status parameters of the system.

Scan Control

Referring to FIG. 15, prior to using the integrated hardware/software system the FDV 10 is positioned to point in the direction of the objects 20 of interest.

Scan control is the process of indicating which portions of the scene that are visible to the scanner are to be scanned.

Different parts of the visible scene can be scanned at different densities, since simple geometric objects, such as planes, cylinders and spheres can be accurately modeled with a fairly low number of scan points. Therefore, the region in front of the scanner is often captured in multiple scans, rather than in one high resolution scan. Only regions with high levels of detail need high resolution scans.

Figure 17A:
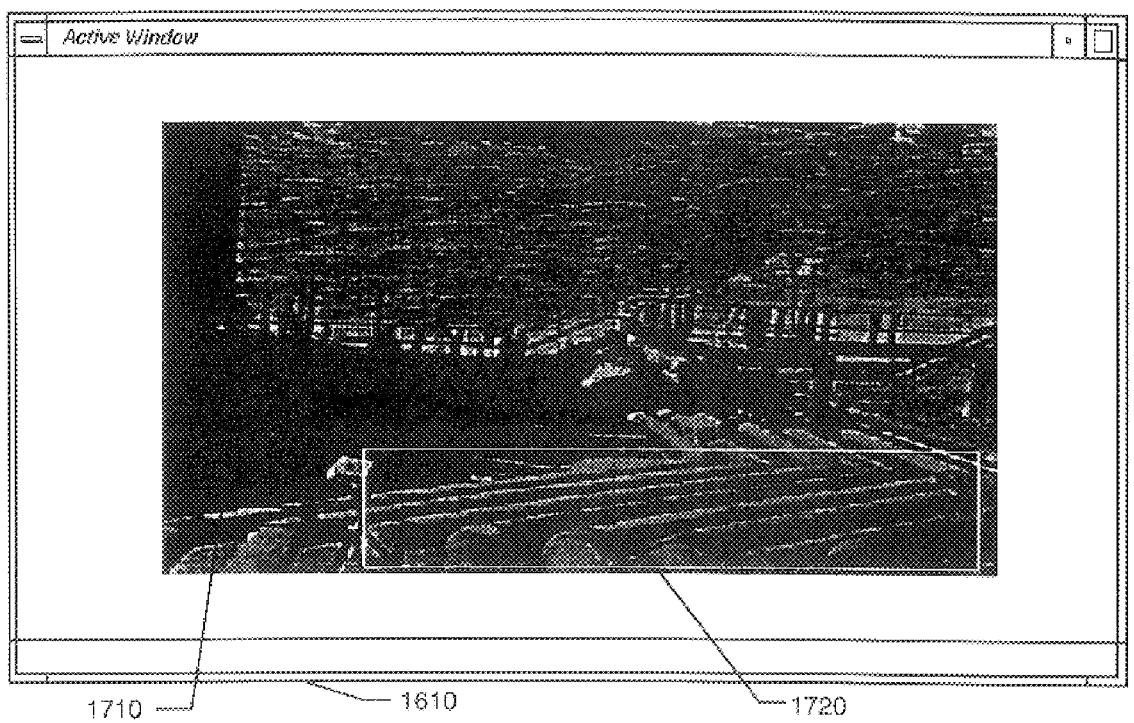
FIGS. 17A and 17B show a targeting box and a point cloud.

Referring to FIG. 17A, one of the means of scan control is the use of a video image 1710 of the scene acquired from the FDV 10. Using a pointing device, such as a mouse, one can indicate the region to be scanned by any number of methods, such as dragging out a rectangle 1720 on the video image. The CGP 40 instructs the FDV 10 to measure the range of whatever object exists at the center of the user specified targeting region to assist in specifying the scan density, since the angle between points is determined by both the desired density on the surface and the distance from the scanner. A means for specifying the desired scan parameters, such as a dialog box, is provided and allows the user to specify the scan parameters in a variety of ways, including point density, point spacing, or total number of points in each of the vertical and horizontal directions.

The CGP 40 then translates the region and scan resolution information into a set of commands for the FDV 10. These commands are communicated to the FDV 10 using a means of communications, such as a TCP/IP network connection, and the acquired data is also returned to the CGP Computer 1500 using the same means.

Additional scans at different densities can be initiated in the same way, or one can use previously scanned data points rather than the video image to specify new scan regions. If the view of the scanned data is oriented so that it is exactly aligned with the scanner direction, then a scan region can be indicated by methods such as dragging out a rectangular box. When the data is aligned to the scanner in this way most of the 3-D information is difficult to see, therefore, the software can display the points with the intensity of the returned laser light at each point color mapped as described in the next section. The intensity information is often sufficient to identify objects in the data window, so that new scan regions can be defined. Alternatively, the user can model and/or color some of the objects in the scene to help locate regions of interest in the window. Using the data window to define new scan regions avoids any parallax errors, since the view is aligned with the scanner.

Scan control can also be achieved by using the pointing device to move the laser beam and highlight points in the actual scene. Any number of methods could be used to describe the desired scan region by moving the laser beam and identifying points of interest by a user action, such as clicking a mouse button. Methods could include operations such as: indicating a bounding box by moving the laser to diagonally opposite corners of the desired scan regions; indicating the top, bottom, left and right bounds of the scene; indicating a sequence of points that represent the bounding polygon of the scan region; indicating the center of the scan region and using other means, such as dialog boxes to describe the extent of the desired scan region.

Point Acquisition

Figure 17B:
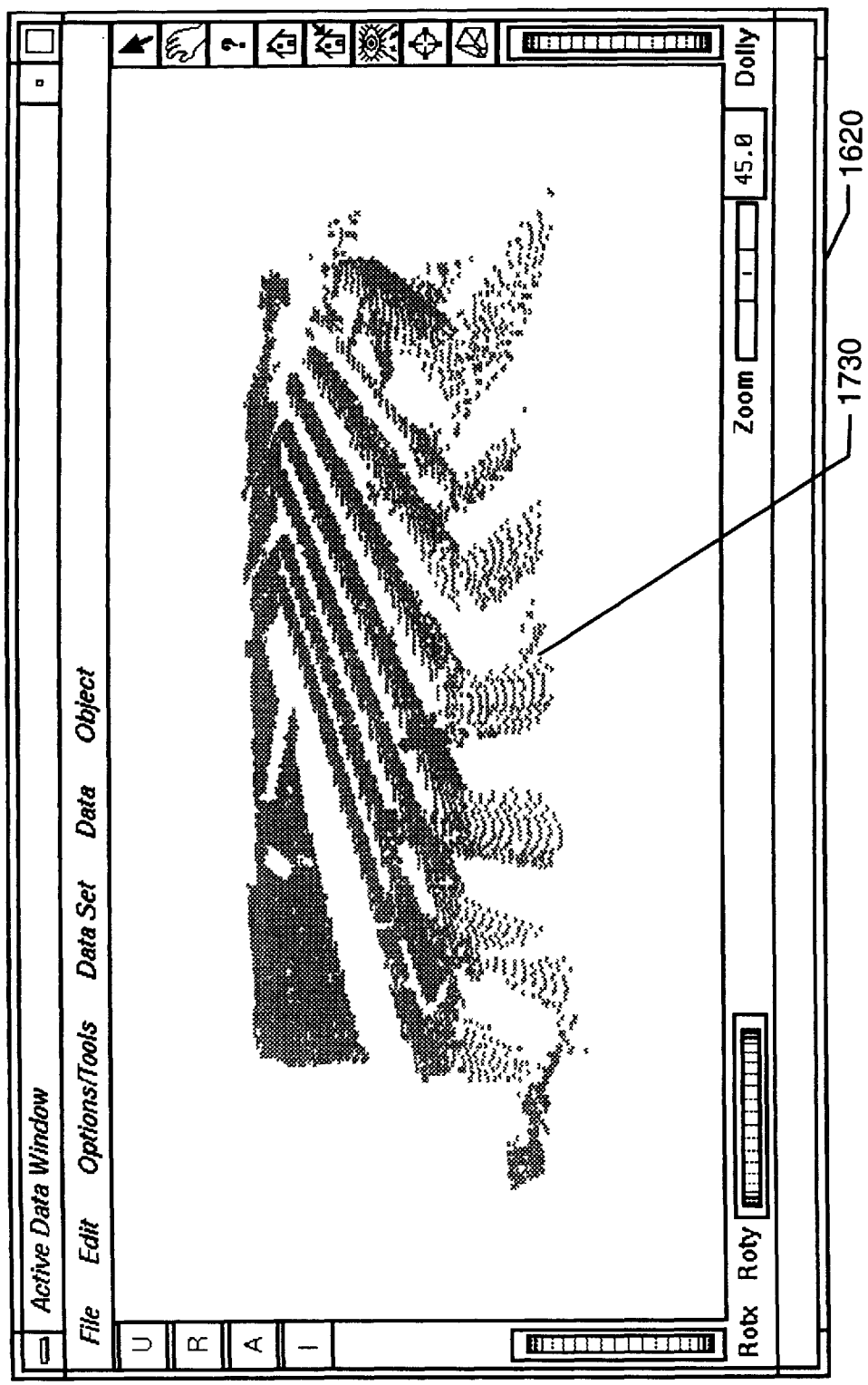

With reference to FIG. 17B, the data returned by the FDV 10 consist of the coordinates of the points and their intensity values. In one preferred embodiment, the scanning is performed in such a way that the data returned lies in an ordered grid of three dimensional points 1730. Viewed from the scanner, these points appear as a regular rectangular grid, much like a bitmap. However, each point consists of its coordinates in three-space as well as the intensity of the reflected laser pulse at that location.

Figure 18:
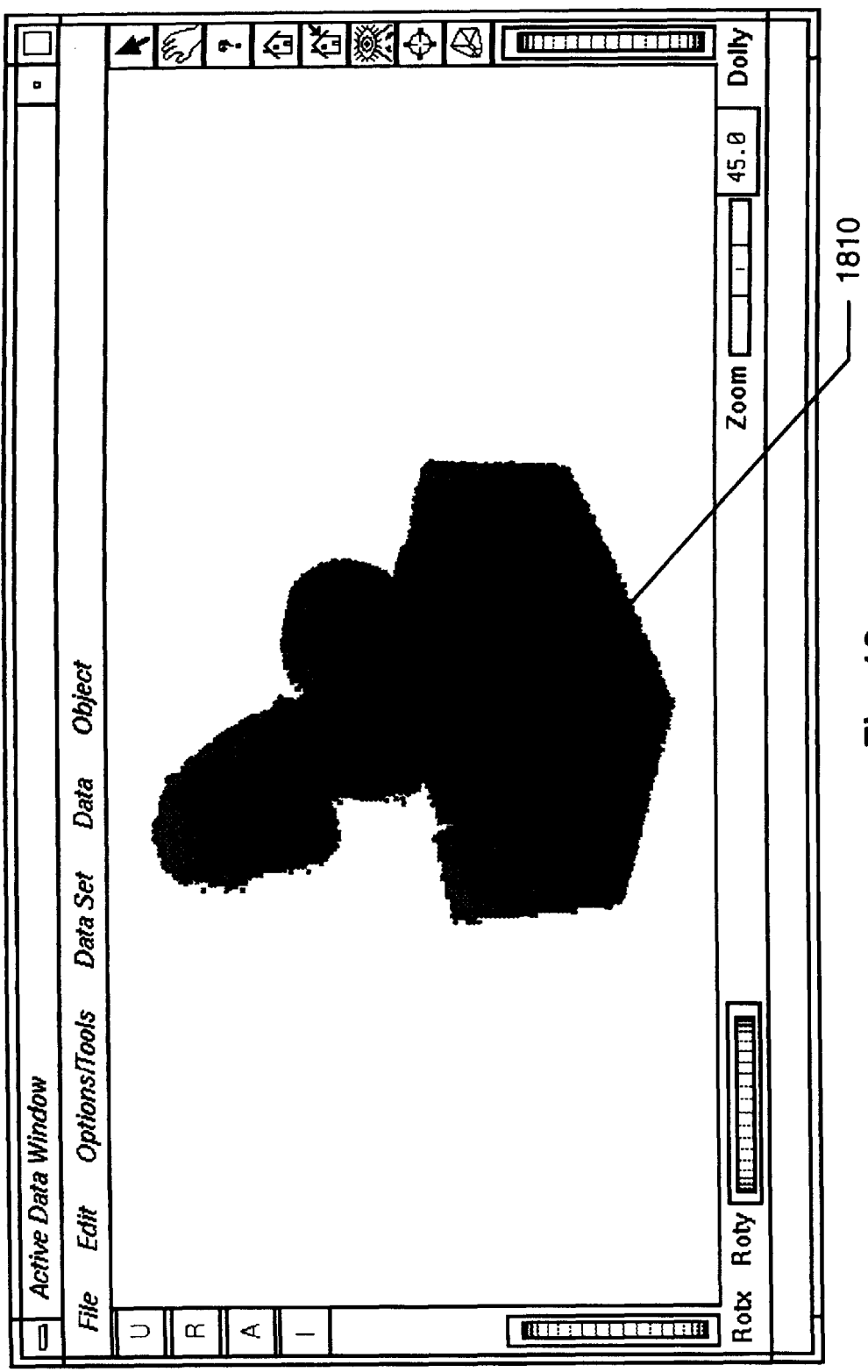
FIG. 18 shows a point cloud from the surface of a horse sculpture.
Figure 19:
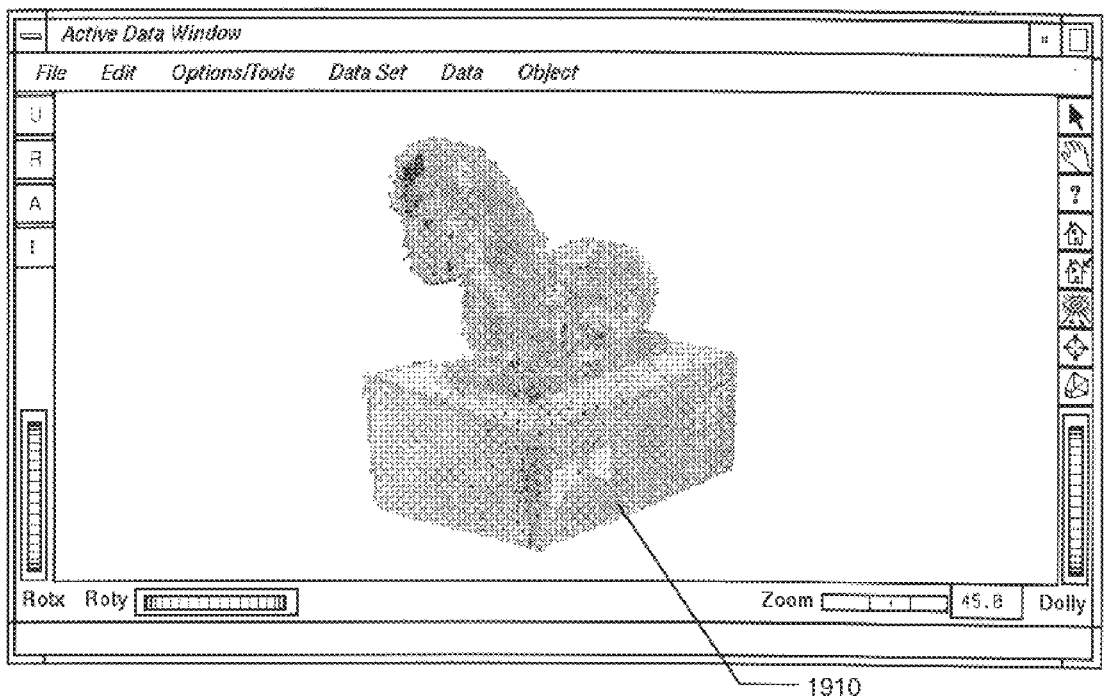
FIG. 19 shows the point cloud of FIG. 18 color mapped with the laser return intensities.

Each point returned is displayed in the data window 1620 as it is transmitted by the FDV 10. The CGP 40 lets the user interactively change the 3-D view of the data while the data is arriving to get a better idea of the spatial layout of the data. Also, to help visualize different features in the data, of the CGP 40 can allow each point to be color mapped from the intensity of the reflected laser pulse at that location. A scan cloud 1810 is shown in FIG. 18 representing the surface of a horse sculpture. Instead of having all the points in a single color, as shown in FIG. 18, one can map different laser return intensity values to different colors, and produce a multicolored scan field 1910 as shown in FIG. 19. The intensity color mapping provides considerable extra surface feedback to the user and this is useful in both targeting and modeling, as described later.

The ordered grid of points generated is referred to as a scan field. Multiple, possibly overlapping scan fields may be gathered and simultaneously displayed in the manner described above. The data structures within the CGP 40 maintain the list of scan fields, so each data point is always associated with a scan field. The scan fields usually contain data points from the surfaces of many different objects, so they need to be partitioned into smaller groups of points, as described in the next section.

Segmentation

Segmentation is the process of grouping together points that were scanned from the surface of the same object. The points from a single object may be a small portion of a scan field, or may occur across multiple scan fields. The segmentation process may be manual, as described below, or automated, as described later in the auto-segmentation section.

Figure 20:
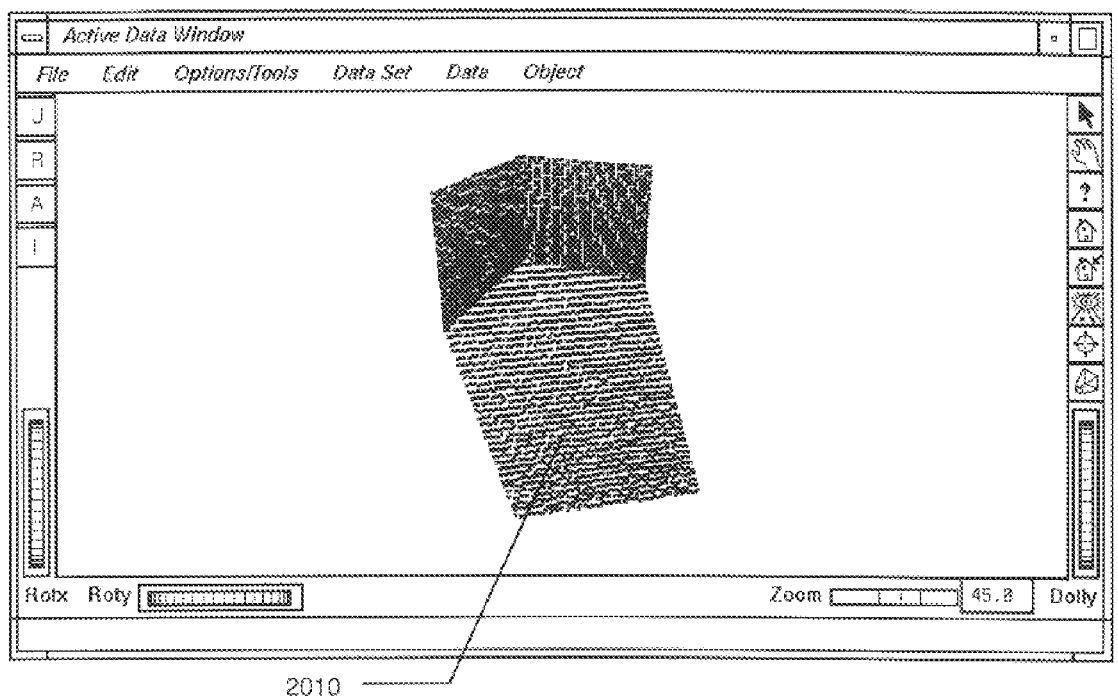
FIG. 20 shows a cloud of points from a corner feature.

Referring to FIG. 20, the first step of the manual segmentation process is to select one or more scan fields 2010 that contain scan points on the object of interest. Selecting one or more scan fields can be performed by any of the conventional means, such as using a pointing device, possibly together with keyboard keys. Selecting a scan field selects all of the points in the scan field. The group of points resulting from this step form a pool of candidate points that can now be trimmed to remove points on other objects. Each point in the pool is initially marked as selected, and the operations described below can be used to toggle the point states between selected and deselected.

Figure 21:
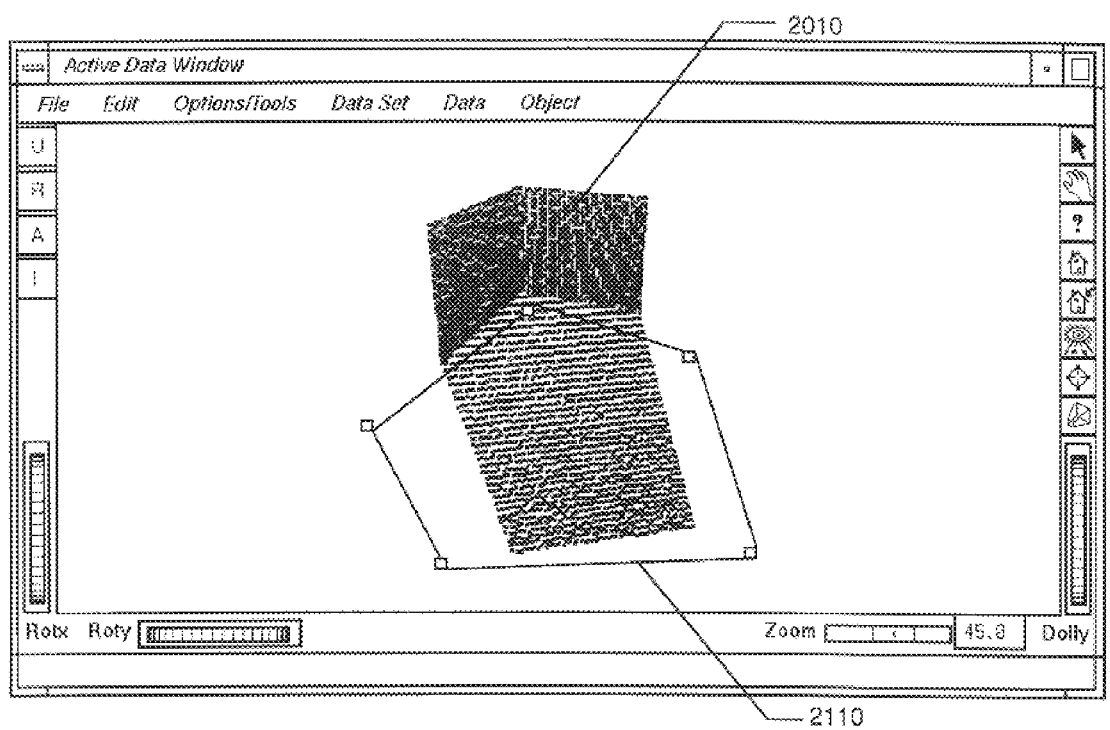
FIG. 21 shows the cloud of points of FIG. 20 and a polygonal lasso used for manual segmentation.
Figure 22:
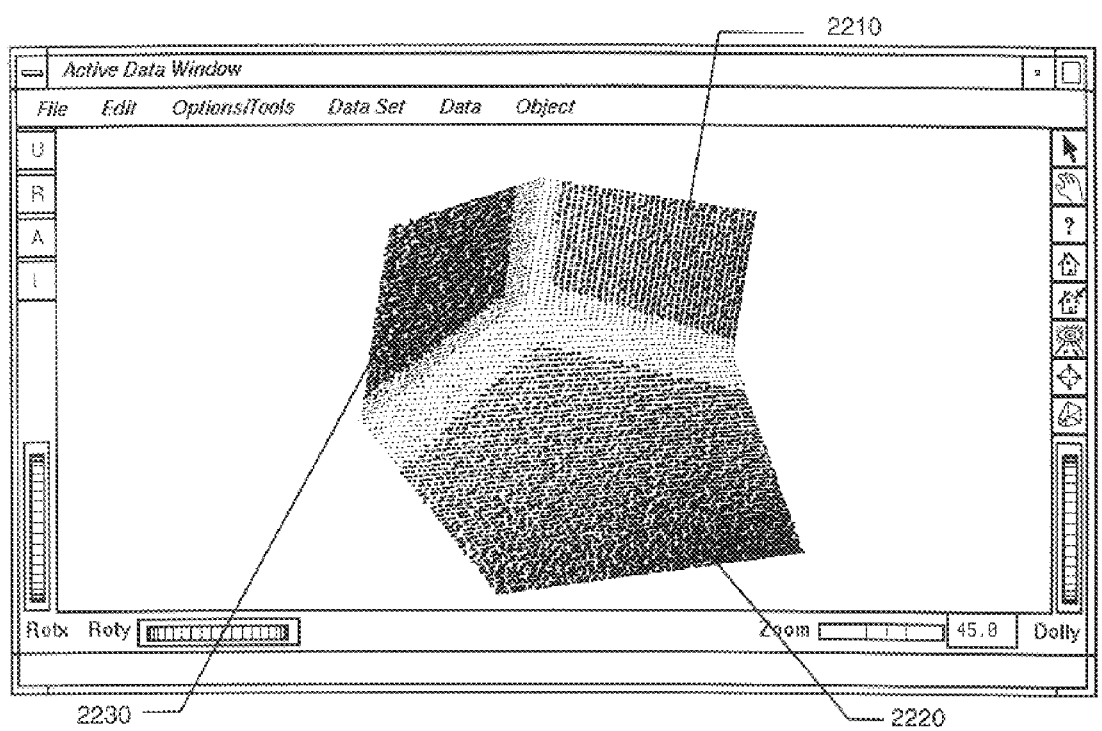
FIG. 22 shows the cloud of points of FIG. 20 segmented into four subgroups, three subgroups on the surfaces of planes and a subgroup of edge points that are not part of the plane.

Referring to FIG. 21, scan points 2010 from a desired object surface can be cut out using one or more lasso operations from possibly different views. The user can manipulate the view direction as needed to give a clear view of the desired subset of the point pool. The user then uses the pointing device to draw a polygonal lasso region 2110, which divides the screen into two regions: the interior and exterior of the lasso polygon. The following operations are supported: mark all points in a region as selected and all of the other points as deselected, mark all of the points in a region as selection without affecting the other points, and mark all of the points in a region as deselected without affecting the other points. The lasso operation may be repeated as many times as necessary to refine the selection, possibly changing the view of the scene between lasso operations. The user can the cut the currently selected set of points out to form a new point set. The new point set acts like a scan field in that it is, and can take part in the fitting operations described in the next section. In FIG. 22, three new groups of points 2210, 2220 and 2230 have been created using the manual segmentation method described here, and some points near the intersection of the planes are left from the original cloud of points.

Geometry Fitting

Figure 23:
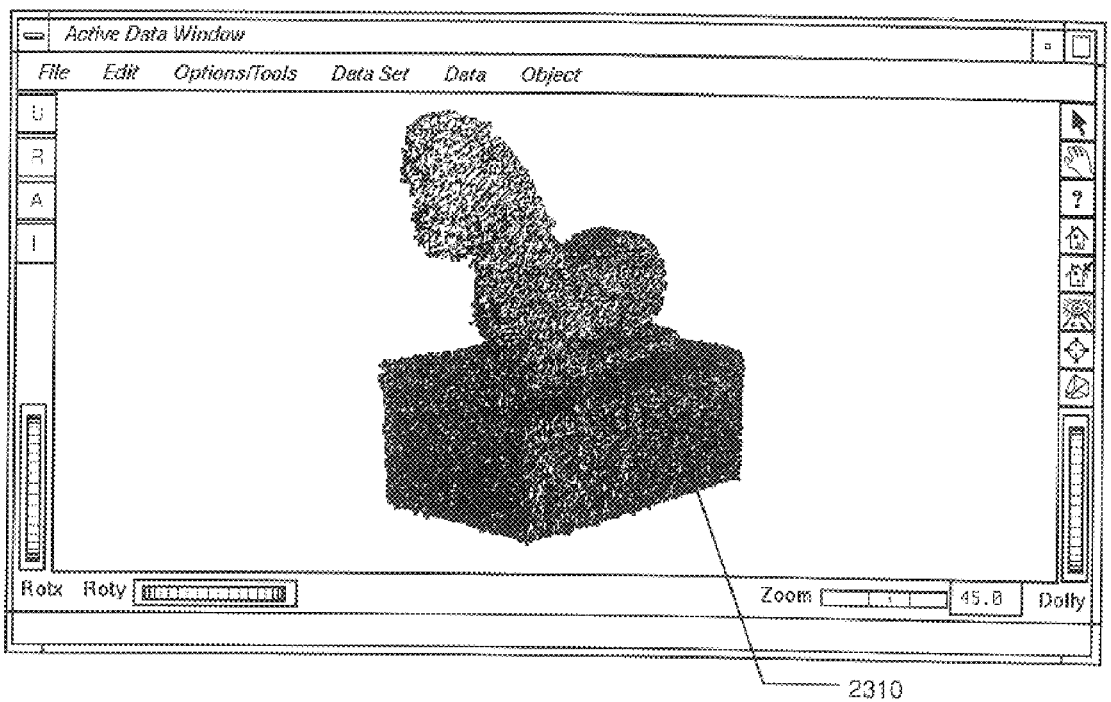
FIG. 23 shows the cloud of points of FIG. 20 rendered as a triangulated mesh.

In one preferred embodiment, the CGP 40 can contain many geometric primitives that can be used to simulate the actual surfaces of the objects scanned. The geometric primitives include any number of standard graphics primitives, such as triangulated meshes, planes, cylinders, spheres, torii, lines, and points. The simplest form of geometry fitting involves using a triangulated mesh to connect the scan points to show the surface features of the objects scanned. The scan cloud 1810 in FIG. 18 can be meshed 2310 and rendered as shown in FIG. 23. Since the scan data are acquired in a regular grid, it is simple to create a triangular mesh by connecting neighboring points. The user can also set discontinuity tolerances in depth and angle to avoid meshing adjacent points separated by more than the specified threshold. Breaking the mesh in this way provides a more realistic looking surface, referred to as a shrinkwrap surface, because artificial mesh surfaces at occlusion edges do not occur. A wide variety of known mesh operations can be applied to the resulting mesh, such as smoothing (noise reduction) and mesh simplification (to reduce the mesh density in smooth areas that do not require a fine mesh grid). Mesh vertices may also be colored with information such as intensity.

As stated above, the CGP 40 includes many standard geometric primitives. Before fitting the points to such objects, the point clouds must be segmented as described above. Once segmented, each group of points represents a single surface that can be fit by a geometric object. The fitting can be guided by the user, who may know the type of shape to be fit. For instance, after scanning the corner of a room it is clear to the user that the points on a wall can be fit by a plane and the points on a pipe can be fit by a cylinder, so the user can request the fit of a specific object. It is also possible to semi-automate this process to identify which shape best fits a particular point group.

Figure 24:
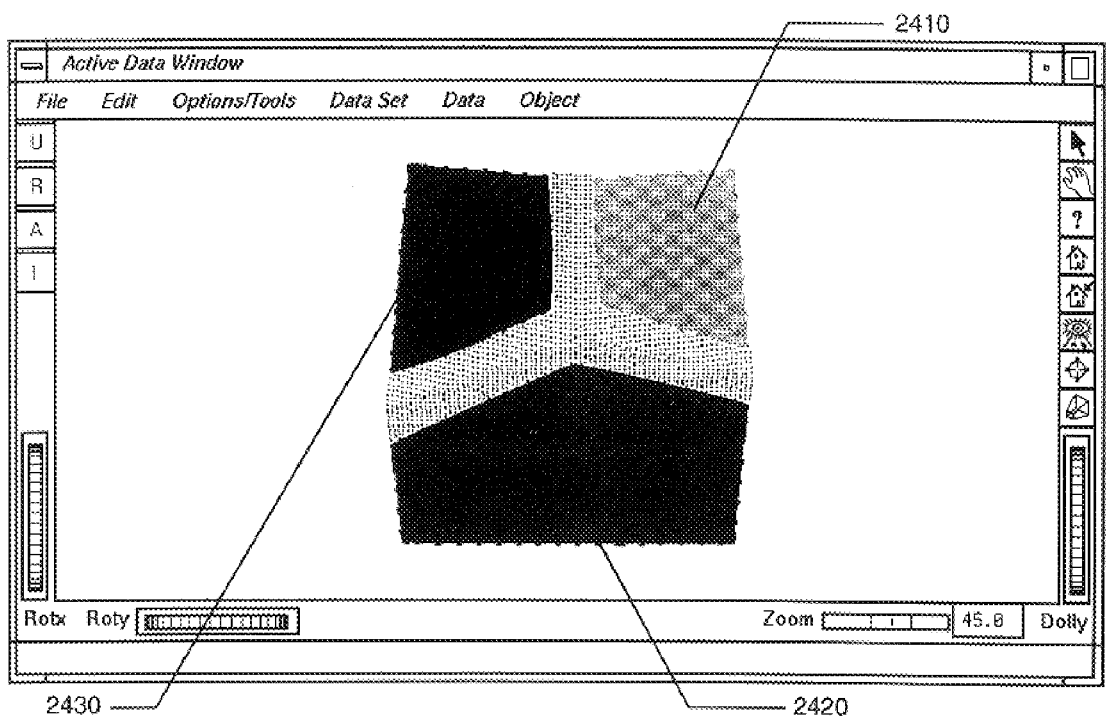
FIG. 24 shows the corner feature of FIG. 20 with planes fit to the groups of cloud points.

Fitting a plane to a set of points is a simple problem that has many well-known solutions. The extent of the patch used in the CGP 40 to represent the plane can be determined by the convex hull of the points in the plane. For instance, the three point groups 2210, 2220 and 2230 shown in FIG. 22 can each be separately fit to planes 2410, 2420 and 2430 as shown in FIG. 24 using any available fitting algorithm.

Many standard approaches are available for fitting more complex shapes. In one preferred embodiment, two phases are involved: a parameter estimation phase to get a starting point, and an optimization phase, where the parameters are varied to minimize the overall error. The total error is the sum of the squares of the distance between each scan point and the nearest point on the surface of the object being fit. The optimization phase uses conventional optimization methods to reduce the error between the object, as defined by its parameters, and the data given by the scan points.

Figure 25:
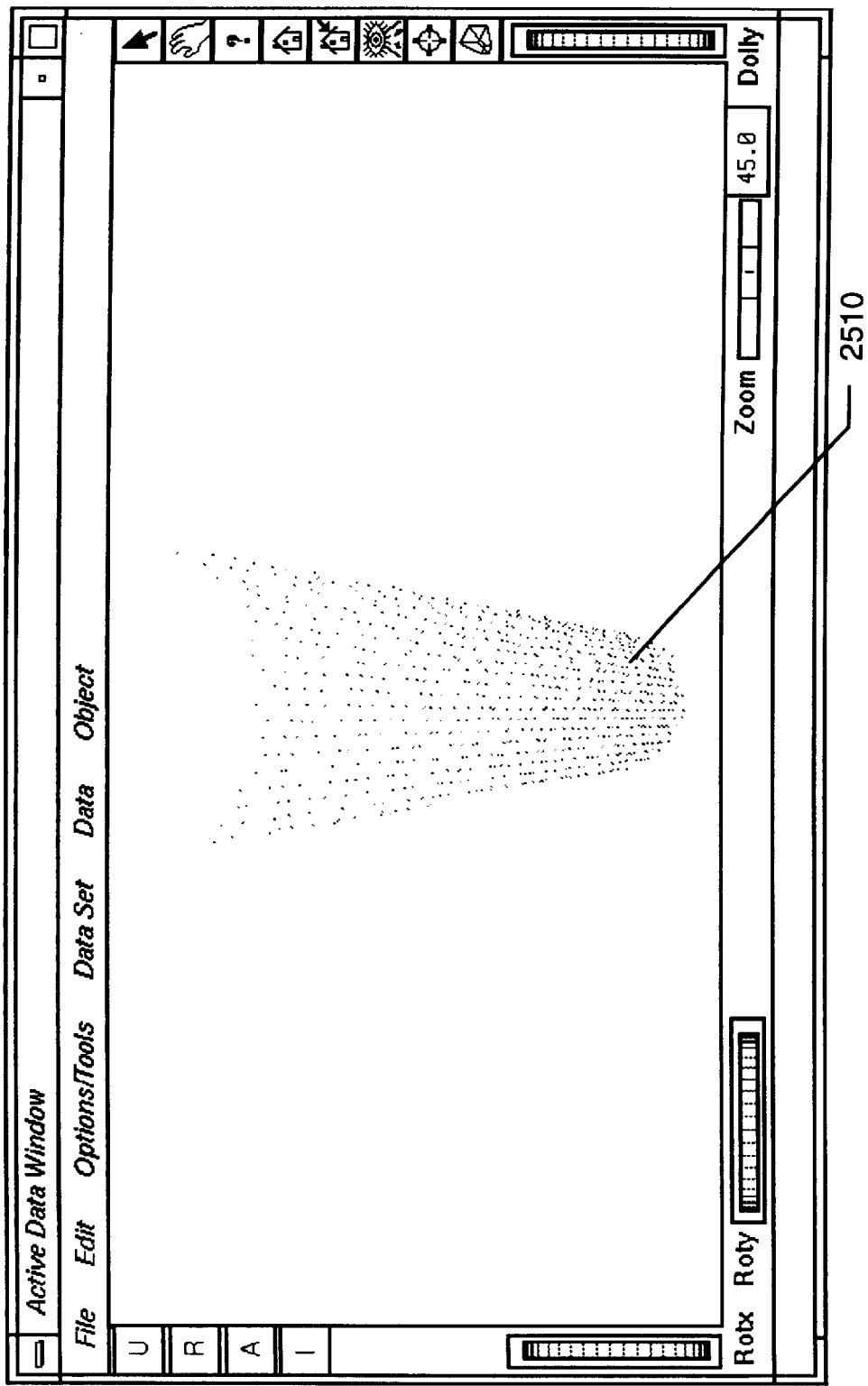
FIG. 25 shows a point cloud from the surface of a cylinder.
Figure 26:
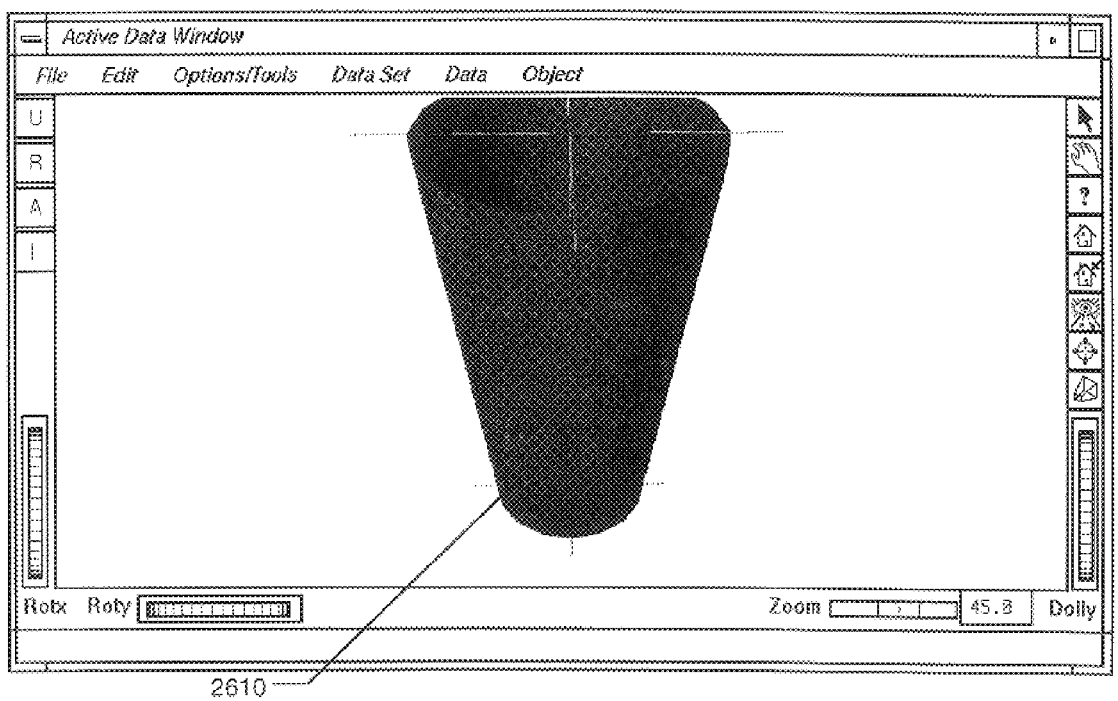
FIG. 26 shows a cylinder primitive that was fit to the points shown in FIG. 25.
Figure 27:
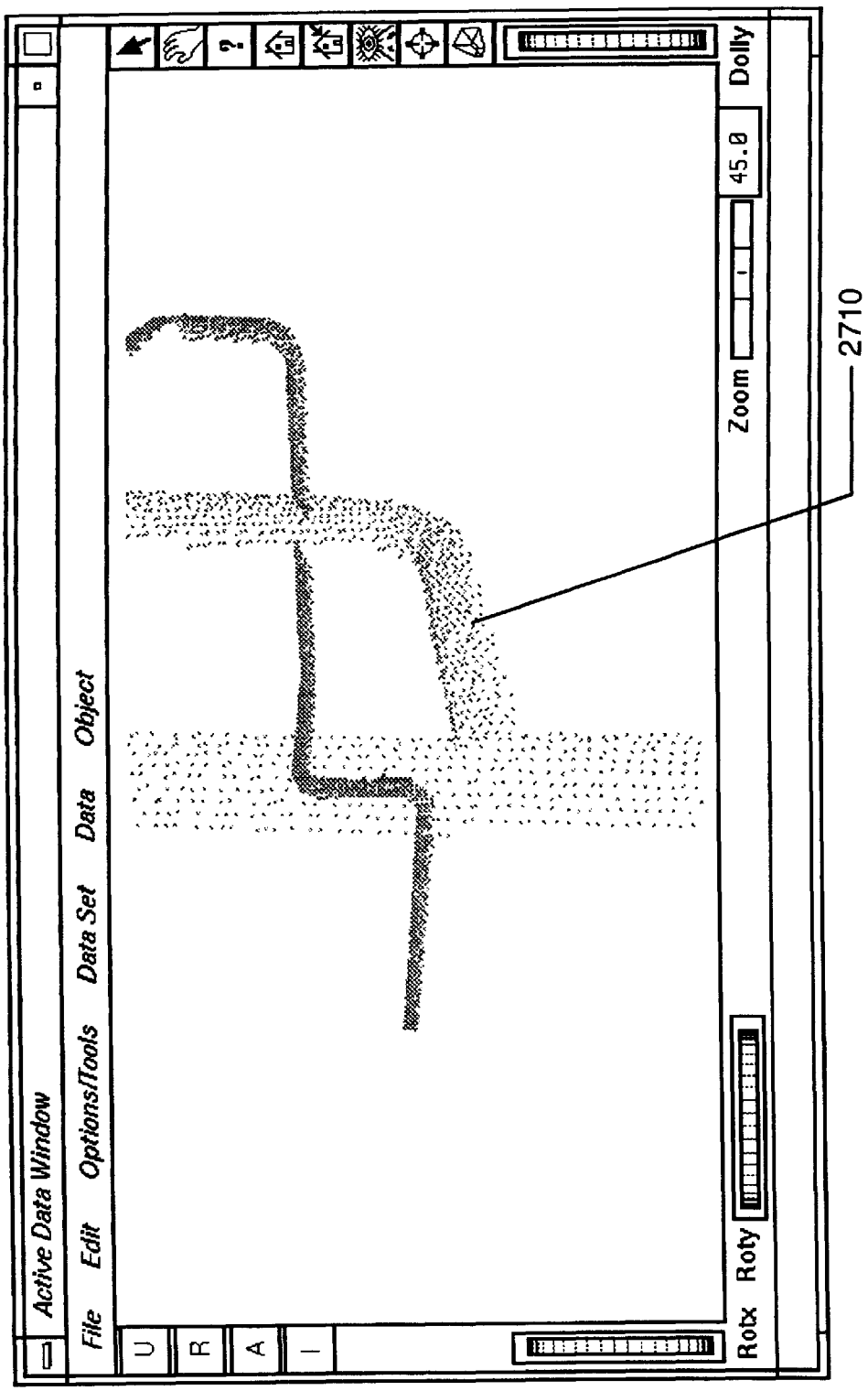
FIG. 27 shows a cloud of points from the surfaces on a piping system.
Figure 28:
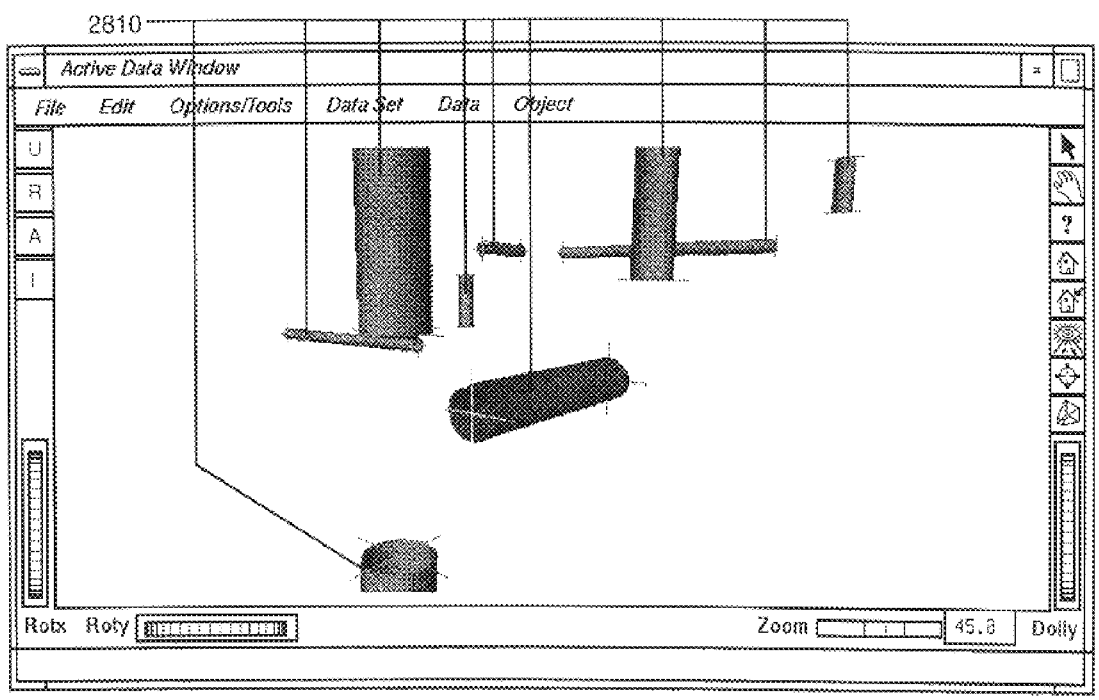
FIG. 28 shows cylinder primitives that were fit to the points shown in FIG. 27.
Figure 29:
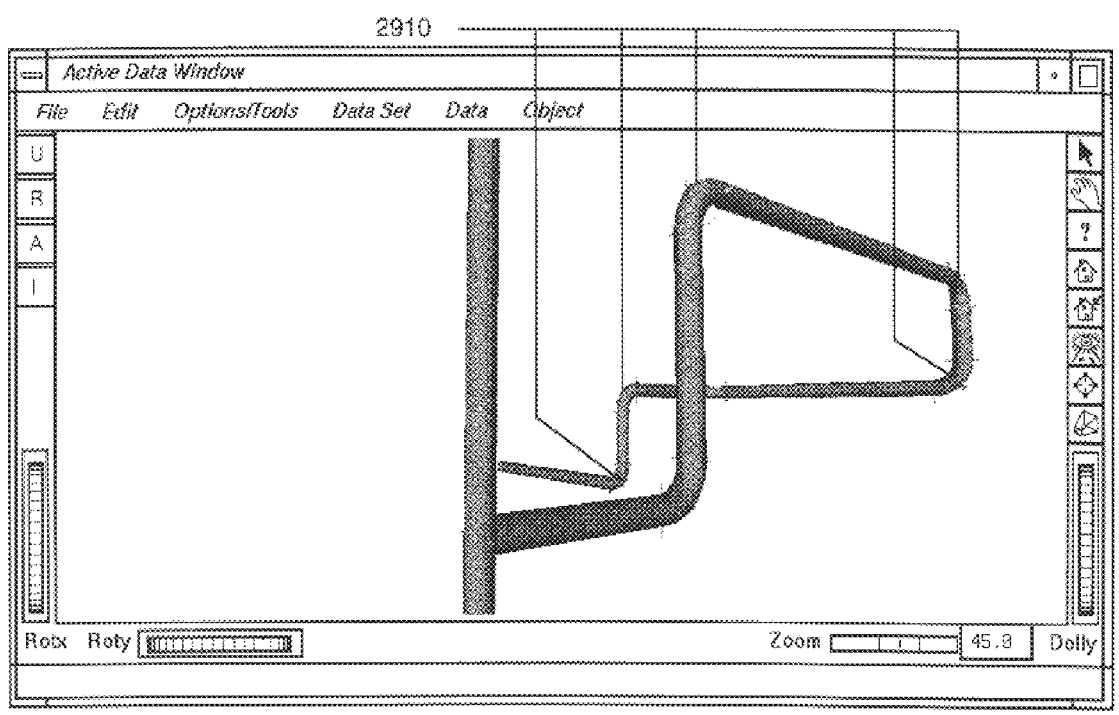
FIG. 29 shows the completed piping model, after extending pipes and adding elbows.

A cylinder fitter can convert a cloud of points 2510 as shown in FIG. 25 into a cylinder object 2610 as shown in FIG. 26. All fitted objects, including the cylinder, reference the original points that were used to fit the object. The user may choose to view the resulting cylinder 2610 or the original points 2510, or both, at any time. Using manual or automatic segmentation methods, it is possible to convert the scan clouds, 2710 in FIG. 27, representing many cylinders into the best fit cylinders 2810 shown in FIG. 28. Once each cylinder's diameter and axis are established, it is possible to manually or automatically add elbows 2910 in FIG. 29 to complete the modeling process.

A cylinder is described by five parameters: a normalized vector describing the cylinder axis (two independent parameters), the radius, and two additional parameters that are used to locate the line of action of the cylinder axis in space. The length of the resulting cylinder can be determined by projecting the scan points onto the cylinder axis and noting the extreme values of this projection.

Two novel methods for estimating cylinder parameters are implemented in one preferred embodiment. The first way to find initial parameter estimates for a cylinder is to find approximate surface normals, as described in the auto-segmentation section. If all of the normals are set to unit length, then they can all be consider to be vectors from the origin to a point on the surface of the unit sphere. If one uses each normal vector and its to accumulate a group of points on the unit sphere, then one can fit a plane through the resulting group of points. The resulting plane normal is roughly parallel to the cylinder axis. Given the cylinder axis and the plane from the previous step, one can project the scan points onto the plane. The projected points will be well described by a circle in this plane, since the plane is normal to the cylinder axis. A best fit circle can be calculated using the projected points on the plane to give an estimate of the cylinder radius. The center of the circle on the plane can be converted to a 3-D point to give a point on the cylinder axis.

The second way to estimate the cylinder parameters is to fit the set of point to a quadric surface, which is described by the implicit equation:

$$F(p)=0=c_1 p_1^2+c_2 p_2^2+c_3 p_3^2+c_4 p_1 p_2+c_5 p_1 p_3+c_6 p_2 p_3+c_7 p_1+c_8 p_2+c_9 p_3+c_{10} \quad (1)$$

where $p=\{p_1, p_2, p_3\}$ is a point on the quadric surface.

One can then take $c_{10}=-1$ since the equation is implicit and perform a least squares fit with all of the data points to determine the other nine parameters. After determining the best fit quadric surface for a given set of points the next step is to find a point actually on the new surface ($p_s$) that is in the vicinity of the other points. This is achieved by finding the centroid of the scan points ($p_c$) and then finding the closest point on the surface of the quadric to give $p_s$. The normal to the surface at point $p_s$ can be determined using:

$$N_p = D_1 p_s + D_2 \quad (2)$$

where $$D_1 = \begin{bmatrix} 2c_1 & c_4 & c_5 \\ c_4 & 2c_2 & c_6 \\ c_5 & c_6 & 2c_3 \end{bmatrix}, D_2 = \begin{bmatrix} c_7 \\ c_8 \\ c_9 \end{bmatrix}$$

Two unit vectors, $u_1$ and $u_2$, are then found such that they are normal to both each other and $N_p$. These vectors form a basis for the surface at the point under consideration, and additional vectors on the surface can be found as:

$$v_\alpha = u_1 \cos \alpha + u_2 \sin \alpha, \; 0 \leq \alpha \leq 2\pi \quad (3)$$

The unit principle vectors $v_\alpha$ are then found by determining the rotation $\alpha$ a that satisfies:

$$v_\alpha \cdot (N_p \times D_1 v_\alpha) = 0 \quad (4)$$

There are two solutions to this equation that yield the orthogonal unit principal vectors $v_1$ and $v_2$. The surface curvatures $\kappa$ in these two principle directions are then given by:

$$\kappa(v_i) = -v_i \cdot \left( \frac{D_1 v_i}{\|N_p\|} \right) \quad (5)$$

For cylindrical surfaces one of the principal curvatures will be near zero, and the radius of the cylinder is the reciprocal of the absolute value of the nonzero curvature. A method to determine the radius (r) and axis of the cylinder has been described, and only the location of the axis needs to be determined. A unit surface normal can be calculated as $\hat{n}=N_p/\|N_p\|$. The sense of the normal can be adjusted so that it points towards the interior of the cylinder by ensuring that $\hat{n} \cdot (p_c - p_s) > 0$ since the centroid of the points lies on the interior of the cylinder. A point on the axis is then given by $p_s + r\hat{n}$. These starting parameters can then be used in a minimization process to find the best fit parameters for the cylinder.

The novel method described above for curvature estimation using the quadric surface formulation is further used in a novel way for automated object type determination. If the points being fit are well represented by a plane then both principal curvatures will be near zero. If the points being fit are from a cylindrical surface then one curvature will be near zero and the other will be nonzero. If the points are from a sphere then both curvatures will be nonzero and their magnitudes will be approximately equal. Combining the automatic detection of object type and the auto-segmentation algorithm, described later, allows the CGP 40 to have a novel method for automatic fitting of many objects that occur in typical scanned scenes.

A further use of the curvature estimation is sphere fitting, which is achieved by using the quadric surface approach to approximate the radius and location of the center point, and then using a four parameter (center point and radius) minimization to reduce the error between the sphere model and the measured points. The novel method described above for finding a point on the axis of a cylinder is also used in the preferred embodiment to find the center of a sphere.

Figure 30:
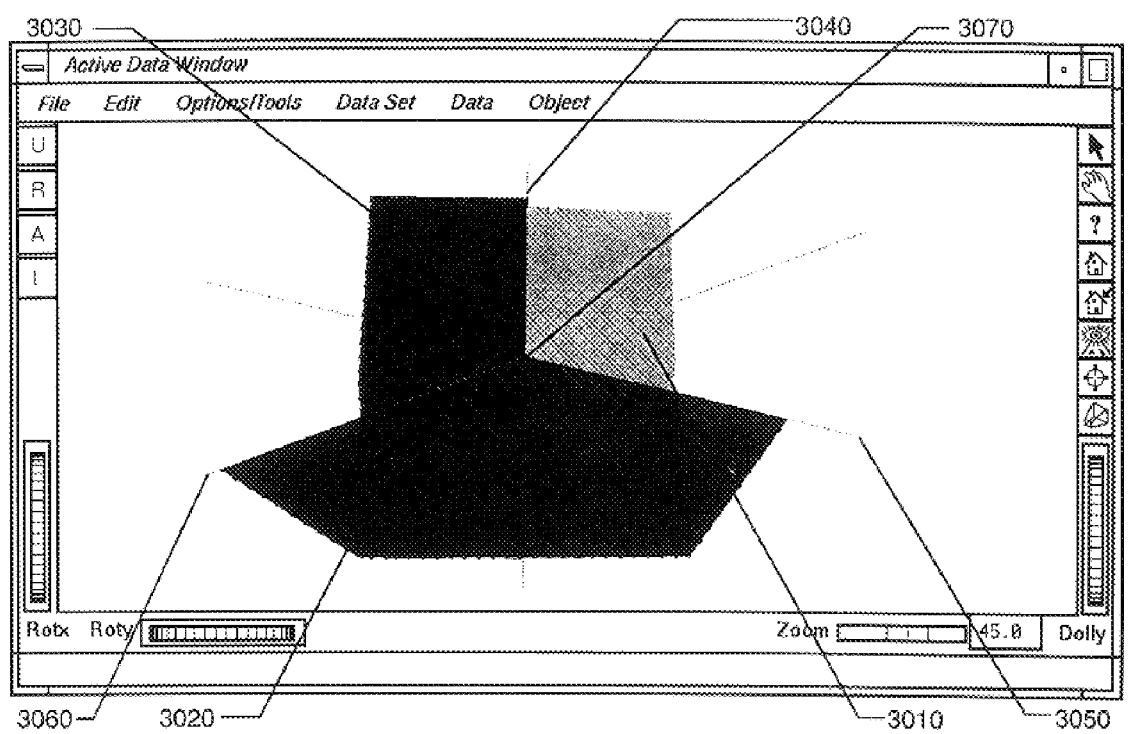
FIG. 30 shows the result of a corner fit, giving three planes, three lines, and a vertex.

The segmentation techniques disclosed above can be used to create a variety of useful fitting tool based on combinations of the previously described shapes. For instance, a corner, consisting of an intersection of three planes which may or may not be orthogonal, is a very common feature to scan. Knowing that the specified point group contains three intersecting planes, such as the points 2010 in FIG. 20, the points are automatically segmented, using the technique described later, into three subgroups of points that each lie on separate planes. Then, any available plane-fitting algorithm can be used to fit the planes to the scan points in each group. Unlike the more general auto-segmentation algorithm described later, if one knows that the corner object consists of three planes, the fitting algorithm need not try to fit cylinders, spheres or other objects and check which produces the best fit, only planar fits are required. Referring to FIG. 30, the corner fitting tool not only fits the planes 3010, 3020, 3030 but can also intersect them to complete the corner. As shown in FIG. 30 additional useful information can be given to the user by introducing lines 3040, 3050, 3060 at the intersection of pairs of planes, and a vertex point 3070 that represents the location of the corner. This vertex point is much more accurate than a single scan point, because each plane is fit using many data points, and the vertex is generated by intersecting the planes. The above novel method for automatically creating a corner with its intersection lines and vertex can be used as a tool of the CGP 40.

Each object stores information about the quality of the fit, so that the user can query the object and examine the mean, standard deviation, and worst errors. Knowing the accuracy of the FDV 10, the CGP or the user can then decide if an error has been made during the fit. Errors can arise when the wrong type of primitive is fit, or when extraneous points that were not actually scanned from the desired surface remain in the data set. In addition, the objects store their geometric parameters so the users can query for radius, length or other values of interest.

In addition to the class of general object fitters, which are given close to no initial information other than the points to fit, there is a class of fitters that can take advantage of foreknowledge about objects in the scene. An area in which such foreknowledge exists is that of the construction industry, where parts used follow standards of dimensions and design. For example, the external diameter of pipes from a particular manufacturer may come in five different sizes: 4", 5", 6.5", 8", and 10". This information typically resides in tables that describe relevant attributes of these parts. The cylinder fitter can take advantage of the information in these tables to significantly reduce the solution space to be searched: the fitter need only search for solutions involving cylinders of one of those diameters. Another way to use such table lookups is to have the fitter come up with a general solution, then match against entries in the object tables to find the entry with the closest parameters. For example, a pipe fit by a cylinder with 7.8" diameter would be matched against the 8" entry in the table from the example above; the user (or fitter) then has the option of refitting an 8" cylinder to the pipe, or accepting the 7.8" cylinder. Yet another use is for the user to manually select a specific entry (or collection of entries) from the table and tell the fitter to use its parameters in the fit, which also reduces the fitter's solution space (which can decrease the time taken).

Modeling

The fitting of geometric primitives, as described in the previous section does not usually complete the modeling process. It is often the case that only a portion of the objects surface is scanned, such as one end of a cylinder or a portion of a wall, and further operations are required to complete the 3-D model. Modeling is the process of completing the construction of the 3-D model given some fitted geometric primitives.

Figure 31:
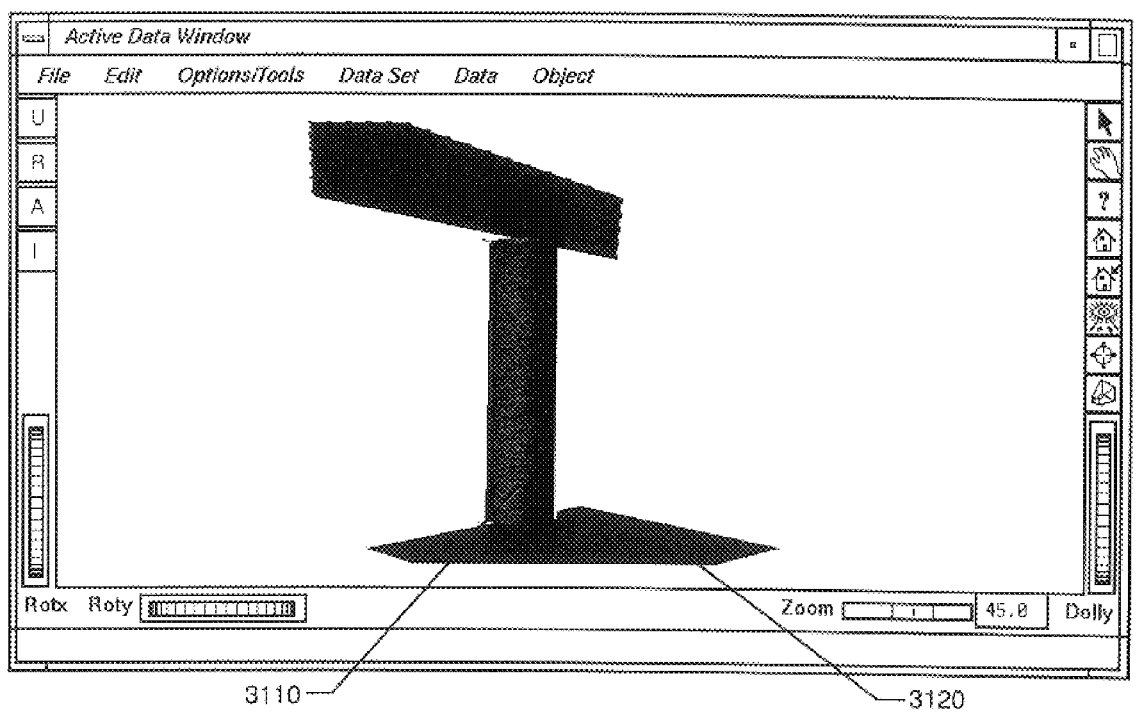
FIG. 31 shows a cylinder primitive in a scene.
Figure 32:
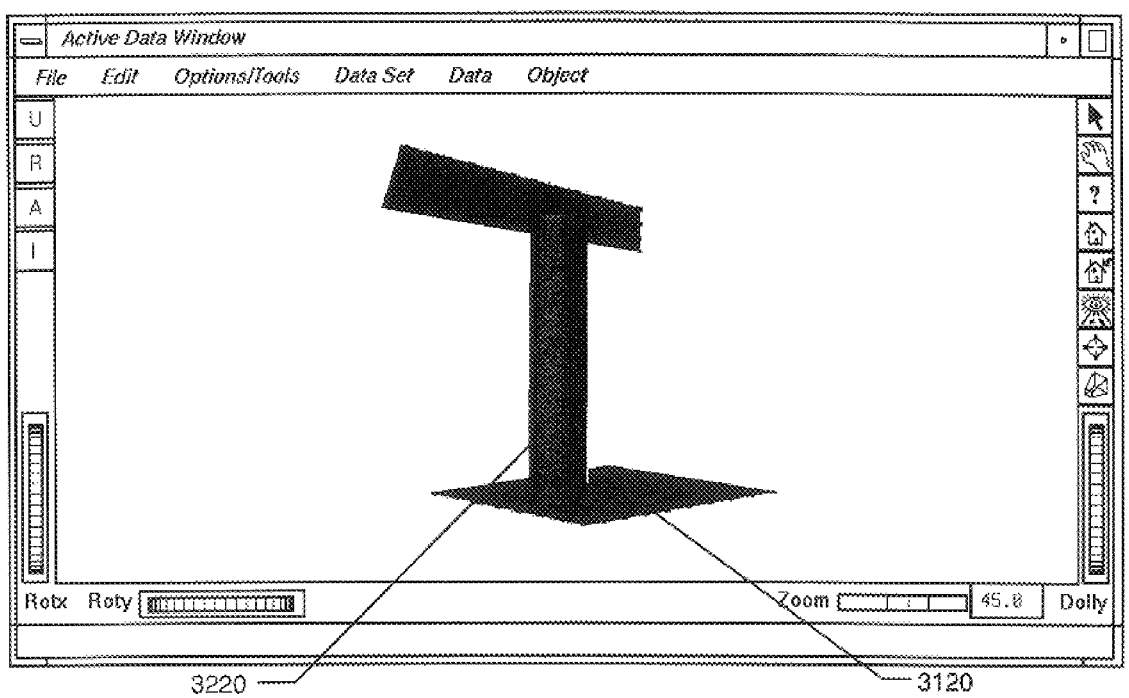
FIG. 32 shows the cylinder form FIG. 31 extended to meet adjacent objects.

Many common CAD operations such as extension, intersection (mutual extension) and trimming are available in the CGP 40. For example, the cylinder 3110 in FIG. 31 does not initially extend to the plane of the floor 3120. In FIG. 32 the cylinder 3220 has been extended to the floor plane 3120. These simple operations enable rapid completion of portions of the model from the objects created by geometry fitting. For instance, given three planar patches that were fit from scan data near a corner, it is easy to mutually extend the three planes to complete the corner feature.

Object extensions can be accomplished in several ways. One way is to select the geometric object to be extended and tell it to extend to a subsequently selected object. The nature of the extension is determined by both the type of object to be extended and the second object selected. For example, a cylinder extends the end closer to the second object along its centerline until its end intersects with the infinite plane defined by the second object's geometry (in the case of a planar patch, the infinite plane is that of the patch's plane, and for a cylinder, the infinite plane is that containing the centerline and as orthogonal to the extending cylinder as possible).

Another way is to make use of object handles, which are nodes that the user can grab. These handles are tied to an object's definition (position, orientation, and size) where appropriate, and by moving a handle, the object's definition changes accordingly. Again, taking the cylinder as an example, the same extension described above can be accomplished by grabbing the handle on the end to be extended, and then moving the handle (and extending the cylinder) to the desired position. A handle's motion depends on the part of the object with which it is tied; a handle on the centerline of the cylinder is constrained to move only along that centerline, while a handle on the boundary of a planar patch is constrained to move only inside the plane of the patch. For some objects, handles may be inserted and removed, changing the definition of the shape of the object (for example, handles on a planar patch have a one-to-one correspondence to vertices on the planar patch's boundary). Other handles can provide rotational control over an object. The control of handles is interactive and dynamically updates, so the user can see the intermediate results of the redefinition.

A new operation, called merging, has been developed to allow different portions of a single object surface to be joined to form a single object in the CGP 40. It is often the case that one's view of an object is obscured by other objects in front of it. For instance, the view of a back wall in a room may be divided into two pieces because of a column in the foreground. A scan of the region will result in different groups of points on the particular object. If auto-segmentation is used, as described later, rather than manual methods where a user knows that the points belong to the same object, then separate point groups would be formed. Each point group would then be fit to a separate object, resulting in multiple pieces of the same surface. The two objects in the CGP 40 that are known to be on the surface of the same feature, such as the two planar patches of wall obscured by a column, can be merged to form a single object. Each object stores a reference to the data points that define it, so when a merge request is received a new geometric fit is performed on all the underlying data points that were part of the constituent geometries to achieve the best overall fit. This novel method of increasing the accuracy of object fitting is used in the merging operations of one preferred embodiment of the invention. The characteristics of the two primitive objects that were merged do not affect the outcome of the merge; only the underlying point positions are considered.

Figure 33:
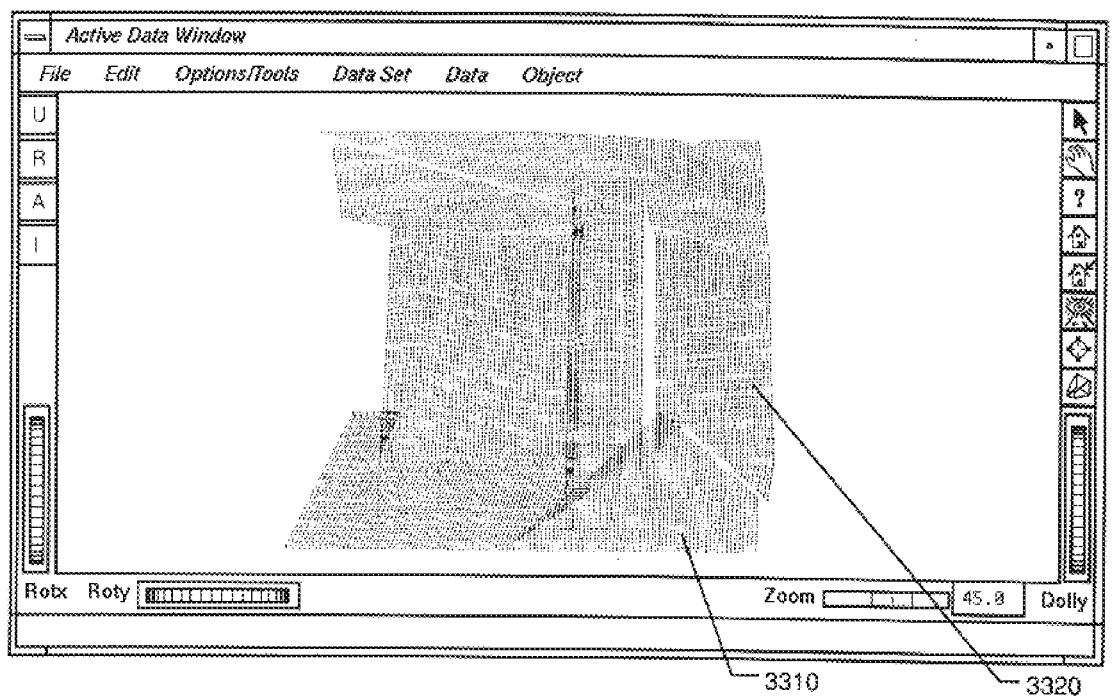
FIG. 33 shows a cloud of points from the surface from a variety of objects.
Figure 34:
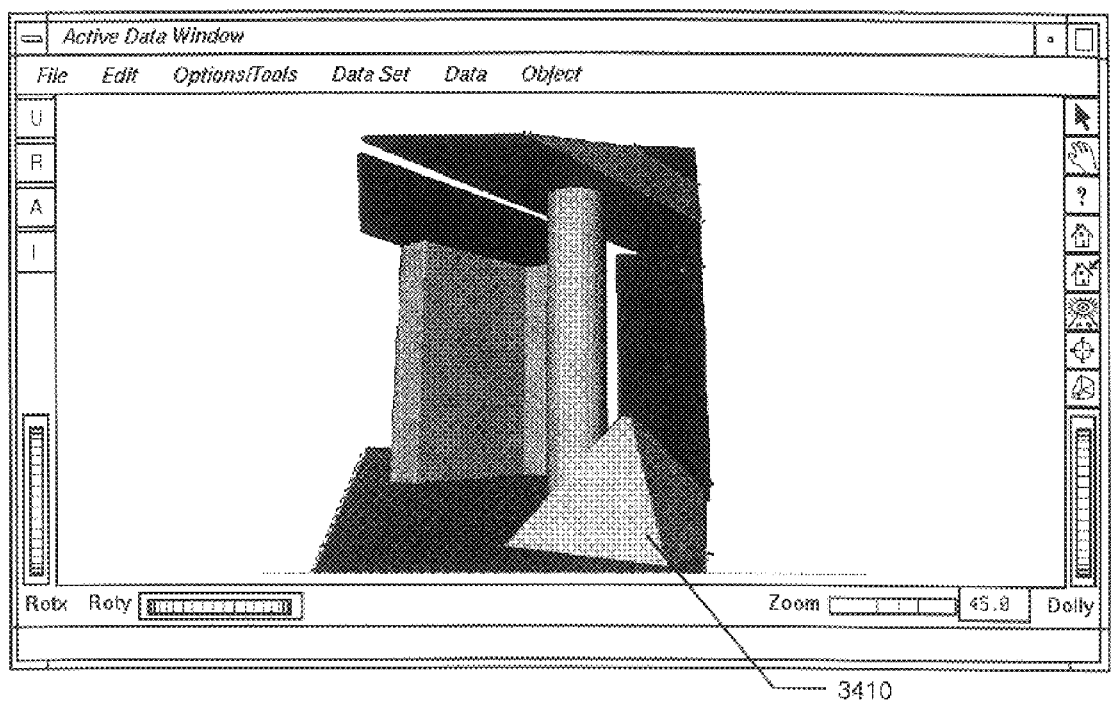
FIG. 34 shows a model containing primitives that were fit to the points shown in FIG. 33.

Using the manual or automatic methods, the user can take a cloud of points 3320 from the surfaces of many objects, such as the points on the pyramid 3310 shown in FIG. 33 and convert them to a set of geometric objects 3420, such as the planar face of the pyramid 3410 in FIG. 34. The modeled scene shown in FIG. 34 accurately represents the features of the original objects that were scanned, and allows measurements to be made between any particular locations in the modeled scene.

Scene Registration

The initial position of each scan point is described in a local coordinate system whose origin is that of the FDV 10, and whose axes are fixed relative to the FDV 10. Therefore, scan fields taken without moving the FDV 10 are inherently registered in that all the scan points use the same coordinate system. However, if the FDV 10 is moved between scanning operations, additional effort is required to transform the data to use a shared coordinate system. This is a six parameter rigid body transformation of a data set, involving three translation and three rotation parameters, and is easy to apply to the data once the transformation is known.

A novel process is used to register the scan fields from different FDV 10 positions. The novel registration process requires the user to identify pairs of points, lines or planes in two different scenes that represent the same feature. It is also possible to use different features, such as the back and front face of a wall, if the user knows the offset between them. The planes and lines are converted to point pairs, as described below, and the process operates entirely on point pairs. The points used for registration may be actual scan points or may be constructed points, such as a corner at the intersection of three planes.

Given a set of point pairs, the registration process searches the set of candidate points for three pairs that are not colinear. Using the three point pairs, one can construct the transformation required to convert the coordinate system in one view to that used in the other view, which in turn can be used to transform the scan points to all share a single coordinate system. For convenience, the process will be described in terms of the first data set remaining fixed while the second data set is transformed to use the coordinate system of the first. The process works equally well if the user fixes the second data set and transforms the first.

The first step is to apply a rigid body translation to the second data set to make the first pair of points coincide in terms of their x, y and z components. The second step is to rotate the second data set about its first point until the lines formed by points one and two in both data sets are colinear. The third step is to rotate the second data set about the line established in the previous step until the planes defined by points one, two and three in both data sets are coplanar.

Once an initial estimate is made one can use all the point pairs and an error minimization method to reduce the sum of the squares of the distances between each point pair.

In order to use the point registration method described above, the CGP 40 uses a novel method to convert lines, planes, and planes with offsets to sets of point pairs. Whenever a nonzero plane offset is present the new points introduced are shifted in the second scene to a position where they will match exactly with the corresponding points in the first scene. The replacement of planes and lines with points makes it simple to write the error function for minimization, since only point errors are involved, rather than angular and distance errors simultaneously.

In replacing planes and lines, one can only introduce points that are at location relative to the user specified objects, since the origins of the two data sets are different. For instance, introducing a new point pair in a plane at the location closest to the origin would not result in points that actually match in space, since the origin is arbitrary. However, introducing a point pair at a plane-line intersection will give matching points in the two data sets. Some pairs of objects, like parallel lines, should not be used to introduce new points so an angular tolerance, called ATOL below, is used to ignore poor object pairs. ATOL is initially set to ten degrees but other values can be used to generate fewer or more artificial point pairs as needed. The point pairs are introduced in the following order:

For all plane-line pairs where the angle between the line and plane is greater than ATOL, introduce two new point pairs. The first new point is inserted at the intersection point of the line and plane, and the second point pair is inserted along the line of action at a fixed distance away from the first point, here taken to be the minimum of the line lengths in the two views.

For all pairs of planes and points, introduce a new point pair on the plane such that the plane normal passes through the new point and specified point.

For all plane pairs whose normals are at least ATOL apart, generate a new line segment along the intersection of the planes and make the line segments length equal to the minimum extent that any plane has along the line. The new line segment has no direction, but has both length and position information. After this step the planes are no longer needed.

For all pairs of lines and points, introduce a new point on the line at the location where it is closest to the specified point.

For all pairs of lines separated by an angle greater than ATOL, introduce four new pairs of points. The new points are the ends of line segments along the original line of action, but centered on the location of closest approach of the two lines. The distance between the new line points is equal to the minimum length of the line segment lengths along that line of action from the two data sets. After this step the lines are no longer needed.

The result of the plane and line replacements as described above is a set of point pairs that retains the direction information associated with the original planes and lines. The augmented set of point pairs can then be used for the registration process that is described above.

After registration of the two scenes, primitives from the two individual views which represent the same physical object can be combined using the merging technique described previously. In particular, matching planar patches representing the same surface can be combined into one extended planar patch. Similarly, pieces of matching cylindrical surfaces can be merged to form a single cylinder.

Warping Data Sets

The registration process described above is a rigid body transformation that does not modify the relative locations of objects within either data set. After registration, most of the point, line or plane pairs that were identified will still have small errors, since the minimization process reduces the total mean square error. A novel method is presented that allows the user to force the identified pairs to exactly match by deforming the scene volumes.

As with any measured data, there is some level of error associated with each scan point location. The magnitude of the error associated with a point location will vary with the measuring technology used, but some error will always be present. Since the data under consideration here describes surface features of objects, the data errors will manifest themselves as surface irregularities. For example, a set of points acquired from an actual planar surface may not all lie on a plane, but will have some small scatter away from the real plane location. Calculating a best fit plane through the set of measured points may not give the real plane location or orientation due to the errors in the point data set.

The errors in recovered features, such as planes, cause errors in the relationships between the recovered objects as well. For instance, if data is collected from two planes that have an exactly ninety degree angle between them, the best-fit planes generated from the data points may not be exactly ninety degrees apart. Similarly, cylinders that were parallel in the real scene may result in best-fit cylinders that are not parallel after fitting from the scanned points. These inconsistencies in the recovered features, that occur due to measurement errors, will appear whether the data points are collected from a single scan position or are a union of scans from a variety of different positions.

The lack of fit problem may actually grow if several different sets of scan data are registered using a relative system. If a series of sequential scans are collected, and each scan is registered with respect to some recognizable sequence of data points in a previous scan, then the absolute errors in each scan may grow. If at the end of the sequence of scans the locations of features are exactly known, then one must adjust the scanned data points so that they fit the known locations. In surveying both the 2-D closure problem and the 3-D benchmark matching problems are similar in nature to the problems described above. In the surveying closure application, when one surveys a sequence of locations and arrives back at the starting location one typically finds that through cumulative measurement errors the starting and finishing locations are not at exactly the same location. The closure error, which is the distance between the starting in finishing locations, is distributed using well known surveying techniques throughout the other data points collected such that the first and last end points meet after the correction is made. Similarly, when surveying benchmarks of known location arc introduced into a surveying data set the data set must be adjusted to accommodate the known benchmark locations. Both the closure problem and the benchmark matching problem can be solved by the method described here since they can be described in terms of displacement constraints.

The novel method described here to correct location errors in measured 3-D data sets and distributes the errors throughout the point sets by applying solid mechanics principles to a volume surrounding the data points. The method provides a technique for satisfying a wide variety of displacement constraints on 3-D data sets and also distributes the measurement errors throughout the data sets. The process of deforming the data sets to achieve these goals is called warping. The displacement constraints can be specified in terms of both control points, whose absolute coordinates are known in space and do not move, and tie points, which represent the same location in two or more data sets, but whose absolute location is unknown. One can describe constraints involving more complex objects, for instance, line segments by specifying two points, and planes by specifying three points. In this way an entire family of constraints can be specified and applied to groups of objects such as points, lines and planes.

All constraints include an offset term that may be zero or nonzero. A zero offset between points indicates that the points should share the same final location, but does not prescribe where that location would be. If one of these points were a control point, with a known absolute position, then it would not move and the other point in the constraint would be forced to move to the same location to satisfy the constraint. In all cases, the final location would result from the energy minimization process that is associated with a solid mechanics solution. A non-zero offset between two points indicates that the points are to be a certain distance apart after the warping process is applied.

If the constraint's objects are lines or planes (rather than points), then in addition to the offset one can specify an angle between the objects. Using this family of constraints types, one could specify any number of relations between features in one or more data sets. The invention works whether a single or multiple 3-D data sets are involved, and the constraints can be between objects in the same or different data sets.

The solution of the constraint satisfaction problem begins by registering each of the data sets, as described in the previous section, so that all of the data shares a single coordinate system. Next, solid mechanics theory is applied to a volume surrounding the points in each data set to satisfy the displacement constraints. The warping method operates on one or more volumes that are created so that they surround all the points in a given data set. Each of these volumes is considered to be made out of deformable materials whose properties are specifiable. An isotropic material can be used with an elastic modulus of one and a Poisson's ration of zero. The solid mechanics solution finds the minimum energy displacement pattern that satisfies the specified constrains.

One can picture each of these volumes made out of a flexible material. If one anchored a volume to prevent rigid body motions and then prescribed a new location for a point on the interior, one could envision a distortion of the volume that involves not only the point of interest but also the rest of the volume. In reality, the constraints themselves can be used to anchor multiple volumes together. Mechanics principles allow one to determine the minimum energy deformation of the volume that satisfies the stated constraints, which mimics what would actually happen to a real deformable object subjected to the same constraints.

In a particular embodiment, the warping method uses principles of solid mechanics to deform a volume containing points of interest in order to satisfy a set of constraints applied to the data points. Not only are the constraints satisfied, but the effects of the initial location errors are spread throughout the volumes operated on.

The finite element method is used to apply the principles of solid mechanics to the volumes enclosing the points. The volume is discretized into a set of points or vertices and a set of elements that connect to the vertices. Four node tetrahedral elements are used to discretize the volume.

The first step of the process is to collect the set of constraints that apply to one or more data sets. During this phase, one must identify constraints that are to be satisfied by the warping process. These constraints include the identification of points that represent the same physical location in different data sets (tie points), like the corner of a cube, which are to appear at the same location when the warping process is completed. Some of the tie points may not be points that were scanned in the original data set, but may be constructed from groups of other points. For instance, if one had a series of points that represented three planes intersecting at a corner, then one could fit three planes to the points, and use the resulting corner point as a tie point. The constraints are specified in terms of pairs of objects, such as points, lines and planes, as well as the desired offset and angle between them. The two objects involved in the constraint can be contained in a single data set or can occur in different data sets. Within a single data set, one could specify that lines or planes remain parallel, or that the distance between two points be a specified amount. Between multiple data sets, one could write similar constraints, or indicate that the features seen in two data sets represent the same object. One might also know the actual location of some points very accurately (benchmarks) and constrain points in the data set to lie at the known locations. Using these benchmark points to anchor different points in the data sets enables the closure problem to be solved, since the data sets will be warped so that the measured data points move exactly to the desired control point locations and the errors in the data set will be smoothed over all volumes.

The second step in the warping process is to register all the data sets involved, as described in the previous section.

The third step in the warping process is to select a volume that surrounds the region of interest, and describe the volume in terms of a set of new points. The region that can be scanned by the FDV 10 is called the view volume and is shaped like a pyramid, with the tip of the pyramid located at the origin of the scanning device. A pyramidal shape can be used to bound the view region for the purpose of warping, and the pyramid is easily described by five points, using the same coordinate system as the data points. These new points do not become part of the data set, but are used in the warping process. The convex hull of these points represents the new volume surface, and should enclose all the data points on the interior. This operation is performed separately for each data set.

The fourth step is to mesh each of the data volumes. Meshing involves filling the volume with finite elements that leave no gaps and that do not overlap. The finite elements span between the points or vertices that have been defined on the volume boundary and those that are involved in constraints on the interior. The points in the data set do not all need to be included in the warping process, only those that are used in constraint specifications and those that define the volume boundary need to be used. The elements in the initial mesh may be of poor quality due to their shape. Long sliver elements, for instance, are known to give poor results in finite element analysis. Therefore, the meshing process is actually iterative. New points are inserted into the mesh, and then old elements are removed and new elements are introduced so that the mesh quality improves. This iterative process continues until one is satisfied with the overall quality of the mesh. In one preferred embodiment, four node tetrahedral elements are used. The initial mesh is constructed by applying a 3-D Delaunay triangulation on the starting set of points. The iterative process identifies poorly shaped elements using an element quality measure, and introduces new points and remeshes the region. The process terminates when all elements meet a minimum quality criteria. The preferred implementation uses longest edge bisection to introduce new points that improve the mesh, but other methods can be used.

The fifth step processes the constraints described in step one into a system of linear constraints. In the preferred embodiment, the final system of constraints is linear in terms of the nodal displacements at the vertices of the tetrahedral elements. The desired form of the constraints is:

$$Cu=q \qquad (6)$$

The matrix C contains constant coefficients. The number of rows of C is equal to the number of constraints in the system. The vector u represents the 3-D displacements of the vertices of the tetrahedral elements. The vector q contains constant coefficients. If the constraints are homogenous then each element of q will be 0. The form of constraint specification given in Equation (6) allows arbitrary linear multi-point (involving more than one vertex) constraints.

The conversion of the constraints specified in step one into the form shown above depends on the type of constraints involved. For two points to be tied together the constraint would be:

$$p_1+u_1=p_2+u_2 \qquad (7)$$

or $$u_1-u_2=p_2-p_1 \qquad (8)$$

In these equations, $p_1$ and $p_2$ are vectors from the origin to the vertices of interest, while $u_1$ and $u_2$ are the displacements of the same vertices during warping. Equation (7) demands that the final location of each vertex, equal to the starting point plus the displacement during warping, be equal to the final location of the other point. Equation (8) is in the form of Equation (6), with $q=p_2-p_1$ and results in three linear constraints, in terms of the x, y, and z components of the nodal displacements. Expanding Equation (8) into three equations in the form of Equation (6) then gives:

$$\begin{bmatrix} 1 & 0 & 0 & -1 & 0 & 0 \\ 0 & 1 & 0 & 0 & -1 & 0 \\ 0 & 0 & 1 & 0 & 0 & -1 \end{bmatrix} \begin{Bmatrix} u_{1x} \\ u_{1y} \\ u_{1z} \\ u_{2x} \\ u_{2y} \\ u_{2z} \end{Bmatrix} = \begin{Bmatrix} 0 \\ 0 \\ 0 \end{Bmatrix} \quad (9)$$

Other constraints, like the distance between two points, are non-linear in nature. The nonlinear constraints can use the existing geometry of the system as well as small deformation assumptions to produce linear multipoint constraints. For example, to specify the desired distance between two points to be some specified value x, one could determine the vector $v_{21}$ between the final points locations:

$$v_{21} = (p_2 + u_2) - (p_1 + u_1) \quad (10)$$

and then specify the desired length of the vector:

$$\|v_{21}\| = x \quad (11)$$

or, using the vector dot product:

$$v_{21} \cdot v_{21} = x^2 \quad (12)$$

Both Equations (11) and (12) are nonlinear in terms of the displacements of the nodes, $u_1$ and $u_2$. To linearize the constraint we can specify the desired length along the original line of action to be equal to the desired offset:

$$\text{let } n_{21} = \frac{(p_2 - p_1)}{\|p_2 - p_1\|} \quad (13)$$

$$v_{21} \cdot n_{21} = x \quad (14)$$

or $$[(p_2 + u_2) - (p_1 + u_1)] \cdot n_{21} = x \quad (15)$$

$$u_2 \cdot n_{21} - u_1 \cdot n_{21} = x - \|p_2 - p_1\| \quad (16)$$

The term on the right hand side of equation (16) is the desired distance between the points minus the current distance between the points. The x, y and z components of $n_{21}$, are constraints. Equation (16) can be written as a single constraint in the proper form as:

$$\langle -n_{21x} \; -n_{21y} \; -n_{21z} \; n_{21x} \; n_{21y} \; n_{21z} \rangle \begin{Bmatrix} u_{1x} \\ u_{1y} \\ u_{1z} \\ u_{2x} \\ u_{2y} \\ u_{2z} \end{Bmatrix} = x - \|p_2 - p_1\| \quad (17)$$

In Step 6 the final system of linear equations is assembled. There are two parts to this step: first, assembling the element stiffnesses for each of the tetrahedral elements, and second, selecting and applying a constraint handling technique. The calculation and assembly of element stiffness follow standard finite element procedures. Using constraints in the form of Equation (6) involves a constraint processing method. The Lagrange Multipliers technique can be used to introduce the effect of the linear constraints, but any other method, such as penalty or transformation techniques, could be used equally effectively.

Using Lagrange Multipliers, one introduces a new variable into the final system of equations for each constraint in the system. One then modifies the static equilibrium equations for the unconstrained system, which are given by:

$$Ku = r \quad (18)$$

In Equation (18), K is the system stiffness matrix, assembled from the individual element stiffness contributions, u is the displacement vector that is the solution of the problem, and r is a vector of externally applied loads. In this embodiment of the invention, there are no externally applied loads, so the r vector contains only zeroes. Equation (18) does not include the effect of any constraints, but these can be included using the Lagrange Multipliers technique to give the system of equations:

$$\begin{bmatrix} K & C^T \\ C & 0 \end{bmatrix} \begin{Bmatrix} u \\ u_L \end{Bmatrix} = \begin{Bmatrix} r \\ q \end{Bmatrix} \quad (19)$$

In Equation (19) K, C, u, r, and q are as previously defined, and $u_L$ is a vector containing the additional Lagrange Multiplier variables that are introduced using this method. The matrix $C^T$ is the transpose of C, and 0 is a matrix of zeroes. The solution of Equation (19) gives the displacements u that satisfy the linear constraints described by C and q. Note that these constraints may be linearizations of nonlinear constraints, and the nonlinear constraints might not be satisfied by the solution at this point.

If penalty or transformation methods were used instead of Lagrange Multipliers, a system of linear equations different from those shown in Equation (19) would be produced, but the solution of the linear system of equations will give similar values for the displacement vector u.

In Step 7 Equation (19) is solved to give u and $u_L$. There are many methods available to solve large systems of linear equations, and the preferred embodiment uses a symmetric solver with a profile storage scheme. The different types of solvers that could be used give essentially the same results, but optimize speed and memory usage differently.

The preferred embodiment uses a direct solver, but iterative sparse solvers could be used as well. The system of equations shown in Equation (19) is sparse, so significant speed enhancements can be achieved by selecting the proper solver. However, the results of the warping process overall are unaffected by this choice.

In Step 8, one must check if the current displacement satisfies the constraints to a desired level of accuracy. If the current deformed shape violates the offset or angle in any of the constraints collected in Step 1 by more than a user specified tolerance, then steps 5 through 7 must be repeated, starting with the new deformed shape. The linearizations of the shape may change on each iteration since the geometry of the volume changes with the cumulative deformations. When all constraints are satisfied within the given tolerance, then one can proceed to step 9.

Step 9 uses the nodal deformations u calculated in Step 7 to determine the deformation of any point of interest within the volumes. For each point of interest, one must find an finite element that includes the point on its surface or interior. If the point is internal to an element then only one such element exists. If the point is on the surface of an element or along the edge of an element, then several elements could be considered to contain the point. Any of these elements can be selected to determine where the point of interest moves. If the point is shared between elements, then the use of any of the elements to find the point displacement will give the same results. Once an element is identified, the vertex displacements of that element are extracted from u and are used to determine the displacement of any point on the interior using an interpolation process. This procedure uses the finite element shape functions which are linear in the preferred embodiment, and is a common operation in finite element analysis.

Auto-segmentation

The novel auto-segmentation process, as presented below, involves a similar sequence of operations to the manual modeling process described previously. A point cloud is segmented, geometric primitive objects are fit to the point groups, and then modeling operations, such as extension and intersection are used to complete the model. In this novel process, automation is applied to each of these steps, as well as the entire process, as described below.

It is possible to automatically partition the scan points into groups representing primitive geometrical shapes by using variations of common machine vision techniques. A gridded scan field is stored in a two dimensional array of points, much like a regular bitmap. The scan field differs from a bitmap in that more information is stored at each location than just a color. Each point stores its location in space, from which the distance to the scanner can be calculated, as well as the intensity of the return laser pulse. The depth information calculated from the three dimensional position stored at the points is crucial to the automated segmentation algorithm described here, even though many operations, such as filtering, rating, thresholding and thinning are commonly used image manipulation operations.

The first stage of the auto-segmentation process is to estimate the surface normal at each point in the grid. This can be achieved using many different techniques, the current embodiment of the software fits a plane to the nearest neighbors of the point in the 3 by 3 grid surrounding it. The normal of the resulting plane is taken as the normal at the center point. Each point in the grid has a normal calculated in the same way, except that edge and corner points ignore the missing neighbors in the normal calculation. The normal stored at each point is a three dimensional vector and is normalized to have unit length.

In the second phase two rating images are created by convolving standard edge detection filters over the grid. The first rating image is created by convolving the depth of the grid point with an edge detection filter to identify depth discontinuities, such as those that would occur at an occluded edge. A variety of edge detection filters can be used, but rather than operate on color or intensity the filter operates on the depth information stored at each grid point.

The second rating image is created by convolving the normal with an edge detection filter. The normal rating image is actually composed of 3 subimages created from a convolution with the normal's x, y, and z components. The resulting three values are combined by taking the square root of the sum of the squares to give a per-point scalar value. The second rating image is used to identify normal discontinuities, such as those that would occur at the edge between a wall and a floor. Again, a wide variety of edge detection filters can be used, but the values used are normal coefficients rather than color or intensity.

Once the two rating images have been created they must separately be converted to binary images. Conventional machine vision algorithms, such as recursive thresholding can be used to achieve this task. Each point in the depth and normal rating images contains an estimate of the gradient of the depth and normal respectively. Recursive thresholding can be used to isolate the regions of highest gradient. In the resulting binary images the points in the regions of highest gradient are marked as edge points while the rest of the points are marked as non-edge.

A final binary image is created by marking a point as an edge point if it is marked as an edge point in either or both of the two binary images created by recursive thresholding above. All other points are marked as non-edge. This image contains all edge points that delineate the boundaries between groups of points on different surfaces.

The final step of the point partitioning process is to use a connected components algorithm to collect the points into groups separated by edges. Points are considered to be connected only if they are vertically or horizontally adjacent in the grid, diagonal adjacency is not used. Very simple algorithms can be used to identify the unique groups of non-edge points in the image. Each group of connected points is then cut from the initial point set to form a new group of points. The result of this algorithm is the partitioning of the point set into multiple point groups that each represents a single surface. Each of the new point groups can be fit by a geometric primitive as described in the next section.

Once the scan cloud has been partitioned into groups of scan points that lie on different surfaces, the next step is to fit objects to the desired surfaces. A variety of methods can be used to achieve this task. The current embodiment of the software can perform the object fitting process in two different ways. The first method fits a series of objects to each group of points, and selects the objects that produces the smallest distance errors between the measured points and the fitted object surfaces. The second method uses the quadric surface fit described previously, and resulting principle curvatures, to determine if a plane, cylinder or sphere should be fit to a particular point group. Other variations of these approaches could also be used, such as progressive commitment, where objects are fitted in order from simplest to most complicated, and the process stops whenever the errors associated with the particular fit drop to acceptable levels.

The last stage of auto-segmentation process extends primitive objects, where possible, to create complete object intersections, rather than stopping at scan point boundaries. Using the gridded nature of the original data and the edge information from the point partitioning algorithm described above, it is possible to extend and intersect objects. For all edges that result from surface intersections, which are the surface normal discontinuity edges described above, one can extend the objects on either side of the edge to form an intersection.

Model Annotation

In order to compose a semantically rich 3-D model, individual parts in the above geometrical model can be annotated with additional, possibly non-geometric, information, such as material references or part numbers. This information can be entered manually through a special window for displaying object attributes.

The user may click on an individual part in the geometrical model and recover such additional information through other windows. Similarly, the user may request that all parts which meet some selection criteria are to be highlighted.

A novel method is also used for automatic model annotation. This method uses the FDV 10 to scan bar codes containing pertinent information relating to any given object. Standard bar code reading and decoding techniques are used to convert optical information to useful digital information that is associated with a given object scanned at the same time as the bar code. The captured information can be displayed as described above for the manual method.

Geometry Display and Query

The model is accessible in a variety of ways, including access through the data window 1610 where the model is rendered. Many standard graphic interface techniques can be used to manipulate the view of the model; in one preferred embodiment, a crystal ball interface is used. Any object in view can be selected using the pointing device; its geometrical attributes can then be displayed, in addition to other annotations added to the object. Traversing the data set can be simplified by placing objects in different layers, and then displaying only the layers of interest. Reducing the number of rendered objects in this way increases the interactive performance of the program. In addition to querying the geometric properties of individual objects several standard tools for measuring distances and angles between objects can be employed. Additional standard techniques can be used for operations such as contour generation, 2-D section cutting, and automated dimensioning.

The resulting model can be exported to any of a number of CAD programs for further editing or designing. In the preferred embodiment, the CGP 40 can create a CAD file in a format compatible with several commercial CAD programs, and can then start the CAD program, having it load the generated data file. With both the CGP and the CAD program running, the user can then view and work with the model using either program.

The remainder of the specification as originally filed appears in PCT WO 97/40342, published on Oct. 30, 1997, at pages 69–122 and is incorporated herein by reference.

User Interface Module

The user interface module encapsulates all parts of the code which handle the direct interaction of the user with the functionality of the system. The functionality of the software will be implemented separately from the user interface to that functionality. This will facilitate the possible implementation of an API and insure that the application is not bound to a particular style of user interface.

This module consists of such items as:

window management menu, tool bar, and scene viewer creation event dispatching user-interface look (colors, icon placement, etc.)

The user interface module will interact closely with the model viewing module which manages display of the object database. The user interface module will not handle display of, picking in, or management of scene graphs. This functionality will be encapsulated in the Model Viewing Module.

This module will also rely heavily on the Finite State Machine module which provides the basic tools necessary to control the changing state and feedback of the user interface and for determining which functions of the system are available to the user at any given time.

Model Viewing Module

The model viewing module encapsulates all functionality involving the display of the object database and display of feedback and auxiliary information in the object scene. Most of the base functionality is provided by Inventor but a strong encapsulation of this module will prevent dependence on Inventor.

Picking of objects in the scene should be handled by a separate module (which might, in a simplified implementation, make calls to the picking functionality of this module) to permit the implementation of fast picking mechanisms using a spatial database.

This module consists of such items as:

visual object node construction from geometric objects scene rendering setting rendering options (lighting, shading, texture, etc)

change of viewpoint highlighting/feedback operations

The model viewing module interacts closely with the User Interface Module to provide interactive viewing. Because of the interactive viewing functionality provided by Inventor viewer, the separation of interactive view manipulation (typically part of the User Interface Module) from scene management may be difficult or possibly undesirable. The User Interface Module will rely on functionality provided by this module to provide feedback within the scene to indicate operands to tools, selected objects, etc.

The model viewing module is tightly coupled to the Database Module and the geometric objects which it contains. Geometric objects will be stored separately in the database and the scene requiring that care be taken to insure the consistency of the object database with the scene that the user is viewing. This separation allows such operations as viewing subsets of the database, highlighting an object as feedback to a tool, and use of spatial hierarchies within the database to be performed intuitively.

Finite State Machine Module

The finite state machine module encapsulates the notion of an extensible system for specifying a collection of states, actions performed in those states, permissible transitions between states, and correspondences between events and transitions. The User Interface Module will make heavy use of the FSM module to determine what tools and objects are available for selection at any time.

The finite state machine module consists of items such as:

Event handling

Marking tools as inaccessible (grayed)

Setting proper state after an error

Calling tool implementations

Handling operand indication

The finite state machine module is difficult because of the need for exact specification of the state of the user interface despite its extensibility. Thus, menu items for a tool which may not exist when another tool is created may have to be grayed when that other tool is selected.

Database Module

The database module encapsulates storage and retrieval of the data generated by the application. It should provide rapid access to that data, whether it is stored on disk or in memory, in a transparent manner. This module should be designed to permit a client/server module in which multiple clients operate on the same database.

A scheme for checking out objects to be used by an operation seems necessary as well as some form of caching (assuming that disk support for the database is provided). The database should provide a general structure upon which a spatial hierarchy can be imposed for more efficient operation. A structural hierarchy and instancing should also be provided.

The database module consists of such items as:

Addition of geometric objects and images to the database

Retrieval of geometric objects and images from the database

Disk storage and caching

Checking in/out of database objects for editing operations

The database module will be closely coupled to much of the system. All modules which operate on geometric objects will interface with this module.

Input/Output Module

The I/O module encapsulates the transition of the geometric database from a run-time state to an inoperative state and back. The I/O module also encapsulated the translation of a geometric database to various third party CAD formats (DXF, etc), and the construction of an internal geometric database from such formats.

The I/O module consists of such items as:

Save/oad database

Save as . . .

Import from . . .

The I/O module is closely coupled to the Database Module and the Geometric Objects Module.

Geometric Object Module

The geometric object module encapsulates the various geometric primitives supported by the system. The module will contain submodules for each of the primitives and will provide the basic functionality accessible through the various tools in the Tool Module. The primitives are intended to be a fairly small, finite set of objects. In addition, there will be a group object which is a collection of primitive objects. It is undesirable to have a primitive for every possible object of interest (piping elbow, ladder, etc.).

The geometric object module will interact closely with the Database Module which provides persistent storage of geometric objects and the relationships between them (see also the Dependency Module). The geometric object module will also interact closely with the Model Viewing Module which stores and displays a parallel visual representation of geometric objects. Most of the system functionality on geometric objects will be encapsulated in tools within the Tool Module so that, for example, rather than adding a constructor to a line object for generating a line from two planes, a line-from-two-planes tool generates a call to a line constructor when given two planes. This follows a model which supports extensibility through the addition of new tools rather than the alteration of existing primitive objects.

The geometric object module consists of such items as:

Facet, point, edge, line, and cylinder construction

Generating calls to Model Viewing Module to create a display of an object

Changes to an object such as position and orientation, color, etc.

Queries to geometry of an object such as bounding box

Dependency Module

The dependency module encapsulates the notion of a historical genesis of the geometric database. Objects are generated from other objects, and the system records this generative process so that it can be repeated automatically when changes or additions are made to ancestors of a given piece of data.

This module interacts closely with and will have its data stored in the Database Module. The depency information is a part of the geometric module and must be stored persistently. A strong encapsulation of this dependency information is desired so that geometric primitives need not maintain any information about their genealogy.

The dependency module consists of such items as:

Recording the operations and operands required to generate a geometric object

Regenerating all of the descendants of a changed objects

Undo Module

The undo module encapsulates the run time history of a user with a geometric database. The undo module records a stack of actions necessary to undo operations in the reverse order in which they were performed by a user. Each undo-able tool in the Tool Module will provide a call with operands which when run will reverse the actions of that tool.

The undo module provides functionality to:

Store the 'undo' calls and operands

Apply these 'undo' calls when requested and generate a 'redo' stack

The undo module interacts closely with the Tool Module as each undo-able tool must provide appropriate calls to the undo module. The undo module, while interacting closely with the Database Module, does not stores its data in the database module because it records a session with a user rather than information required in the geometric model.

Tool Manager Module

The tool manager module encapsulates providing extensible functionality available to the user. The tool module is the key participant in the extensibility of the system. The addition of new functionality to the system will coincide with the addition of a new tool.

Tools are expected to provide a default method of invocation, a method of selecting arguments, an extension to the user interface, an extension to the help system, and an implementation of the functionality of the tool. Tools must instruct the User Interface Module and the Model Viewing Module to provide appropriate feedback to the user and must gracefully handle abortion by the user or internal errors (see the Error Module).

The tool manager module consists of items such as:

Registering a tool with the application

Invoking a tool when requested by the User Interface

Remapping how a tool is invoked

The tool manager module interacts closely with the User Interface Module and the Finite State Machine Module as well as the Tool Kit Module which provides the actual tools which the Tool Manager manages. The Finite State Machine Module allows the tool manager to instruct the User Interface Module how it is to behave as a tool is selected or being used.

Tool Kit Module

The tool kit module is an extensible collection of tool objects each of which can be given to the Tool Manager Module for management. Tools encapsulate the functionality of the system provided to the user. Each tool provides a default method of invocation, a method of selecting arguments, an extension of the user interface (provided through the FSM module) to permit feedback to the user specific to the given tool, an extension to the help system, and an implementation of the functionality of the tool (including calls to the Database and Geometric Objects Modules to create, destroy, and edit geometry).

The tool kit consists of all items of system functionality not described elsewhere in the design.

Error Module

The error module encapsulates the general error handling mechanism of the system. This module will be used throughout the system and will allow for the provision of error handlers, the reporting of errors to the user (through calls to the User Interface Module), the addition of assertions within the code, and the signalling of errors when assertions are botched. This module is likely to require the addition of some basic constructs to the coding paradigm.

The error module consists of items such as:

Error handlers

Assertions

Signalling errors

Error reporting

The error module will interact with all modules of the system and must be implemented with a focus on making its presence as minimally intrusive to the programmer as possible.

Help Module

The help module encapsulates an extensible context sensitive, on-line manual. The help system will provide both a page oriented general manual as well as abbreviated context help information ("What do I do now?"). Each tool will provide an extension to the help system and links into that extension within its finite state machine to permit context sensitivity.

The help module consists of items such as:

Display and navigation of help pages

Indexing and searching of help information

On-screen, interactive help messages

The help module will interact closely with the Tool Kit and Tool Manager Modules as well as the User Interface Module.

Data Collection Module

The data collection module encapsulates the acquisition of data from the physical world. Data acquisition objects such as scanners and cameras are objects within this module. The data collection module provides a collection of commands which can be performed on a piece of data collection hardware and mechanisms for returning data from this hardware to the system. For an extensible data collection system, data gathering hardware would have to provide a user-interface extension to set parameters for that hardware or command that hardware to perform data gathering tasks.

The data collection module consists of items such as:

Communication with cameras and scanners

A user interface for generating commands and receiving data from the devices

Calls to system functionality for adding data to the database

The data collection module interacts closely with the Database Module and the User Interface Module.

Registration Module

The registration module encapsulates the process of registering and combining two geometric databases. The registration module includes a method for selecting two geometric databases, a method for specifying correspondences between databases, and a method for constructing a merged geometric database from the two separate geometric databases.

The registration module interacts closely with the Database Module and the User Interface Module.

Layers Module

The layers module encapsulates the presence of named sets of objects within a geometric database and a collection of tools which permits the selective display of and operation on such sets. The contents of this module are currently ill-defined.

The layers module would be expected to interact closely with the Database Module and the Model Viewing Module.

Abstract Data Types Module

The abstract data types module encapsulates a collection of general purpose abstract data types which are separable from the data types specific to this application.

The abstract data types module consists of items such as:

Stack

Queue

Single and double linked lists

Hash table

Heap

The abstract data type module will be used in virtually ever) other module.

Draft

Confidential

SUMMARY OF PROPOSED CGP SPECIFICATIONS

Smart Element Capabilities

1. Geometry is represented initially as a cloud of points; later as a mesh, as a detailed model copied from a library or catalog, or as simplified model generated interactively.
2. This geometry can be enhanced with color, intensity, texture, or even video information which gets added to the individual surfaces of the element.
3. There may be more than one representation for each element: First there may be several geometrical proxies of various levels of simplification or abstractions which can be chosen to make rendering more efficient and the produced views less cluttered. Furthermore there can be symbolic representations for schematic renderings such as floorplans, elevations, or isometric pipe drawings. There may even be smart models suitable for certain types of simulations.
4. Elements can be provided with tags or "layer" information for classification purposes. When constructing a model of a plant or of a refinery, the user may choose tags from previously defined hierarchical menus; e.g., the choices at a first level might be:

Supporting Structure—Maintenance Gangways—Pipe Systems—Other . . . And at a second level within the category "Pipe Systems" we might find:

Steam—Water—Gas—Oil—Alcohol . . .
5. Arbitrary textual information can be attached to each element via a text window. This may contain summary information from a catalog or notes concerning the modeling.
6. Elements can be linked to other information contained in external databases, such as the type of a valve or pump, its ratings, its manufacturer, its maintenance schedule . . . . This information in the external database may be in the form of a hyperlinked database. It is viewed and browsed in the context of the viewer for that database.
7. It might be useful to have some explicit connectivity information. While logical connectivity between pipes or electrical wiring may be outside the initial charter of the CGP and could be extracted later from the implicit geometrical near-coincidences of certain elements, it might be worthwhile saving such adjacency information when it is first discovered. E.g., when a connected mesh is decomposed into several elements, say a pump and a pipe and a valve, then the cut lines in the initial mesh could be used to establish some explicit contact information between the parts that share these cut lines. This information will make it later much more efficient to find and extract a run of connected pipe elements.

Functionality of the Overall System

Management Tools

1. At the "OS"-level, the system provides the capabilities to control the scan management and the video gathering. Later we may provide a user interface to provide more selective ways of indicating the areas that need to be scanned: one option is the "thick-brush" paradigm in which the user outlines the features that should be incorporated in the model; the system then goes and finds the corresponding features in the world and automatically selects a suitable scan region for the chosen edge, pipe, or I-beam.

2. Also at the OS level, the system provides the capabilities for efficient multi-tasking, so that several windows can be opened simultaneously, providing views into one or more catalogs or databases, while a scanning process or a modeling operation are under way.

3. There will be data management facilities for the scanned point sets and for any collected video images; as well as ways to label them and file them away for archival purposes.

Modeling Tools

4. At the "pure geometry" level, basic tools permit selection of subsets of the scanned points and enable manual segmentation. Meshes can be fit over the scanned points, and heuristically disconnected at possible horizon lines where there are sudden dramatic changes in the depth coordinates. If necessary, these meshes can be simplified. Planar polygons can be fit to selected portions of these meshes or to subsets of the original scanned points. Survey points can be established; lines can be drawn between them; and break-lines can be established between polygons or portions of a mesh.

5. At the "discrete element" level, tools permit collections of pure geometry parts to be lumped together and named as an element which can then be provided with additional information. Sections of a mesh could be replaced with models from a catalog or library or with a symbolic geometrical proxy. Backsides of such models may have to be intelligently added, out-lier points removed, and the model generally cleaned-up and subjected to some consistency tests.

6. These elements can be provided with color, intensity, texture, or texture map information. Other attributes can be assigned to these objects, and various kind of linkages can be established.

7. Sets of objects can be selected interactively and grouped hierarchically.

8. View integration is provided between views taken from different camera positions:

Pairwise view alignment based on registration features or based on an optimization process that tries to register the overlapping portions of two meshes by minimizing their mutual distances.

Data merging by weighted averaging of position parameters of discrete elements or by zippering together two overlapping mesh sections.

Establishing global closure by smartly distributing the closure error over previously established pairwise view registrations. <This is a hard problem that needs to be thought about carefully>.

Visualization

9. At any time during the data gathering or modeling process, the existing geometrical data can be viewed interactively either in a "crystal-ball/model-in-hand" paradigm or in a "walk-through" mode. At a later time we will add the proper spatial data structures and management schemes to make walk-through possible at interactive speeds even if the model is very large (more than 1,000,000 polygons).

10. Different modes of rendering the data will be provided: point clouds—wire frame—hidden lines removed, showing unshaded but outlined visible faces—flat-shaded facets—Gouraud-smooth-shaded meshes.

11. There will be schematic and symbolic representations such as floorplans and elevations which may use 2D proxies for various components to make the result more efficient and more effective. There may be center-line representations for pipes, or symbolic moment frame grids for steel structures. There may also be Pipe-ISO drawings and perhaps P&ID process drawings.

Database Queries

12. Geometrical information can be extracted from the model at any time. Cut sections can be created, and distances between two points or angles between to planes can be extracted.

13. By selecting discrete elements in a particular manner (e.g., double clicking it) the attribute information associated with that elements can be fetched from the database. If this information is large and organized in a hyperlinked document format, then the corresponding database browser will be opened and the root page for this object will be presented.

Data Exchange with Other Systems

14. Data generated within the CYRAX CGP can be exported in an ASCII text format in the form of ".crx" files. The .crx format should be able to encode all information that is self-contained within a CYRAX model. This should allow sophisticated users to build external programs that can search CYRAX models for specialized analyses (such as counting all elements of a particular type) or to make global modifications to such a model (e.g., replace all I-beams of a particular type) without the need to go through any other database system.

15. We will provide some converters for popular existing databases such as AutoCAD or MicroStation which will properly insert the information contained in the .crx data stream into these databases. Conversely we will also provide some converters that will extract geometric information relevant to the CYRAX CGP and bring it into our own modeling environment.

16. Initially we do not plan to provide a complete smart product model database in which all additional information associated with any discrete model element can be stored; we will rely on the users of CYRAX to use their own established data storage facilities. We will, however, provide facilities to gain access to such databases via a separate window opened at the OS level. Links between non-CYRAX data items can then be established directly within these external databases between the geometrical representation of a model part and any other entries in the database that seem relevant.

User Interface Paradigms

17. We plan to provide a nice window-based user interface that emulates (as much as seems reasonable) the established interaction culture in MicroStation and AutoCAD. This implies the use of icon-palettes, pull-down menus, as well as keyboard shortcuts.

18. In the domain of graphical editing we will provide "Snap-Dragging" behavior to combine precision and speed in a an efficient and user-friendly manner.

19. For some application domains we will develop specific "Object Associations" that will provide behavioral heuristics that will minimize the number of mouse clicks a user has to make to accomplish a particular objective or the number of degrees of freedom the user has to control explicitly in any modeling operation. We expect that the higher symbolic levels of representation of a smart product model will offer interesting challenges how the entry of complex information can be made as simple as possible.

Cyrax Software Specification
6 February 1996

| Proposed Software Features | Iα | IB | IA | IIA | IIB | IIIA | IIIB | Fut./Opt |
|---|---|---|---|---|---|---|---|---|
| Scanning/Hardware Interaction | | | | | | | | |
|   Target Acquisition | | | | | | | | |
|     raw video | √ | | | | | | | |
|     corrected video | | √ | | | | | | |
|     laser paint | | | | √ | | | | |
|   Target Selection (see Basic Interface/Selection) | √ | | | | | | | |
|   Selection Parameters | | | | | | | | |
|     samples in x and y | √ | | | | | | | |
|     adaptive scanning | | | | | | | | √ |
|   Data Acquisition | | | | | | | | |
|     Axis aligned scans | √ | | | | | | | |
|     spiral scans | | | | | √ | | | |
|     edge aligned scans | | | √ | | | | | |
|     polygons | | | | √ | | | | |
|     intensity data | √ | | | | | | | |
|     bore-sighted video color/texture | | | √ | | | | | |
|   Positioning Functionality | | | | | | | | |
|     Get Point | | | | √ | | | | |
|     Reflector Target | | | | | | √ | | |
|   Scanning simulator with error model | √ | | | | | | | |
| File I/O | | | | | | | | |
|   Open/Close/Save | | | | | | | | |
|     raw scan data | | | | | | | | |
|     plain ASCII | √ | | | | | | | |
|     geometric data | | | | | | | | |
|     DXF (general CAD 'default standard') | √ | | | | | | | |
|     INV (SGI Inventor) | √ | | | | | | | |
|     DGN (MicroStation native format) | | √ | | | | | | |
|     DWG (AutoCad native format) | | | | | | | | ? |
|     IGES 5 (int'l mechanical CAD standard) | | | | | √ | | | |
|     delimited ASCII | | | √ | | | | | |
|     STL (stereolithography machine format) | | | | | | | √ | |
|     VDA-FS (automotive CAD) | | | | | | | | ? |
|     CADDS 5 (Computervision format) | | | | | | | | ? |
|     smart model data | | | | | | | | |
|     3DMF (QuickDraw3D object standard) | | √ | | | | | | |
|     VRML 2.0 (World Wide Web standard) | | √ | | | | | | |
|     CRX data exchange (Cyra propr. format) | | | | | √ | | | |
|     OBJ (Wavefront native format) | | | | | √ | | | |
|   Print/Plot  basic (window dump) | √ | | | | | | | |
|     advanced (scaling, labels, ...) | | | | | | √ | | |

-81-

| Underlying System Functionality | | 1 | 2 | 3 | 4 | 5 | 6 | 7 | 8 |
|---|---|---|---|---|---|---|---|---|---|
| Platforms | SGI IRIX support | √ | | | | | | | |
| | Windows NT support | √ | | | | | | | |
| | Windows 96/7 support | | | | | | | | ? |
| | Mac Copland OS support | | | | | | | | ? |
| Object database engine | | | √ | | | | | | |
| Graphic engine | | | √ | | | | | | |
| Windowing engine | | | | √ | | | | | |
| Multitasking (OS level) | | √ | | | | | | | |
| OLE 2 for CAD support | | | | | | √ | | | |
| PDES/STEP compliance | | | | | | | | | ? |
| Basic Interface/Operations | | | | | | | | | |
| Window Paradigm (follow standards where appl.) | | | | | | | | | |
| Iconic tool palettes | | | √ | | | | | | |
| Function key shortcuts | | | √ | | | | | | |
| Pop-up browsers and selection palettes | | | √ | | | | | | |
| Point/Object/Target Selection | | | | | | | | | |
| Selection modes | | | | | | | | | |
| mouse (select nearest to click) | | √ | | | | | | | |
| brush (select nearest to swath) | | | √ | | | | | | |
| rectangle (select within rectilinear bnds) | | √ | | | | | | | |
| lasso (select within free-form bounds) | | | | √ | | | | | |
| Multiple selections (via shift key modifier) | | √ | | | | | | | |
| adj. clipping plane for selection constraint | | | | √ | | | | | |
| Point/Object Manipulation modes | | | | | | | | | |
| snap dragging   basic | | | | √ | | | | | |
| snap to grid | | | | √ | | | | | |
| snap to object edge/center | | | | √ | | | | | |
| View Manipulation | | | | | | | | | |
| zoom in/out | | √ | | | | | | | |
| dolly | | √ | | | | | | | |
| rotate in x, y, z | | √ | | | | | | | |
| pan | | √ | | | | | | | |
| Metric/Imperial Toggle | | √ | | | | | | | |
| save window state | | | | | | √ | | | |
| Global Operations | | | | | | | | | |
| Cut (delete) selection | | √ | | | | | | | |
| Copy | | | | √ | | | | | |
| Paste | | | | √ | | | | | |
| Undo | | | | | | | | | |
| single | | | √ | | | | | | |
| multiple | | | | √ | | | | | |
| save undo state | | | | | | √ | | | |
| ~~tree structure~~ | | | | | | | | | ? |
| Intelligent Operations | | | | | | | | | |
| Queries (select/search) | | | | | | | | | |
| all | | | √ | | | | | | |
| by parameter | | | | | √ | | | | |
| ODBC/SQL interface | | | | | | | | | |
| Macros (OS level) | | √ | | | | | | ? | ? |
| Scripting/Command line language | | | | | | | | | |
| Published API / Open architecture | | | | | | | | ? | ? |
| | | | | | | | | | ? |

-82-

| | | C1 | C2 | C3 | C4 | C5 | C6 | C7 | C8 |
|---|---|---|---|---|---|---|---|---|---|
| Geometric Modeling/Construction | | | | | | | | | |
| Meshes | Basic (triangulation) meshing | √ | | | | | | | |
| | "Shrink-wrapping" (draped cloth) | | | √ | | | | | |
| | Smoothing (averaging & gauss. filters) | | √ | | | | | | |
| | Mesh optimization/simplification | | | | | √ | | | |
| | Break Lines | | | | √ | | | | |
| | Mesh to geometric primitive connections | | | | | | √ | | |
| Best fit Primitives | | | | | | | | | |
| | line | √ | | | | | | | |
| | plane (convex face) | √ | | | | | | | |
| | corner | √ | | | | | | | |
| | angle beam | | √ | | | | | | |
| | box beam (constrained frustum) | | | √ | | | | | |
| | frustum | | | √ | | | | | |
| | I-beam | | | √ | | | | | |
| | concave face | | | | | √ | | | |
| | cone | | | | √ | | | | |
| | cylinder | √ | | | | | | | |
| | flange | | √ | | | | | | |
| | elbow | | √ | | | | | | |
| | sphere | | | | | | √ | | |
| | NURBS line | | | | | √ | | | |
| | NURBS surface | | | | | | | | √ |
| Auto segmentation | | | | | | | | | |
| | plane | | √ | | | | | | |
| | cylinder | | √ | | | | | | |
| | Voxel | | | | | | | | √ |
| Multiple Objects | | | | | | | | | |
| | intersect basic | √ | | | | | | | |
| | with pipe elbow mesh | | √ | | | | | | |
| | extend click first then second | √ | | | | | | | |
| | drag first to second | | | √ | | | | | |
| | merge faces/lines | √ | | | | | | | |
| | objects | | | | | | √ | | |
| View Integration | | | | | | | | | |
| | basic (3 points, line + point, 3 planes, ...) | | √ | | | | | | |
| | advanced (heuristic distribution of error) | | | | √ | | | | |
| | view closure in 3 space (global optimization) | | | | | | | | √ |
| Intelligence Modeling/Construction | | | | | | | | | |
| Group objects | by hierarchy | | | √ | | | | | |
| | by layer | | | | √ | | | | |
| | by instance | | | | √ | | | | |
| Labels | | √ | | | | | | | |
| Abstractions | | | | | | | | | |
| | geometric (for walkthroughs, et al) | | | √ | | | | | |
| | symbolic (for isos, sections, et al) | | | | | | √ | | |
| Catalog | | | | | | | | | |
| | manually substitute part for point cloud | | | √ | | | | | |
| | semiautomated part preselection | | | | | | √ | | |
| | advanced catalog browser interface | | | | | | √ | | |
| Connectivity | | | | √ | | | | | |
| Bar Code reading | | | | | | | | | $ |
| interface to 2D drawing data extraction | | | | | | | | | $ |

Geometric Visualization/Rendering

| | 1 | 2 | 3 | 4 | 5 | 6 | 7 | 8 |
|---|---|---|---|---|---|---|---|---|
| Basic Views | | | | | | | | |
| left, right, front | √ | | | | | | | |
| top | √ | | | | | | | |
| orthographic | √ | | | | | | | |
| perspective | √ | | | | | | | |
| Basic Rendering | | | | | | | | |
| scatter plot | √ | | | | | | | |
| wireframe | √ | | | | | | | |
| basic (gouraud) shading/hidden line | √ | | | | | | | |
| phong shading | | √ | | | | | | |
| raay tracer or radiosity engine | | | | | | | | ? |
| Geometric Data Views | | | | | | | | |
| Dimensions Toggle | √ | | | | | | | |
| General info window (# of pts, extent, ...) | | √ | | | | | | |
| Selected point/object popup info (x,y, z, ...) | | | √ | | | | | |
| Distance btwn pts/objects (pt to pt, pt to obj) | | √ | | | | | | |
| Projected distance between objects | | | | √ | | | | |
| Angle (between 3 points, 2 lines/planes, ...) | | | | √ | | | | |

Intelligence Views/Rendering

| | 1 | 2 | 3 | 4 | 5 | 6 | 7 | 8 |
|---|---|---|---|---|---|---|---|---|
| Label Viewing Toggle | | √ | | | | | | |
| Smart Object data popups via object selection | | | | | √ | | | |
| Object Hierarchy map    single object | | | √ | | | | | |
| Shading    Intensity Pseudocoloring | | √ | | | | | | |
|            contour stripes (surf deviat.) | | | | | √ | | | |
| Texture/Color mapping    basic pixel | | | √ | | | | | |
|                          advanced object | | | | | | √ | | |
| Walkthrough culling    Generic depth | | | | | √ | | | |
|                        Smart AEC | | | | | | | | ? |
| Engineering    Elevation | √ | | | | | | | |
|                Section | √ | | | | | | | |
|                Section via custom clip. plane | | √ | | | | | | |
|                Standard Isometric | √ | | | | | | | |
|                Piping Isometric | | | √ | | | | | |
|                Center Lines toggle | √ | | | | | | | |
|                Hidden Line Removal toggle | | | | | √ | | | |
|                Contour Lines | | √ | | | | | | |
|                Dimensioned contour lines | | | | | √ | | | |
|                P&ID Process Drawings | | | | | | | | $ |
| Connectivity    basic | | | | | √ | | | |
|                 clash highlighting | | | | | | | | √ | by Alonzo C. Addison

Peripherally based upon:
    9 Jul 95 'Voeller Spec' by JSD
    1 Aug 95 'surface.txt' by MB et al.
    30 Oct 95 'Database Issues' by MB et al.
    27 Nov 95 'CGP Paradigms' by MB et al.
    23 Jan 96 'Cyrax Database Issues' by CS
    Jan 96 'Fluor' and 'Chevron' proposals
    late Jan 96 system functionality discussion of BK, CS, ACA

Product Overview

Cyra Technologies' Field Digital Vision (FDV) unit provides portable, rapid, and accurate laser range scanning technology in the field. The FDV, like a three-dimensional camera, is pointed at a target which it then scans to generate a range image. A range image is like a digital photographic image except that each pixel of the image is a point in space rather than a colored two-dimensional point. The FDV permits a user to rapidly gather three-dimensional data about an object by gathering thousands of points from that object.

Such data is the starting point for a multitude of modelling, design, and documentation tasks. The Computer Graphics Perception (CGP) software kit provides the functionality necessary to convert collections of range images into three-dimensional, intelligent models. These models can be generated by surveyors as the FDV generates the range images or can be generated in the office by CAD operators from gathered data. Because of the wide range of modelling tasks, requirements, and paradigms within the various three-dimensional modelling communities, the CGP is designed to support a general framework which can be integrated easily with standard CAD tools, facility management software, and intelligent modelling environments.

The functionality of the CGP takes you from range image to complete, annotated, intelligent models. The structure, detail, and content of the resulting model is under the complete control of the user allowing the generation of ten minute rapid visualization models to multi-layer, intelligent facility documentation models. The various forms of modelling available integrate easily and consistently to permit highly detailed and annotated submodels of interest to coexist with low resolution, automatically generated shrink-wrap models of 'context' structures intended only to aid in visualization.

Framework

The CGP is structured around a database (figure 1). The data stored in the database can come from a variety sources including raw range scans and video images generated by the FDV, geometric entities generated by the CGP modelling process, geometric entities and associated product information imported from catalogues, and annotation data such as facility maintenance information. Data within the database is classified as either 'internal' or 'external' data depending upon whether the content of the data is meaningful to the CGP system. Internal data such as geometry, scan points, and geometric annotations is used directly by the CGP is general purpose data required to meet the modelling needs of a wide range of user communities. External data stored in the database has meaning only in the context of general database queries or external, application specific software. Examples of external data include the date a pump in a chemical plant was serviced, the manufacturer of a particular part, or a pointer to the home page of the designer of an architectural subsystem. While internal data can reference external data elements, the CGP has no way to understand, manipulate, or present this data and must rely on external queries and external packages to make use of it. A more complete description of this concept is presented in the section "Intelligent Modelling".

-85-

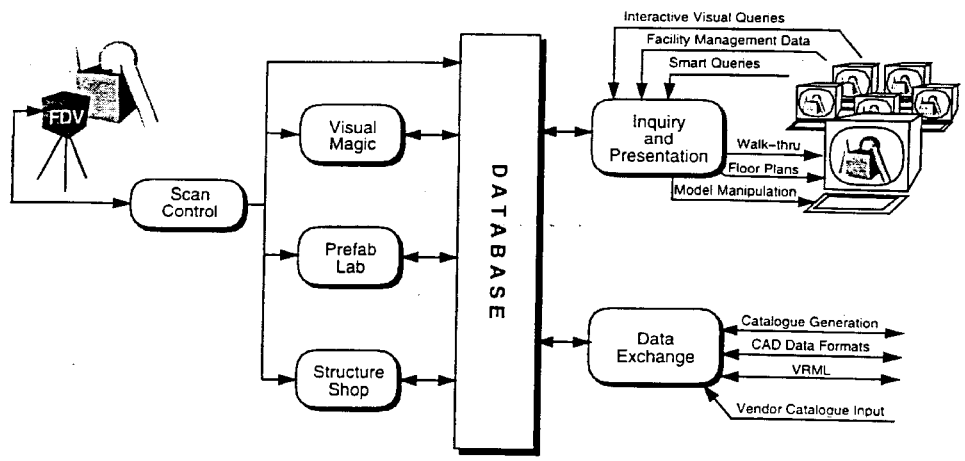

Fig. 1 – Framework

The process of converting range data into three-dimensional models, typically termed reality acquisition, appears on the left side of the database in Figure 1. To The right of the database can be found two types of tasks: those involving the presentation of the data to a user community (which can range from a single person to every department in a chemical plant) and those involving the import and export of geometric data from and to other sources. These tasks are not specific to the use of the FDV and do not involve geometry construction and manipulation by the user.

The reality acquisition process subdivides into two processes: scanning and modelling. The CGP provides all of the necessary controls to operate the FDV scanner to gather video images and range scans both of which are archived in the database. Control over the amount of dtaa gathered, the resolution of that data, and the exact region to be scanned is provided to the user through the Scan Control tools.

Three toolkits are provided by the CGP to develop range scans into geometric models depending upon the type of model desired and the contents of the scene being modelled. Each toolkit is optimized for a particular style of geometric modelling and thus the use of different toolkits for different portions of the modelling task is expected. The Visual Magic toolkit provides rapid mesh generation functionality for general purpose model construction of complex objects or scenes. The Prefab Lab provides mechanisms for replacing range and mesh data with prefabricated parts whose models are input from external catalogues or are instantiations of objects generated using the CGP. The Structure Shop provides point, line, and plane primitives and various Euclidean operations on these primitives useful for the construction of basic structural geometry such as architectural structures. As will be described in depth in the section on "Object Types", provisions for interoperability between the three toolkits permit users of the system to select which ever toolkit seems appropriate for a given task and then to integrate the results of the different toolkits into a single coherent model.

The Inquiry and Presentation system is a visual front-end to the database which allows users to view, query, and augment the external data within the database. The user will have the ability to walk through generated models and subsystems, visualize portions of the database, or generate basic structural diagrams. External information such as maintenance plans, subsystem names, and references to other databases can be associated with objects in the CGP database. This data can be queried, retrieved, and updated by a user community throughout the lifecycle of the real world system which the database represents.

The Data Exchange system permits the CGP to be coupled to existing CAD systems. This coupling comes in the form of data conversion routines to and from various CAD formats. Vendor part catalogues which have not been generated using the FDV and CGP can be imported into the system for use in the Prefab Lab. A part which needs to be redesigned can be exported from the CGP database to AutoCAD or other CAD packages to be reworked and then imported back into the CGP database.

The various systems and toolkits of Figure 1 are tightly integrated into a single coherent system from the perspective of the user. The user operates in the visual window-icon-mouse-and-pointer environment and moves from module to module simply by pulling down a different menu or accessing a different tool bar. Most operations do not require keyboard input or arcane command line arguments typical in many CAD systems; rather, the user models geometry by selecting commands from a small but powerful tool set and clicking on the objects upon which he wishes these commands to operate. Visual interactivity is key to the field usability of the system and thus a focal point in the development of the CGP.

Document Overview

The remainder of this document is a high level specification of the CGP in the form of a user-oriented functionality guide to the system. This format is concise yet descriptive but should not be mistaken for a complete requirements specification (which would contain performance details, error handling issues, and other details which would be premature at the time of this writing). Similarly, although many functions will be described in terms of what the user will do to perform an operation ("The user clicks on a point set and then clicks on the plane tool to generate a plane from the set of points."), this should not be mistaken for a specification of a fixed user-interface. Rather, this description is nothing more than a simple way of clearly describing an operation (the Point-Set-to-Plane operation in this case) which will be available through *some* user-interface mechanism. User studies, user-interface prototyping, and ultimately a user-interface specification will precede determining the best manner by which a piece of available functionality will be accessed by a user.

The document is divided into sections based upon the system framework of Figure 1. Each subsystem and toolkit is described by way of the functionality which it provides and the type of data it receives and generates. Indications are made throughout the document as to where expanded functionality will be added which exceeds the scope of the first generation system. These indications are intended to clarify the structure of the first generation system, provide an understanding of extensibility requirements which must be built into the first generation system, and indicate the vision of the complete system which will be developed over the next three years.

Scan Control

Interaction with the FDV is performed using the Scan Control functionality of the CGP. The FDV can capture both video and range data and present this data to the CGP. The CGP is responsible for providing the FDV with information about the location and resolution of the scan to be taken. The FDV uses a novel video based targetting method which permits the accurate targetting of small objects at large distances and the CGP provides access to this method. The Scan Control mechanisms strongly support the visual interactivity and point-and-click operation paradigms which underly the usage model of the full system.

Video Capture

Pressing the video capture tool button causes an RGB image of the scene from the FDV's standard video camera to be transferred into the CGP and displayed in the targetting window. A video image may be named, annotated, and stored in the database at the request of the user. A video image may be associated with a set of range scans (see Range-Video Association below).

Zoom Capture

The zoom capture tool is available to the user when a standard RGB image of a scene is present in the targetting window. Clicking on the zoom capture tool and then clicking at a point on the image in the targetting window causes the FDV to capture and display a bore sighted zoom image taken in the direction of the point indicated. The bore sighted video image may be named, annotated, stored in the database, and associated with a set of range scans in the same manner as can a standard video image. An Unzoom tool permits the user to return to the standard view.

Video Image Browser

A video image browser permits the user to search for an image in the database by flipping through thumbnails of video images. All of the range scans associated with a video image can be highlighted or selected, or the user can set the viewing point of a model viewer to be the position from which a video image was taken.

*The video image browser will ultimately become part of the full featured query interface for the smart modelling system. Queries such as "find all of the range scans associated with this image" or "find all of the video images taken on December 12, 1995" will be part of a general purpose visual database query unit. The special purpose queries listed above provide a starting point in this direction.*

Scanning

The scanning tool is available to the user whenever a video image (standard or zoom) is present in the targetting window. The user indicates a scan by dragging out an axis aligned box on the video image in the targetting window. The FDV will generate a range scan from the region of space indicated.

A range scan is an axis aligned, approximately rectangular grid of depth information. Slight errors in mirror positioning in the FDV prevent an exactly rectangular grid. A range scan has an X and a Y resolution indicating the number of points scanned in each of these directions. The X and Y resolution may be set by the user in terms of the number of points or the distance between points for some fixed distance.

Each grid point in the range scan is associated with a three-dimensional Cartesian point and an intensity value measuring the laser intensity response at that point. The combination of a three-dimensional Cartesian point and a laser intensity value defines a *scan point*. A *range scan*, by definition, is an array of scan points ordered by rows and columns. A range scan may also contain flagged invalid points where the scanner failed to acquire an actual scan point.

Range scans are automatically inserted into the working database. They may be named and annotated manually.

Range-Video Image Association

Typically, range scans are automatically associated with the video image used for targetting that scan. By default, when a range scan is taken, the associated video image (either standard or zoom) is stored to the database (if it has not been stored previously) and an association between the video image and the range scan is made. This association can be used to access a picture of a region scanned or to isolate the scans taken from a given location.

Real-time Scan Display

Scan points being acquired by the FDV may be viewed (see Model Display) in any active data world view while the scan is taking place. These points are not available for any operation other than display until the scan is complete.

—89—

Scan Cancellation

A scan cancellation tool is available while the FDV is generating a range scan. This feature terminates the collection of scan points. The incomplete range scan taken up to this point is inserted in the database.

Visual Magic

The Visual Magic (VM) toolkit provides rapid visualization tools for converting scan points into triangular mesh models of a scene with minimal user interaction. The focus of the operations in the VM toolkit is to provide extremely general functionality capable of modelling any object. Unlike with the Prefab Lab and the Structure Shop described below, the VM toolkit has no notion of primitives beyond that of the triangular mesh. This permits a wide variety of robust operations to be performed on a single, general purpose data types. As described in the section "...", *any* geometric surface in the CGP can be converted into a triangular mesh and operated upon using the Visual Magic tool set.

Range Scan to Gridded Mesh

The Range Scan to Gridded Mesh tool provides the simplest way to generate a model using the FDV. Upon acquiring a range scan, the user can select that scan and click Range Scan to Gridded Mesh to generate a triangular mesh from that scan. The generated mesh is triangulated based upon the rectangular gridding of the scan. The gridded mesh is differentiated from a non-gridded mesh which was not generated directly from a range scan. A gridded mesh maintains information about the location of the scanner and the row and column ordering of its points. Invalid points are not included in the mesh and triangles whose size exceeds a user specified parameter are also excluded. The range scan is replaced in the database with the mesh. Meshes can be viewed in a number of ways including wire-frame, Gourand shaded, and as a hidden line drawing (see Model Display).

Gridded Mesh Simplification

Gridded meshes may be simplified by removing triangles in regions which are essentially planar. The user can select a gridded mesh and click on this tool to remove as many triangles as approriate given a user specified parameter for the maximum error to be induced into the mesh. The original gridded mesh is replace with the simplified gridded mesh in the database.

Gridded Mesh Smoothing

An entire gridded mesh or regions within a gridded mesh may be smoothed by averaging the range depth of each point with its neighbors. The type of averaging (Gaussian, simple average, etc) and the size of the neighborhood to averaged over is specified by the user. Smoothing can be limited to a particular

−90− region by selecting a polygonal region of the mesh prior to selecting this tool. The original mesh is replaced with the smoothed mesh in the database. Multiple smoothing iterations can be performed on the mesh or region by repeated activation of this tool.

Mesh Alignment

Two meshes (gridded or non-gridded) which have been approximately aligned manually (see Freehand Rotate, Freehand Translate, and Move to Attach) can be aligned more precisely using the Mesh Alignment tool. The first mesh indicated is the anchor mesh and does not move. The second mesh is adjusted to achieve a greater alignment between the two meshes in the regions where the two meshes overlap. The original meshes are maintained in the database with the global transformation matrix of the second mesh altered. This step would typically precede a Mesh Zippering step but might also be used to register two scenes (determine their relative positions in world space) generated with the Structure Shop or Prefab Lab taken from different but overlapping viewpoints. In the latter case, non-mesh geometric primitives would be temporarily converted to meshes (see Object Polymorphism) to perform the alignment operation.

Mesh Zippering

Two meshes (gridded or non-gridded) may be merged into a single mesh using the Mesh Zippering tool. The resulting mesh is *always* non-gridded. Mesh zippering sews together regions of overlap between two meshes whenever the distance between the overlap is less than some user specified threshold. Typically this operation is preceded by a mesh alignment. The two original meshes are replaced by the joined, *non-gridded* mesh.

Cut Mesh with Mesh

A mesh may be cut with another mesh by using the Cut Mesh with Mesh tool Both meshes can be either gridded or non-gridded. The first mesh selected is the mesh to be cut. The second mesh is the cutting mesh and will not be changed by the operation. The lines of intersection of the two meshes is computed and the cut mesh is divided along the line of intersection. Additional points are inserted into the cut mesh as necessary to give a smooth intersection (no gaps) with the cutting mesh. The cut mesh is replaced in the database with some number of non-gridded meshes representing the various components into which the cut mesh was sliced. This operation would typically be followed by the deletion of some number of the cut components and would permit the clean intersection, for example, of a mesh representing a pipe at a skewed angle with a wall or other more complicated object. The combination of this operation with Object Polymorphism (see below) is extremely powerful.

Mesh/Mesh Mutual Cut

This operation is identical to the Cut Mesh with Mesh operation above except that both meshes cut each other and are replaced by their components as non-gridded meshes. Thus performing this operation on the mesh of a cylinder

-91- intersected perpendicular to its axis by a meshed plane (Figure 2) would result in four separate components.

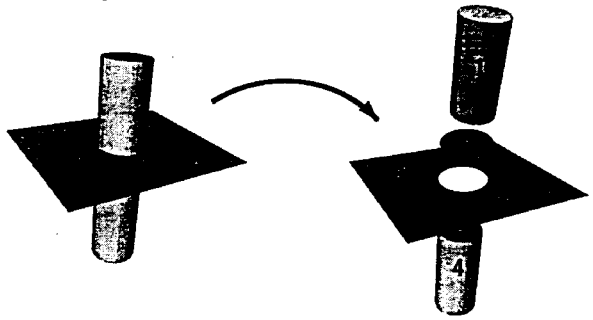

Fig. 2 – Mesh/Mesh Mutual Cut

Trim Mesh Overlap

When two meshes overlap, it may be desirable to leave one mesh intact while trimming the other mesh to join it seamlessly. The Trim Mesh Overlap tool performs this operation by cutting the trimmed mesh at regions where overlap begins (within some user specified distance), discarding the overlapping portions of the trimmed mesh, and adding vertices as necessary to form a seamless join to a static mesh. The two input meshes can be either gridded or non-gridded. The static mesh remains in the database unchanged. The trimmed mesh is divided into one or more component meshes which are always non-gridded. This tool combined with Object Polymorphism (described below) permits the replacement of parts of a mesh with prefabricated objects (from the Prefab Lab below) while maintaining visual connectivity of the various parts in a scene.

Non-Gridded Mesh Simplification/Optimization

*Mesh simplification of non-gridded meshes is a computationally expensive task being studied at a number of major research institutions. The CGP will, in future generations, provide some of the functionality derived from the research efforts in this field.*

Prefab Lab

The Prefab Lab (PL) toolkit provides for the integration of preconstructed submodels into a scanned scene. These submodels can be generated within the PL toolkit, imported from external catalogues or CAD programs, or constructed from parts generated using other toolkits.

Concepts: Grouped Objects and Prototypes

The Prefab Lab supports two notions which play a key role in the construction and use of intellignet models: the *grouped object* and the *prototype*. A *grouped object* is simply a collection of geometric primitives or other grouped objects which act as a single entity. This is conceptually equivalent to the grouping of objects in most drawing programs. Grouped objects exist in the same coordinate space and act as a rigid object. Operations performed on the group are performed on all objects within that group.

A *prototype* is a class of object which exists outside of a geometric scene for the primary purpose of instantiating that object within the scene. A prototype may be formed from either a single geometric primitive or a grouped object. A prototype is essentially a 'meta-object' which stores general information about all instantiations of that prototype. Instantiations of a prototype are called *parts*. An example will help to clarify.

A person generating a model of his kitchen constructs a three-dimensional mesh model of a chair. Using the Visual Magic toolkit he generates separate meshes for each of the legs of the chair and the seat. To avoid scanning each of the four legs, he generates a model of one leg and then uses copy and past tools to place the object in the scene four times. At this point, he decides to change the color of the legs of the chair to blue. If he changes the color of one leg, will all of the legs change color? This depends upon whether or not the legs are parts, that is, instantiations of a prototype (in which case, they share information such as color) or simply copies of an object (in which case, there is no stored relationship between the legs). A prototype stored in the database may not be instantiated anywhere within a scene. It has an existence beyond its appearance in an active database. An object, however, is entirely self-contained as an entity in a scene. Removing an object from a scene removes it from the database.

Group/Ungroup

The Group tool takes a set of one or more objects or parts and generates a new gropued object which is a hierarchical collection of these input objects. The grouped object may be generated from geometric primitives, parts, or other grouped objects. The entities from which a grouped object were formed are replaced in the database by the new grouped object. The Ungroup tool removes a grouped object from the database and replaces it with instantiations of its components

-93-

Cut/Copy/Paste

The Cut tool allows the user to delete one or more objects or parts from a scene for later Paste operations. The entity is removed from the active database and stored in the Copy/Cut buffer. The Copy tool is identical to the Cut tool except that the original object or part is not removed from the active database. The Copy/Cut buffer is a single level buffer which stores only the last entity cut or copied.

The Paste tool places the entity in the Copy/Cut buffer into the active database. If the entity in the Copy/Cut buffer is a part, a new part is created in the active database. If the entity in the Copy/Cut buffer is an object, a duplicate of this object is copied into the active database.

A single Copy/Cut buffer exists across all databases during a session so that entities can be cut and paste from one database to another. The Copy/Cut buffer is essentially a one object database which can be viewed, edited, and manipulated as desired (see Data Viewing).

Freehand Translate

Entities can be translated interactively using the Freehand Translate tool. A translation manipulator is generated around the selected entity permitting the entity to be translated interactively. The new position is reflected in the database.

Freehand Rotate

Entities can be rotated interactively using the Freehand Rotate tool. A rotation manipulator is generated around the selected entity permitting the entity to be rotated interactively. The new orientation is reflected in the database.

Move to Attach

One entity can be moved so as to orient properly with another entity using the Move to Attach tool. The user selects up to three points on the object to be moved and corresponding attachment points on a fixed object.. The interface forces the attachment points to be consistent (that is, there exists a way to position the movable object so that all attachments are made). Upon identifying these correspondences, the entity to be moved is repositioned and oriented so as to enforce the attachments and the updated location is reflected in the database. Note that attachments are temporary and cease to exist upon the completion of the operation. To join the objects once they have been attached, the user should use the Group tool.

Paste Attach

The Paste Attach tool is identical to the Attach tool above but it permits the user to attach an object from the Cut/Copy buffer into the active data world.

-94-

Freehand Scale

Entities can be scaled interactively using the Freehand Scale tool. A scalingmanipulator is generated around the selected entity permitting the entity to be scaled interactively. The new scale is reflected in the database. Scaling can be performed in the X,Y, and Z directions of the local coordinate system of the entity. For objects, scaling constraints (uniform scale, uniform scale in X and Y, etc) can be specified via a preferences window. For a part instantiation, scaling preferences are mandated by the part.

Scale to Attach

Scale attachment is analogous to Move to Attach except the object is scaled under its constraints to make the required attachments. The new scaling of the object is reflected in the database.

Object To Prototype

The Prototype tool generates a prototype from an object or primitive and stores that prototype in the database. The original object or primitive is removed from the database and replaced with an instantiation of the newly generated prototype The prototype will persist in the database even if all parts associated with it are deleted from the active database unless an explicit Part Deletion is requested. A name and annotation may be attached to a prototype.

Prototype Browser/Part Instantiation

The Prototype Browser provides the ability to search through all of the prototypes in the database. Prototypes are displayed within the browser and can be dragged from the browser into an active data world. The Move to Attach and Scale to Attach can also be used to generate a part from a prototype attached to objects in an active data world. New parts generated from the prototype browser are stored in the active database with the associated placement information.

Part to Object

The Part to Object tool converts a part into an object, copying all of the information from the prototype into an object unassociated with that prototype. This permits the user to take a part which almost meets his needs and edit that part without affecting other objects generated from the same prototype.

Polymorphism

Polymorphism is the ability of the system to automatically convert objects of one type into objects of another type so as to permit a tool which requires arguments of a certain type to operate properly. If the object being converted to a different type is not changed by the operation, then the polymorphism is temporary and transparent to the user. If the object being converted is changed by the operation,

–95– then the user is informed that the polymorphism will be permanent and given an opportunity to cancel the operation.

The primary form of polymorphism is the required ability to convert every object or part in the system into a triangular mesh. Grouped objects can be converted into a triangular mesh by taking the union of the triangular meshes formed by converting their components into triangular meshes. Thus, the requirement of the system that it be possible to morph every object into a triangular mesh is essentially a requirement that every piece of primitive geometry in the system provide functionality for conversion to a triangular mesh.

Grouped objects which are permanently morphed into triangular meshes maintain their hierarchical structure but as a collection of meshes instead of objects. Annotations, names, and other external database information is maintained within the hierarchy.

Prefab Primitives

The system provides a set of geometric primitives which can be instantiated, moved, scaled, displayed, and converted to meshes. These primitives are basic geometric shapes from which other geometry can be assembled such as the cube, cylinder, cone, prism, disc, and the like. Because no primitive specific operations are provided, adding a primitive to the system requires nothing more than providing a basic parameterization of the primitive which captures its geometry, a display generator, a conversion to a mesh, and an encapsulated database representation. The display generation and mesh conversion routines take a single floating point value between zero and one as a complexity argument to assist in the determination of the detail to provide (for example, the number of planar faces to use to approximate a cylinder). This argument may be set at any time by the user of the system.

Prefab Primitives are inherently simple and are not used to represent objects such as I-beams which can be constructed as groups of other prefab primitives such as stretched cubes.

Parameterized Prototypes

*It is a long-term goal to provide general parameterized parts whose parameters can be set by the user. The concept behind scaling constraints is a simple version of the idea of generally parameterizable prototypes. A parameterized prototype would allow the user to set, for example, the width of a groove, the spacing of a set of holes, or the number of legs on a stool. This would permit a smaller catalogue of prototypes to service a larger need but requires significantly more complex functionality for prototype description.*

Structure Shop

The Structure Shop provides additional functionality for the generation of large, primarily planar structures such as buildings as well as support structures and basic functionality for point and line surveying. The Structure Shop adds the point, line, and plane objects to the palette available to the user and provides simple interactive functionality for manipulating these objects.

Extract Scan Points

The user can cut out points from a range scan using the Extract Scan Points tool. The user selects a range scan and then either traces out a loop around the points he wishes to extract or draw a polygon around these points. The range scan selected is replaced with two range scans containing separately the points inside and the points outside of the drawn region. Range scan names are augmented with a unique identifier (ie RS35 divides into RS35_1 and RS35_2) and annotations are copied into each new component scan.

Plane From Points

The plane object a set of bounded polygons lying in a plane. The multi-contoured boundary consists of edges and vertices which can be shared between juxtaposed planes as necessary. The Plane from Points tool calculates the best-fit plane given a set of points. The set of points can originate either from a range scan or from a mesh (and by polymorphism this implies that they can originate from any geometric object or part). The boundary of the plane is generated by projecting the points into the best fit plane and computing the convex hull. Depending upon a preference set by the user, the original object from which the points were dervied is deleted from the database or remains intact. The new plane object is inserted into the database.

Corner from Points

The Corner from Points tool generates three plane objects from a set of points. The set of points can originate either from a range scan or from a mesh. The three planes share a corner vertex and three edges extending from that vertex. With the exception of the shared vertex and a pair of shared edges, each plane object is bounded by the convex hull of its points when projected into its plane. Depending upon a preference set by the user, the original object from which the points were derived is deleted from the database or remains intact. The three new plane objects are inserted into the database.

Add Hole/Add Region

Holes and additional contours can be added to plane objects using this tool. In each case, the user draws a contour onto the infinite plane of which the plane object is a part. In the case of the hole, the resulting contour is subtracted from the given plane object causing the addition and deletion of vertices as necessary. In the Add Region case, the new contour region is unioned with the existing polygons and vertices are added and removed as necessary.

Interactive Vertex Move

The user can drag vertices of a polygon with the mouse. These vertices are constrained to lie in the plane specified by their plane object. The user can also identify one or two snapping planes to allow precise placement of vertices. The addition of one snapping plane creates snapping regions around all of the vertices of that plane as well as a weaker (smaller) snapping region everywhere in that plane. The user can easily drag a vertex so that it aligns with another plane or attaches to a vertex in another plane. If two snapping planes are indicated, then all of the snap regions described above are created for each of the two indicated planes; however, in addition, an extremely large snap region is created around the intersection point of the three planes (the two indicated planes plus the plane which contains the dragged vertex). If a vertex is snapped to another vertex by the user, then that vertex becomes a shared vertex.

Vertices which are shared by two planes can be dragged only in the line which is the intersection of their two planes. Vertices which are shared by more than two planes cannot be dragged.

Vertices also interact with the other countours within the same plane. Snapping occurs with all edges and vertices of these other contours. When a contour which bounds a filled region is moved it may intersect with other contours representing regions or holes. The result of moving a vertex of such a contour is the union of all filled regions within that polygon. Similarly, when moving a vertex of a contour which bounds a hole, the filled region of this contour is subtracted from all other filled polygons in that plane.

The new position of the vertex is reflected in the database and edges which use this vertex as an endpoint are also updated.

Unshare Vertex

Clicking on the Unshare Vertex tool and selecting a shared vertex will cause sharing of this vertex to be replaced with use of independent copies of this vertex which may be moved independently and, in turn, separated from each other. The original shared vertex is deleted from the database and replaced with the copies.

Vertex Insertion/Deletion

Vertices may be inserted or deleted with this tool. Vertices are inserted by clicking on the location of the insertion point. Vertices are deleted by indicating the vertex. Vertices which are shared are deleted from all of the plane objects in which they participate. All such changes are reflected in the

–98– database.

Merge Planes

The user can merge two plane objects with the Merge Planes tool. This operation checks that the two objects are near coplanar and warns the user before continuing if they are not. Merging planes causes the two indicated plane objects to be replaced in the database by a single plane object which is a best fit plane to all of the points from which the two original objects were generated. Vertices from the original plane objects are projected into the new plane while maintaining the constraints imposed by vertex sharing. The boundary of the new object is the union of the boundaries of all of the merged plane objects.

Point to Free Point

The Point to Free Point tool generates a free standing point from either a scan point, a mesh point, or a vertex. The free point is a specially marked vertex which exists outside of any surface. Free points are a non-surface data object and thus cannot be converted into a mesh. Free standing points are primarily intended to permit basic surveying (property lines, etc) using the FDV. Free points can be named and annotated and arestored in the database.

Make Free Line

The Make Free Line tool generates a free standing line from two free standing points. The free line exists outside of any surface and therefore cannot be converted into a mesh. Free standing lines are primarily intended to permit basic surveying (property lines, etc) using the FDV. Free lines can be named and annotated and are stored in the database.

Inquiry and Presentation

The Inquiry and Presentation toolkit provides functionality for querying and displaying the data as well as for modifying non-geometric data stored within the database. This toolkit, while providing tight integration with the various other toolkits in the system, will be separable into an independent system for distribution to users who are not expected to use either the FDV unit or the model reconstruction tools but who wish to access the information generated by the various Cyra tools.

View Data World

The geometric contents of a data world may be viewed using an interactive, visual browser which displays a three-dimensional representation of that data world. Every geometric object or part belongs to one data world which is a subset of a database. Any number of data world views may be opened and used independently. Operations which do not involve a particular viewpoint (unlike, for example, the Extract Scan Points tool) may be performed using multiple views of the same data world by indicating some operands in one view and other operands in any number of other views.

Interactive View Manipulation

A data world view may be zoomed in and out, rotated, and panned by the user. These operations will be interactive provided that the size and complexity of the model and the required frame rate do not exceed the ability of the platform to generate frames at interactive speeds.

Interactive Fly Through

The user can navigate through a model using a fly through paradigm in which the user controls the movement (speed, direction, and orientation) of an imaginary eye which views the scene. This fly through will be interactive provided that the size and complexity of the model and the required frame rate do not exceed the ability of the platform to generate frames at interactive speeds.

*Significant research has been done on optimizing this process to permit high frame rates on extremely complex models. It is our desire to incoporate such research in later generations of the CGP.*

Save/Load Named View

The user may save a current viewpoint in a data world with a name and annotation. A named view may be loaded into any data world viewing window thereby replacing that window's viewpoint with the saved viewpoint.

Delete Named View

A named view may be deleted from the database at the request of the user.

-100-

Standard Views

The six standard views (left, right, front, back, top, and bottom) relative to a user-specified origin and at a user-specified distance are immediately available in any data world view.

Orthographic/Perspective Toggle

A data world may be viewed using either an orthographic or perspective projection. Operations from all of the various toolkits will function correctly regardless of which projection is being used.

Integrate Data Worlds

The user can merge one data world into a second data world by specifying pairs of corresponding points in the two data worlds. The user must provide at least three non-degenerate pairs of points. A transformation which repositions the second data world so that the correspondences will be met as closely as possible (in a least squares sense) is calculated from the point pairs. The second data world is removed from the database and all data within that data world is copied into the first data world with the calculated transformation.

Distance

The distance between two user-specified locations in the model can be calculated and displayed using the Distance tool.

*(The remainder of this section is vague and incomplete. I need to finish working this out but it should end up being a very general way of buying much ground toward "intelligent" modelling)*

Viewing Parameters

Every object, part, or primitive can provide any number of named visual representations. The user can specify which of these named visual representations is to be used for a given object, part, or primitive or for an entire scene by setting an object's "representation attribute". Every object is provided with a default representation which is used if the named visual representation does not exist for that object or if no named visual representation is provided. A named visual representation is either a system provided drawing style such as wireframe or bounding box or else a pointer to another model such as a lower resolution version of the model or a symbolic representation of that object (two cones representing a complex valve).

Typically, a primitive provides at least the following representation attribute values of which "surface" is normally marked as the default: wireframe, hidden line, surface, bounding box, and invisible.

-101-

Surface property parameters such as color and reflectivity are also provided through the visual representation by providing attribute/value pairs as part of an object's visual representation. An entity in a hierarchy uses its closest ancestors' value for an attribute if no value is specified for that attribute in the entity. Every attribute required for the drawing of an object (such as color or line width) must be provided with a corresponding default in case no value is specified by the entity or its ancestors. The attributes which will be supported by all primitivies in the first release of the CGP are ambient color, diffuse color, specular color, emissive color, shininess, transparency, show name, and show annotations. In addition, certain primitives will support the "show dimension" attribute. Range scans will support the "use intensity pseudocoloring attribute".

Create/Load/Save/Delete Named Visual Representation

A user can create a named visual representation to permit him to view a database using a different parameter set than others using the database. This visual representation is given a name and is stored in the database. When a user creates a new visual representation, all of the current attribute/value pairs for each object in the data world is associated with the named visual representation. Changes effected by the user to the data world (such as changing representation attribute of an object to wireframe or its color to blue) when using this named visual representation affect only the attribute/value pairs of the currently loaded visual representation. Thus, a piping engineer might generate a visual representation of a data world in which all pipes are displayed as cylinders during one session and a second visual representations in which pipes are displayed as center lines to be used during another session. This, of course, presumes that the pipe object provides a named representation attribute for center lines.

Note that this paradigm permits many simultaneous views on the same database by different users without requiring separate copies of the database for each viewer.

Create/Delete/View/Edit Annotation

An annotation is a typed data field associated with an object, primitive, part, or prototype. Annotations permit the inclusion of application specific data in the CGP database. This data can be in any of the ISO standard data types (don't recall what these are but there are only half a dozen of them and they are supported by every database). Each annotation is referenced by name. Annotations associated with a prototype apply to every part generated with that prototype unless the value of the annotation is explicitly over-ridden by the part.

Every entity has, at a minimum, a name and type annotation.

Select by Query

The user can select a set of entities using an SQL query on the annotations of all entities in a data world. Such queries are handed directly to the database and the degree of SQL support provided will be based on the database selected. The

-102- entities which are returned by the queries are marked as selected and may be used as arguments to all tools which permit operations on multiple objects. Data stored by the CGP within the database is also accessible to the user via a read-only front end to CGP's database structures.

—103—

Data Exchange

The Data Exchange toolkit provides the functionality necessary to seamlessly integrate the CGP with other CAD packages and vendor provided catalogues. The toolkit will ultimately import and export a wide variety of file types dependent upon market need.

Import/Export CRX

The export function generates a single binary data file representing selected objects, a data world, or a database in CRX, Cyra's proprietary data format. The import function permits the reading of this data format.

Import/Export DXF

The export function generates a DXF data file representing selected objects, a data world, or a database in this general purpose CAD standard format. The DXF representation is limited in the following ways:

...

Import DXF file loads an entity or set of entities stored in a DXF file into the CGP. The CGP version of this DXF file will be limited in the following ways:

...

Import/Export RGB

The export RGB function generates an RGB video image file from a selected video image. Import RGB generates a video image object in the CGP from an RGB video image file.

Import/Export Inventor

The export Inventor function generates an Inventor file representing selected objects, a data world, or a database in the Inventor file format. The resulting model when viewed using a standard Inventor viewer will be identical to the model as viewed in the CGP. The import function loads an entity or set of entities stored in an Inventor file into the CGP. The CGP version of this Inventor file will be limited in the following ways.

Export PostScript

The export PostScript function generates a PostScript file or prints directly to a printer the view represented in a selected data world.

General Interaction and System Information

Interaction with the toolkits will be through a mouse and keyboard with emphasis on visual interactivity. The user interface is expected to have iconic tool palettes, function key shortcuts, menus, and windows. Most of the functionality will be accessible using only the mouse. The user interface of the system will be consistent with standard interfaces and interaction paradigms on a given platform.

Platform

The CGP will run on a 100 MHz Pentium Processor running Windows NT in a laptop box. The system will provide a minimum of 48 Mbytes of RAM with a 512 kbyte cache The platform is expected to have an 800x600, 256 color display and at least one Gbyte of disk space. The system will communicate with the hardware via an ethernet over PCMCIA.

*The first port of the CGP is expected to be to a Silicon Graphics platform to provide in-the-office model reconstruction in a graphics intensive environment.*

Help System

The CGP will provide an interactive help system which provides context sensitive help in a format corresponding to the standard interface for applications on a given platform. All functionality accessible to the user will be documented in the help system.

Undo

The CGP will allow the user to Undo any number of operations (to the functional limits of the system such as memory and disk space) performed during a session.

Documentation

Hard copy documentation will be provided for the system including, at a minimum, a field guide which can be used by a surveyor on-site.

Cyra Technologies, Inc.

- 1st Line of Products: Integrated 3D Mapping & Imaging
  - Portable & Field Operated
  - High Accuracy & Resolution (1mm & 6mm Models)
  - Large Object Capability (50m Range at Above Accuracy & Resolution)
  - Priced for Mass Production

- Major Markets
  - AEC Industry
  - Manufacturing & Mechanical Design
  - Entertainment & Virtual Reality

CONFIDENTIAL

CYRA

−106−

Cyra Technologies, Inc.

- New Generation of Products Under Consideration
  - Field Positioning System
  - Airborne Mapping & Surveying
  - Motion Capture
  - Underwater Mapping & Imaging
  - Personal 3D Camera
  - Laser & Detector Arrays

CONFIDENTIAL

CYRA

−107−

Cyrax Performance Specifications

- 1mm & 6mm at 50 meters
- Non Cooperative Targets (down to 5% Reflectivity)
- 1000 to 5000 Points per Second
- Portable & Field Operated
- Base System Under $30,000 on Stabilized Basis
- Eye Safe (Class II A)
- MTBF 10,000 Hours

CYRA

−108−

Cyrax Software: Production Software

- Designed to Significantly Reduce Model Delivery Time/Effort
- "Real Time Modeling": Allows Modeling in the Field
- Object Oriented Architecture Allowing Intelligent Models
- Designed to work with "Catalog" Objects/Components
- Communicates Seamlessly with Major Design Packages
- Multi Platform: Unix/Windows NT
- Allows Remote Scanning

CYRA

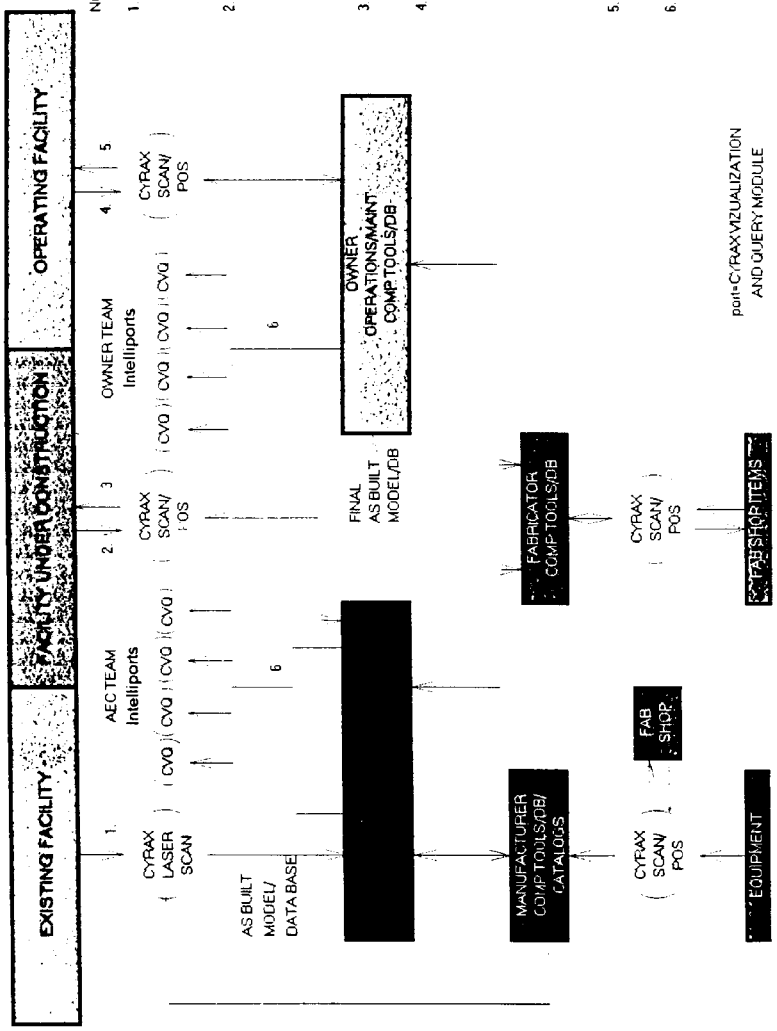

–110–
Cyrax
Intelligent Modeling System
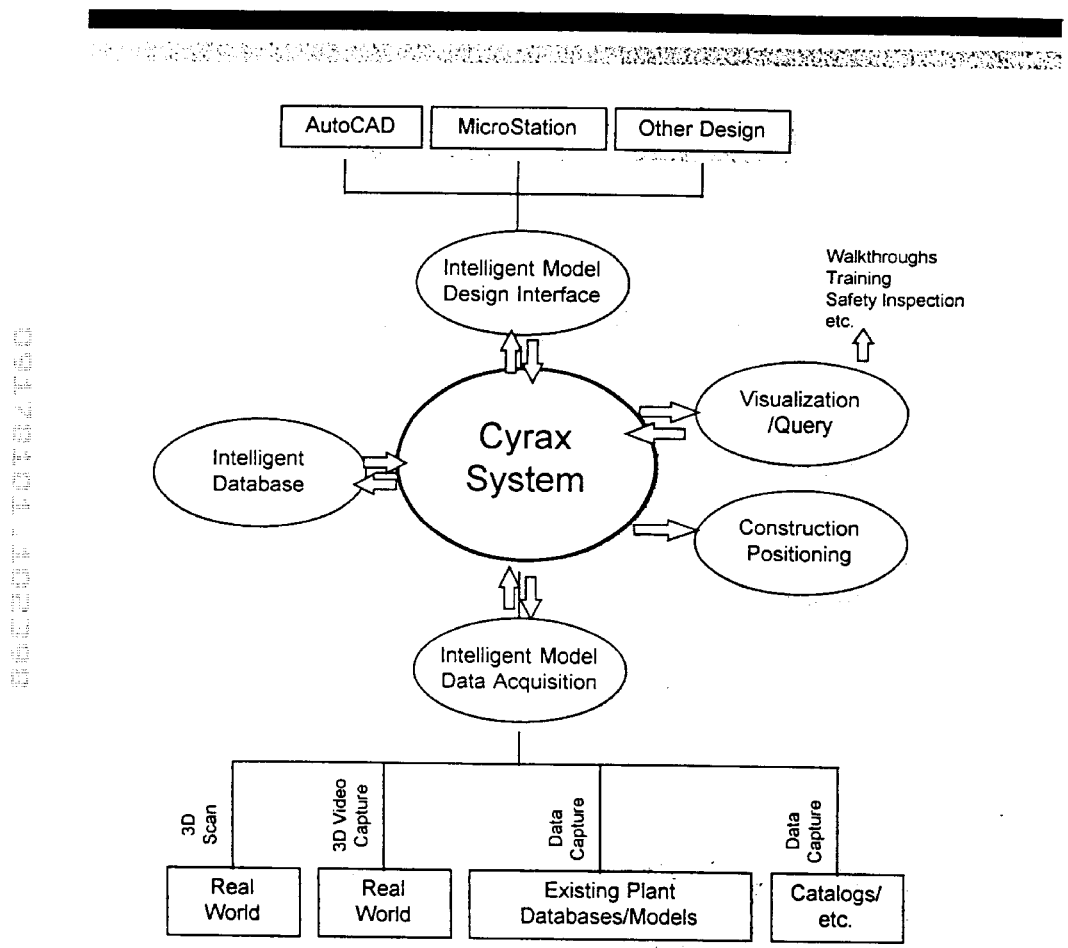

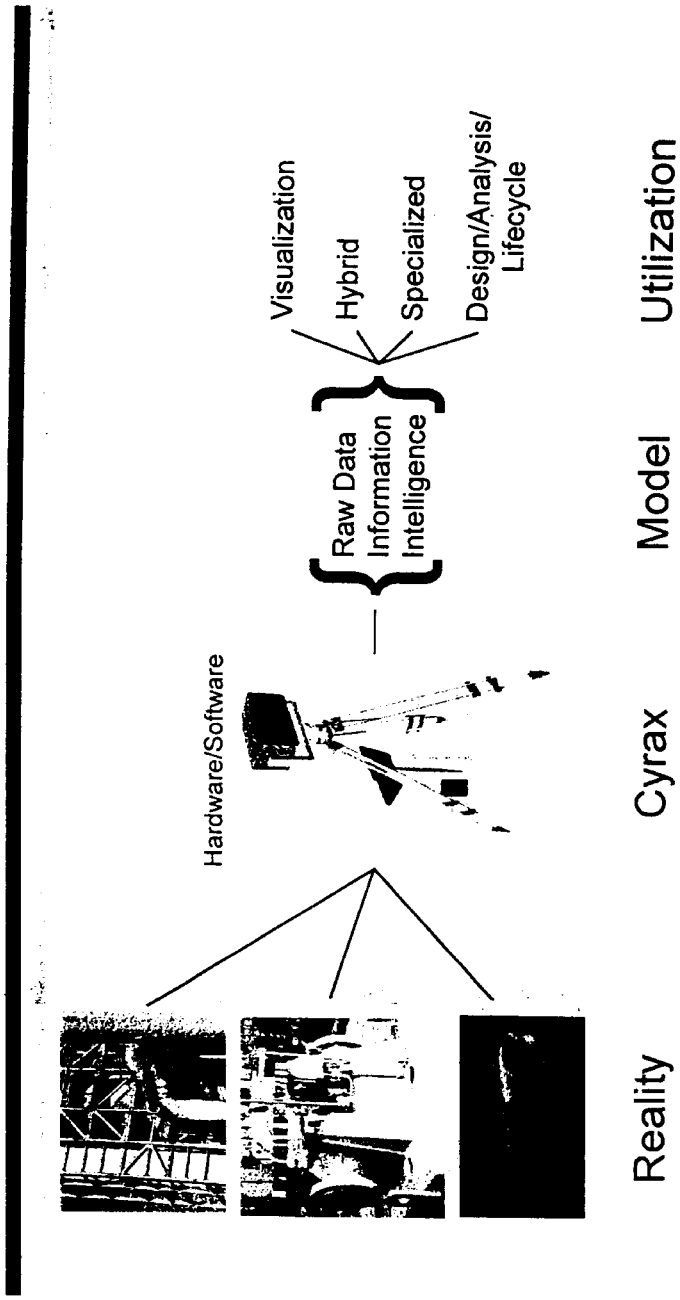

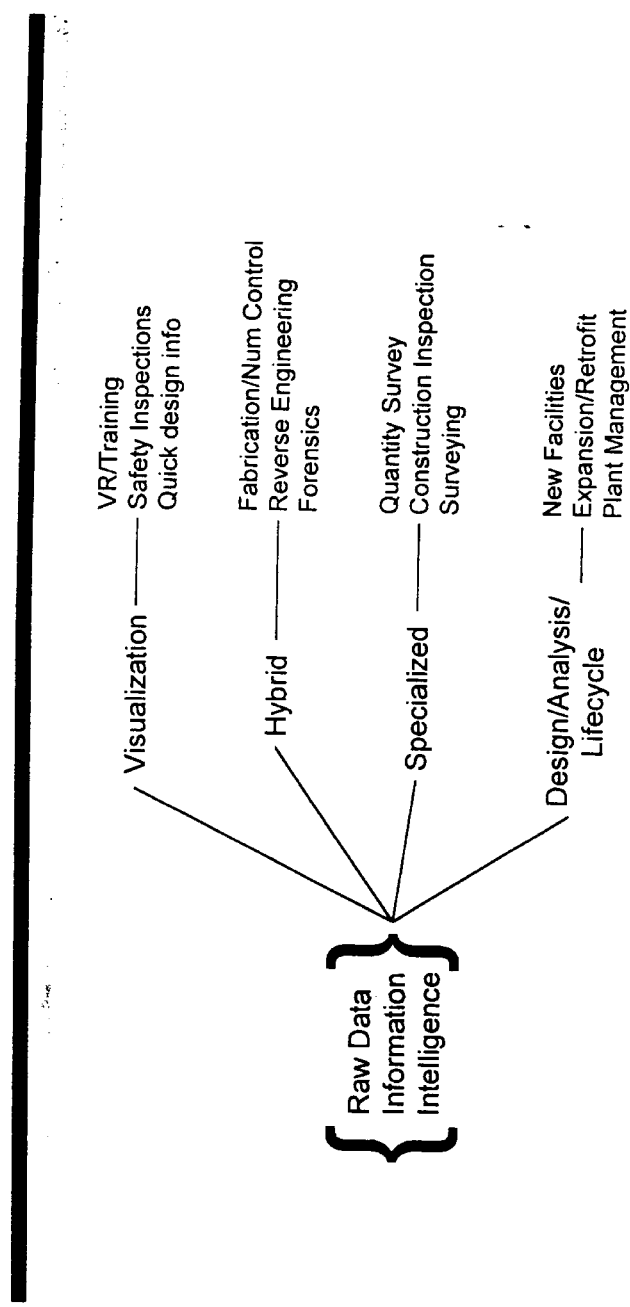

INTRODUCTION

Overview

CYRA

This *CONFIDENTIAL* overview of Cyra Technologies (Cyra) and its unique, laser-based data acquisition, recognition, and model construction technology has been prepared to aid potential strategic partners, investors, and collaborators in better understanding and evaluating Cyra's potential.

Cyra Technologies was established as a California Corporation in 1993 to research, develop, and market innovative high-technology computer-based products for the AEC and manufacturing industries.

Cyra is currently developing a line of laser-based spatial imaging and synthetic vision systems for three-dimensional data acquisition, recognition, and model construction in a broad spectrum of markets. The initial product, *"Cyrax"*, is a portable laser-radar scanner plus graphic computer capable of semi-automatically creating three-dimensional (3D) computer models of anything in its field of view. A hybrid camera/surveying instrument, it can generate 3D computer-aided design (CAD) models of everything from hillsides to buildings to aircraft. With *millimeter accuracy* at a range of *over 50 meters*, *Cyrax* is targeted at the Architecture/Engineering/Construction (AEC) industry, as well as the mass market 3D spatial data demands in the manufacturing, industrial, entertainment, and multimedia areas.

The Need for Spatial Information

Data Acquisition

Accurate information about our surroundings is crucial to modern life. From the video game designer modeling a dinosaur character, to geologists mapping a strip mine, construction firms readying "as-built" plans of a skyscraper, or the aircraft designer who requires precise three-dimensional measurements of complex airframe parts, modern society has a constant need for accurate data on our spatial surroundings.

The more than $1 trillion expended every year by the worldwide construction, utility, transportation, and manufacturing industries relies in large part upon fast and accurate spatial data — with these industries spending at minimum *one tenth of one percent* of their revenue on data

CYRA TECHNOLOGIES     −114−     CONFIDENTIAL acquisition, the need exceeds *$1 billion (US) annually*! Domestic sales of surveying total stations alone today exceed $200 million annually.

Data-Based Positioning     In addition to our need to know the locations of objects in our surroundings, there is enormous demand for the accurate 'positioning' or placement of objects. When a fence is erected, a building foundation poured, a freeway built, or a complex machine assembled, the building fabricator needs to be able to precisely position the parts. With "Quality is Job 1" a national slogan and with extreme pressure on corporate margins, manual methods are no longer acceptable.

Although currently largely unaddressed by vendors, the market for data-based positioning is rapidly growing. As our society moves to ever more flexible manufacturing and customization of consumable goods, the demand for data-based positioning systems will explode.

Traditional Methods

Acquisition—Points & Lines     Traditionally, society has relied upon cumbersome manual techniques for data acquisition. In the AEC arena, surveyors with optical transits, levels, steel tape, and plumb lines spend long hours in the field collecting data, while in manufacturing, machinists and designers with calipers and precision machine tools are the primary gatherers of information.

These tools and methods have been refined to a high level of precision, and in recent years even partially automated. However, they rely upon the slow, laborious, and error-prone gathering of two-dimensional data. From the points and lines measured in the field or at the workbench, data is taken back to the drafting table or CAD system and tediously added together to build a topographic map, site drawing, or a three-dimensional model of a part. In addition to the time involved, the current process suffers from human error.

Positioning     Accurate positioning has always been a challenge. Most civil and construction works are 'staked out' point-by-point by survey teams using total stations (the modern surveyors tool — an integrated telescope/angle/distance meter) and other surveying equipment. Although there have been some advances (new total stations can help guide one to the exact point with visible light beams for example), the process is still slow, laborious, and prone to operator error.

In manufacturing similarly, with products becoming increasingly complex and manufacturing requirements ever more exact, accurate part positioning is a constant, and DRAFT (Rev 1.2, 5 July 1995)

growing challenge. Numerous vendors are attempting to develop machine vision devices, but most such systems have fundamental limitations and are designed for single applications. On assembly lines, robots can often be programmed to position objects—as long as they are within reach! However, with big assemblies such as airframes and ship hulls, fabricators have had to resort to less than optimal solutions such as cumbersome mechanical 3D arms (typically used for scanning) or surveying equipment to pre-mark drill holes or alignment guides before manually fitting and assembly.

'Spatial' Opportunities

Automated Acquisition

The explosion of computer-aided design (CAD) in the last decade, as witnessed in the phenomenal market success of Autodesk Corporation and others, has accentuated the need for fast, accurate, 3D data in machine-ready form. With almost every engineer and designer having moved from the points and lines of the T-square and pencil to the glowing phosphors illuminating surfaces on the computer screen, the need for spatial data has skyrocketed. The current process of manually surveying or measuring hundreds of points, to be later assembled via software into lines and eventually 3D representations for use by engineers and designers in CAD programs, is inefficient and financially burdening.

Cyrax data viewed in 3D in AutoCAD

A system to gather entire 3D objects in the field as complete surfaces would eliminate several steps in the current data acquisition process in addition to improving accuracy and providing data that is currently uncollected due to cost or technical limitations.

In addition to mainstream acquisition opportunities, there are numerous growth possibilities in acquisition as well. Among the many mentioned in market study interviews, some of the more interesting include remote 3D reconnaissance/vision, machine vision/recognition, aerial-based acquisition (as a replacement for aerial photogrammetry), and underwater vision.

Automated Positioning

In the future, as full three-dimensional design along the lines of that being introduced at firms such as Boeing becomes more pervasive, the ability to precisely position objects from buildings to automotive parts, directly from the designer's computer screen, will become the norm. Cyra is working on a relatively simple and low cost extension to its acquisition technology to address the spatial positioning problem.

II. TECHNOLOGY

A. Introduction

Challenged by the need for accurate spatial information in the AEC industry and the absence of tools to provide it, Cyra Technologies is developing a portable, three-dimensional data acquisition tool, *Cyrax*. Similar in many respects to a camera, the instrument under development adds the capability to capture the three-dimensional coordinates to the world of "points" making up the field of view in front of it. *Cyrax* combines the camera's speed and high volume acquisition with the capture of 3D spatially-accurate data. The *Cyrax* design specifications call for a precision, high speed digital instrument capable of in-field measurements in the millimeters (one model accurate to 1 millimeter and another accurate to 6 millimeters) at distances of up to 50 meters. *Cyrax's* software, which runs on a small portable computer, couples with the hardware to provide sophisticated point processing and a friendly interface to the hardware.

Starting with the design requirements for a useful device for the AEC professional, an assessment of potential technologies was made. Although the preliminary specifications for *Cyrax* were beyond the scope of any existing data acquisition methods, Cyra pushed ahead focusing on laser technology, and laser radar in particular. An extensive search of university and government laboratories, as well as intensive research by the Cyra team, led to the creation and assembly of the core technologic components necessary to meet the design specifications.

Using laser radar and extremely high-speed pico-second electronics, *Cyrax* was designed to capture thousands of three-dimensional coordinates per second in broad daylight.

The *Cyrax* software is as sophisticated as the hardware. The innovative, user-friendly code allows the operator to direct the scanning process and to generate meaningful data from the resulting point cloud. The software team is currently pushing the limits of automated object recognition and generation, having developed semi-automated 3D object segmentation routines as well as fast and easy surface and object creation tools.

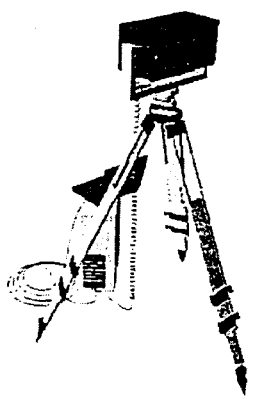

*Cyrax Artists Conception*

CYRAX

B. Laser Radar

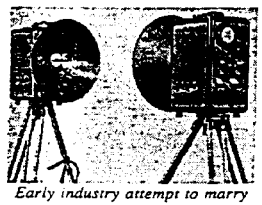

*Early industry attempt to marry advanced technology to a surveyor's total station*

Despite its discovery more than 30 years ago, 'lidar' or laser radar has seen limited application outside the defense industry. The dynamics have recently changed with the development of simpler, lower cost microchip lasers and with the push to open government defense research to industry. In 1986, with the first annual Laser Radar Conference, lidar technology truly came into its own.

Lidar, like traditional radar, is based upon the precise measurement of the time of return of a light pulse or the precise measurement of phase shifts of light pulses. The use of the tightly constrained and 'aimable' beam of coherent light waves from a laser offers distinct advantages in accurate targeting. Until recently, however, laser radar was technologically constrained. First, few lasers safely offered sharp enough energy pulses for their emission to be measured without placing a reflector on the target. Second, high speed precision electronics such as time of flight measurements of focused, high power laser emissions were limited in accuracy due to the lack of electronics with the pico-second response times necessitated by a 'speed of light' measurement system. As a result, systems such as laser ranging total stations have had to take hundreds or even thousands of measurements to average out errors of the timing electronics.

The recent development at a leading national laboratory of a microchip laser capable of extremely sharp, high energy pulses has opened the door to new possibilities for laser radar systems. Moving quickly, Cyra Technologies obtained the exclusive worldwide rights to this patented laser in Cyra's markets.

*Pulsed microchip laser prototype mounted to a large optical telescope for testing.*

C. The Cyrax System

Cyrax is composed of 3 primary components:
- the electronic laser scanner, or
  *"Field Digital Vision"* machine
- the FDV control, targeting and image 'assembly' software, or
  *"Computer Graphic Perception"* module
- the communications software to existing 3rd party CAD

Development Strategy

Cyrax is being developed by a team of international experts under the direction of Dr. Jerry Dimsdale, Cyra's Vice President of Technology. The MIT Lincoln Laboratory, under funding by Cyra, developed the lidar transceiver (transmitter and receiver) part of the FDV. The balance of the FDV, including the scanning system and electronics, were developed by Cyra and several consultants and vendors. The Computer Graphic Software development is being done at Cyra with the aid of researchers from the University of California at Berkeley. All of the development is proceeding in close collaboration with Cyra's marketing team and with key industry players who have been confidentially briefed and brought in during the development cycle to provide input and help guide the evolution of the technology.

FDV

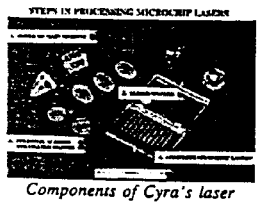
*Components of Cyra's laser*

*Microchip Laser in housing*

*Prototype FDV transceiver*

The portable Field Digital Vision system has 3 main elements:

Lidar Transceiver
- laser
- detector
- optics
- timing electronics

Electromechanical Scanner
- drive motors
- aiming mirrors
- encoders
- control electronics

Internal Computer & Electronics
- an embedded digital signal processor
- ancillary electronics & power management
- battery power supply

CYRA TECHNOLOGIES    −119−    CONFIDENTIAL

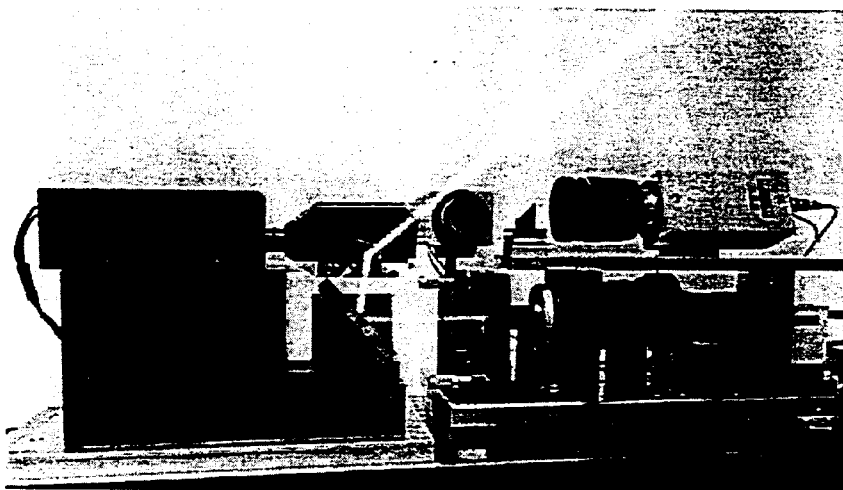

*Functional laboratory bench top prototype of full FDV system.*

*CGP*

The CGP is the 'brains' of the system. A complex array of state-of-the-art graphic software, it pushes as many technologic limits as the laser scanner itself. Providing an intuitive graphic interface, it allows the user to target the areas and levels of detail to be scanned on a "video" view of the world in front of it. As the FDV scans the selected portions of a scene, the CGP displays the points in a second depth-shaded three-dimensional view.

It is in this second window of points that the power of the CGP becomes clear. Algorithms for building up objects enable the user, with a few mouse clicks, to turn the 'cloud of points' into CAD-readable planes, cylinders, and surfaces. Understanding the need for accuracy, the software retains all scanned data points throughout the process (thus allowing its optimal fit algorithms to utilize any additional data that may be added later). Unlike traditional surveying and scanning equipment, all of this data assembly can be done extremely rapidly and in the field. This offers clear advantages—data can be easily spot checked on site to eliminate obvious (but all too frequent in traditional practice!) mistakes. As the model is assembled, areas where more detail is needed become apparent and more data can be easily added.

For situations when an entire object cannot be captured from one location, Cyra has designed software to "zip" sets of scans together into one larger piece.

The CGP is based on open architecture and is written for portability and ease of modification in the future. The DRAFT (Rev 1.2, 5 July 1995)

development has taken place on Silicon Graphics workstations using the object-oriented ANSI C++ language, coupled with the industry-standard OpenGL and other industry standard graphic environments. Since *Cyrax* is a portable, field-operable system, Cyra has also adapted the CGP to run on generic lightweight Intel-based laptops. Cyra has successfully demonstrated the CGP running on an Intel 486 laptop under Microsoft WindowsNT.

Current plans call for several computer hardware options to be offered with the system (see Appendix L for a preliminary pricing plan). These range from a hybrid pen-based IBM Pentium ThinkPad to a more traditional Pentium or PowerPC laptop with expansion slots for one of the many graphic accelerator boards (such as the OKI America Triangl OpenGL accelerator for WindowsNT). For users who demand the ultimate and have access to a fixed power source, an SGI workstation can be offered.

CAD Link

Rather than reinvent the wheel, *Cyrax* will tie into existing CAD software for its traditional modeling, editing, and other data manipulation needs. By allowing the purchaser to continue with their own CAD system (most *Cyrax* users will already have some form of CAD package), the software and support costs are kept down and compatibility is assured. Through support for the industry-standard 3D DXF file format, the CGP can be linked to almost all existing CAD programs. Support for other 3D data formats is additionally being considered for specialized sectors (such as the automotive market) where offering enhanced features might prove beneficial. For those that may want tighter integration with a specific package, the open architecture of the CGP allows relatively easily coupling with programmable CAD systems—a demonstration of the CGP running within the Intergraph's RoadWorks software was conducted during the summer of 1994.

*Cyrax control from within Microstation*

DRAFT (Rev 1.2, 5 July 1995)

CYRA TECHNOLOGIES    −121−    CONFIDENTIAL

D. Overview of Competitors' Technologies

Despite the differences between the 3 target market segments, the underlying technologies are broadly shared. There are two basic categories of 3D acquisition technology—*contact* (such as probe or tape, etc.) and *non-contact* (such as a laser and photogrammetry). Contact systems involve bringing a movable measuring device (typically a needle-pointed wand or a mirrored reflector on a stake) to the point to be dimensioned. Non-contact systems, on the other hand, remotely measure (often with light reflection) the spatial locations of points on an object physically separated from them.

| Technology Example | Markets AEC | Mfg | 3D | + Key Advantages <br> - Key Disadvantages |
|---|---|---|---|---|
| Contact Technologies | | | | |
| physical measurers (e.g. tape measure, calipers) | √ | √ | √ | + cheap, simple, reliable <br> - very slow, labor intensive, limited |
| mechanical contact arms (e.g. Faro SpaceArm) | | √ | √ | + relatively inexpensive, simple to build <br> - slow, cumbersome, limited range |
| sonic wands/transmitters (e.g. SAC digitizer) | | √ | √ | + lightweight, relatively simple <br> - slow, low accuracy, limited range |
| electro-magnetic wands/transmitters (e.g. Polhemus tracker) | | √ | √ | + lightweight, multiple points at once <br> - slow, problems w/ metal, limited range |
| optical emitter wand (e.g. Pixsys digitizer) | | √ | √ | + lightweight, relatively simple <br> - slow, line of sight issues, limited range |
| GPS (satellite triangulation) (e.g. Trimble GPS receiver) | √ | | √ | + accurate anywhere, rapidly improving <br> - low accuracy, subject to government jamming |
| laser with target reflector (e.g. typical total station) | √ | √ | √ | + well developed & accepted <br> - slow/labor intensive (point at a time) |
| laser interferometry with prism (e.g. SMX Chesapeake) | √ | √ | | + extremely accurate even at great distance <br> - slow/labor intensive (point at a time) |
| Non-Contact Technologies | | | | |
| stereo matching (photogrammetry) (e.g. Rollei system) | √ | √ | | + well developed & accepted <br> - very slow/labor-intensive, expensive cameras |
| triangulation—by point (e.g. Digi-bot scanner) | | √ | √ | + relatively simple to design <br> - very slow, limited range, surface dependent |
| triangulation—by line (striping) (e.g. MENSI or Cyberware scanner) | | √ | √ | + relatively fast <br> - slow, limited range, surface dependent |
| triangulation—by area (e.g. ABW Dr. Wolf system) | | √ | √ | + fastest of triangulation systems <br> - limited range, surface dependent, data overload |
| fringe-based (moiré interferometry) (e.g. EOIS mini-moiré system) | | √ | √ | + simple hardware, accurate at close range <br> - limited range, surface discontinuity problems |
| time-of-flight rangefinding—sonic (e.g. electronic tape measures) | √ | | | + very cheap and easy to manufacture <br> - very limited range & accuracy |
| time-of-flight rangefinding—lidar (e.g. IBEO lidar/total stations) | √ | √ | √ | + frees measurement head from target <br> - expensive, limited range/accuracy *(until now)* |

Each technology has advantages and disadvantages. Probes tend to be more accurate, but are typically slow and cumbersome (since they gather data point by point). Non-contact methods tend to be faster (as they eliminate the need for traveling to or coming into contact with each point to be DRAFT (Rev 1.2, 5 July 1995)

CYRA TECHNOLOGIES CONFIDENTIAL dimensioned). As seen in the table above (and illustrated by the diversity of systems utilized), before Cyra's breakthrough, no technology held a clear performance edge over any of the others.

An exhaustive worldwide search has found over 70 vendors selling various forms of 3D data capture systems, from mechanical arms, to GPS receivers and laser scanners. With the exception of 'total station' and 'GPS total station' technologies, the vast majority of these are small, under-capitalized and under-committed firms selling expensive, limited functionality systems in small volumes. Full product and vendor descriptions, as well as photographs, and firm by firm competitive reviews are available in Appendix B.

Of the many competitors with data collection systems, only two can gather 3D data at large (50 to 100 meters) distances: MENSI and SMX. Although these laser-based systems may appear similar to Cyra, each has severe limitations. The SMX Chesapeake laser interferometry system is priced over $100,000 and requires a probe to be placed at each point to be dimensioned, limiting its ability to capture 3D surfaces. Its advantage is high accuracy. The MENSI Soisic uses laser triangulation but is limited to gathering 100 points per second, is not extremely portable (large, heavy and requires AC power), and costs close to $260,000. Neither system is believed to have the software sophistication of *Cyrax*.

DRAFT (Rev 1.2, 5 July 1995)

What is claimed is:

1. A method of controlling the timing of output pulses from a laser for use in a device which requires scanning of the laser output, wherein each output pulse is generated in response to a pump pulse comprising the steps of:

monitoring the time delay between the initiation of the pump pulses and the subsequent generation of the associated output pulses;

predicting the time delay between the initiation of next pump pulse and the associated output pulse based on the monitored time delays and;

initiating the next pump pulse at a time selected to insure the output pulse is generated at a time to permit proper positioning of the laser output during the scan of the beam.

2. A method of operating a scanning laser system, said system including a laser which generates an output pulse in response to a pump pulse, with the time between the initiation of the pump pulse and the generation of the laser output pulse being variable, said scanning laser system further including a movable optical element for directing successive output laser pulses to different locations on a target to permit scanning of the target, said method comprising the steps of:

monitoring the position of the movable optical element;

monitoring the time delay between the initiation of the pump pulse and the subsequent generation of the associated output laser pulse; and triggering the next pump pulse based on the monitored time delay and monitored position of the movable optical element to insure that the laser output is directed to the proper location on the target.

3. A method as recited in claim 2 wherein the time delay is determined by reading a counter which is started when the pump pulse is initiated and thereafter interrupted when the generation of the subsequent laser output pulse is detected.

4. A method as recited in claim 2 wherein the time delay between the initiation of the pump pulse and the subsequent generation of the associated output pulse is on the order of 100 to 300 microseconds.

5. A method as recited in claim 2 wherein the laser is a passively q-switched laser.

6. A method as recited in claim 5 wherein said laser is optically pumped with a diode laser.

* * * * *